(12) United States Patent
Arnold et al.

(10) Patent No.: US 12,181,340 B2
(45) Date of Patent: *Dec. 31, 2024

(54) SYSTEMS AND METHODS USING MULTI-WAVELENGTH SINGLE-PULSE RAMAN SPECTROSCOPY

(71) Applicant: UNIVERSITY OF MARYLAND BALTIMORE COUNTY, Baltimore, MD (US)

(72) Inventors: Bradley Arnold, Baltimore, MD (US); Christopher Cooper, Baltimore, MD (US); John Cataldi, Baltimore, MD (US)

(73) Assignee: UNIVERSITY OF MARYLAND BALTIMORE COUNTY, Baltimore, MD (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/863,824

(22) Filed: Jul. 13, 2022

(65) Prior Publication Data
US 2023/0104561 A1  Apr. 6, 2023

Related U.S. Application Data

(63) Continuation-in-part of application No. 17/213,869, filed on Mar. 26, 2021, now abandoned, which is a
(Continued)

(51) Int. Cl.
*G01J 3/44* (2006.01)
*G01J 3/02* (2006.01)
(Continued)

(52) U.S. Cl.
CPC ............ *G01J 3/44* (2013.01); *G01J 3/0221* (2013.01); *G01J 3/06* (2013.01); *G01J 3/18* (2013.01);
(Continued)

(58) Field of Classification Search
CPC ........ G01J 3/44; G01J 3/02; G01J 3/06; G01J 3/18; G01J 3/28; G01J 3/36; G02B 5/18;
(Continued)

(56) References Cited

U.S. PATENT DOCUMENTS 5,258,825 A * 11/1993 Reed .................... G01N 21/359
356/402
10,078,013 B2   9/2018 Arnold et al.
(Continued)

FOREIGN PATENT DOCUMENTS

KR         101601826 B1     3/2016

*Primary Examiner* — Abdullahi Nur
(74) *Attorney, Agent, or Firm* — Gianna Julian Arnold; Saul Ewing LLP

(57) ABSTRACT

The invention provides methods and apparatus comprising a multi-wavelength laser source that uses a single unfocused pulse of a low intensity but high power laser over a large sample area to collect Raman scattered collimated light, which is then Rayleigh filtered and focused using a singlet lens into a stacked fiber bundle connected to a customized spectrograph, which separates the individual spectra from the scattered wavelengths using a hybrid diffraction grating for collection onto spectra-specific sections of an array photodetector to measure spectral intensity and thereby identify one or more compounds in the sample.

14 Claims, 59 Drawing Sheets

Related U.S. Application Data continuation-in-part of application No. 16/706,001, filed on Dec. 6, 2019, now abandoned, which is a continuation-in-part of application No. PCT/US2018/045227, filed on Aug. 3, 2018, which is a continuation of application No. 15/723,103, filed on Oct. 2, 2017, now Pat. No. 10,078,013.

(60) Provisional application No. 62/515,682, filed on Jun. 6, 2017.

(51) Int. Cl.

| | | |
|---|---|---|
| *G01J 3/06* | (2006.01) | |
| *G01J 3/18* | (2006.01) | |
| *G01J 3/28* | (2006.01) | |
| *G01J 3/36* | (2006.01) | |
| *G02B 5/18* | (2006.01) | |
| *G02B 6/32* | (2006.01) | |
| *G02B 6/293* | (2006.01) | |
| *G02B 6/42* | (2006.01) | |

(52) U.S. Cl.
CPC ............... *G01J 3/2803* (2013.01); *G01J 3/36* (2013.01); *G02B 5/1814* (2013.01); *G02B 5/1861* (2013.01); *G02B 6/32* (2013.01); *G02B 6/29311* (2013.01); *G02B 6/4215* (2013.01)

(58) Field of Classification Search
CPC .... G02B 6/32; G02B 6/29311; G02B 6/4215; G02B 27/4244
See application file for complete search history.

(56) References Cited

U.S. PATENT DOCUMENTS

| | | | |
|---|---|---|---|
| 2004/0012778 | A1 | 1/2004 | Li et al. |
| 2007/0076208 | A1 | 4/2007 | Koo |
| 2007/0087445 | A1 | 4/2007 | Tearney et al. |
| 2007/0216898 | A1 | 9/2007 | Gardner, Jr. |
| 2009/0066934 | A1* | 3/2009 | Gao ............... G01N 1/2273 356/417 |
| 2010/0053599 | A1* | 3/2010 | Milster ............ G01J 3/0208 356/331 |
| 2010/0179435 | A1* | 7/2010 | Sharifzadeh ...... A61B 5/1455 600/476 |
| 2018/0107210 | A1* | 4/2018 | Harnett ............ G01S 15/96 |

* cited by examiner

FIGURE 15 - VEHICLE

FIGURE 16 - CHECKPOINT

FIGURE 17 - WATER TREATMENT

FIGURE 18 – SHIPPING/TRANSPORT

FIGURE 19 – PORTABLE

FIGURE 20 - PROCESS

Maximum exposure values as a function of wavelength. The excitation wavelengths of interest to this proposal shown as blue bars.

FIGURE 39

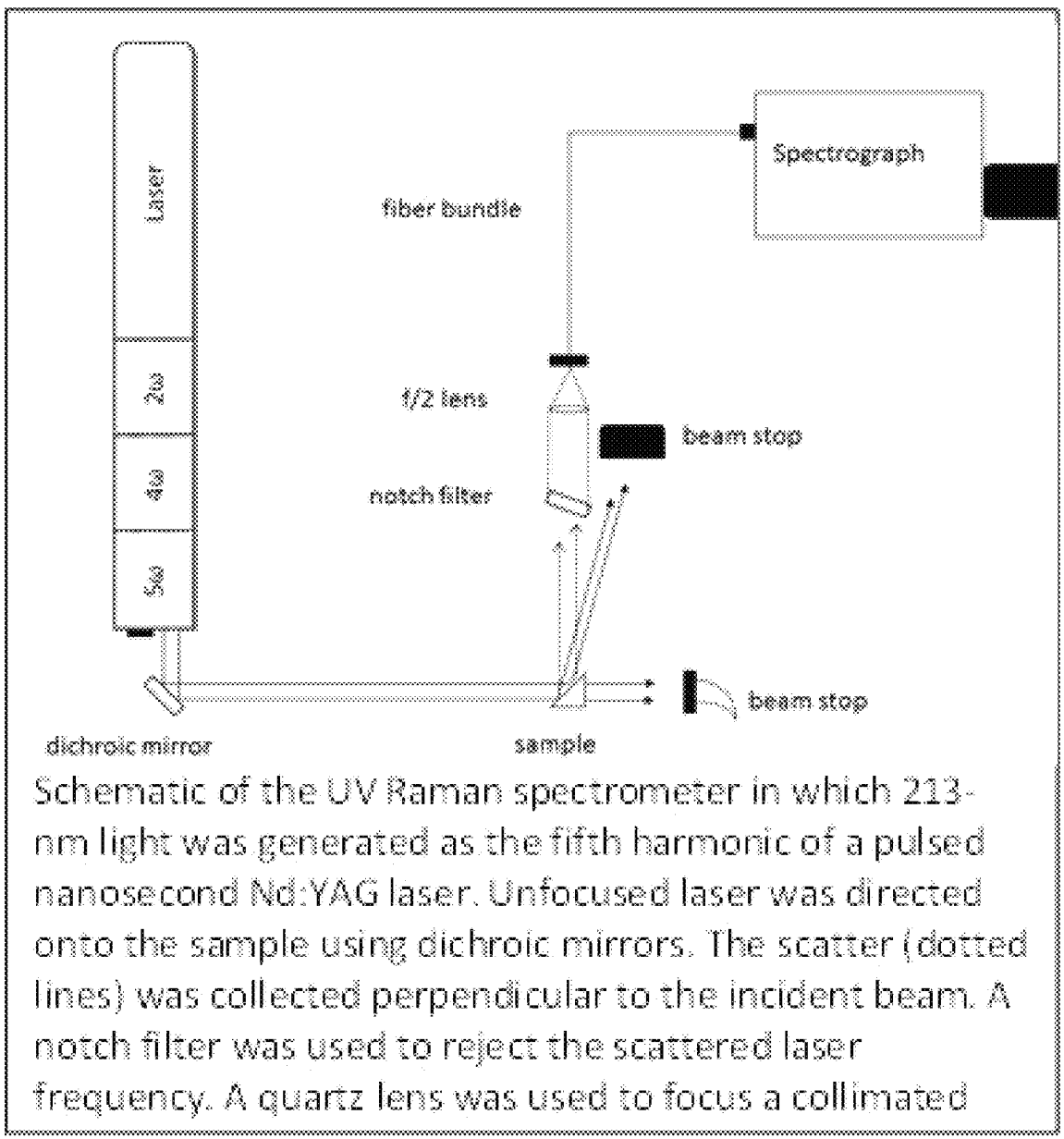

Schematic of the UV Raman spectrometer in which 213-nm light was generated as the fifth harmonic of a pulsed nanosecond Nd:YAG laser. Unfocused laser was directed onto the sample using dichroic mirrors. The scatter (dotted lines) was collected perpendicular to the incident beam. A notch filter was used to reject the scattered laser frequency. A quartz lens was used to focus a collimated

| Compound | Power | Gain | Accu | Conc, mg*cm$^{-2}$ | Limit of Detection |
|---|---|---|---|---|---|
| 1,2-Dichloroethylene | 2.5 | 10 | 1 | 19 | 1.3 |
| 2,4-Dinitrotoluene | 2.5 | 200 | 1 | 14 | 2.6 |
| 2-Nitrotoluene | 2.5 | 200 | 1 | 12 | 3.6 |
| 3 Nitrotoluene | 2.5 | 10 | 1 | 21 | Not Visible |
| 3-Methyl-1-butanol | 2.5 | 10 | 1 | 20 | 1.3 |
| 4-Nitrotoluene | 2.5 | 200 | 1 | 21 | 3.1 |
| Acetone | 2.5 | 10 | 1 | N/A | Not Visible |
| Acetonitrile | 2.5 | 10 | 1 | 9.1 | 7.4 |
| Benzene | 2.5 | 10 | 1 | 11 | 0.68 |
| Butanol | | | | | |
| Chloroform | 2.5 | 10 | 1 | 17 | 6.1 |
| Cyclohexane | 2.5 | 10 | 1 | 12 | 0.48 |
| Dichlorobenzene | 2.5 | 10 | 1 | 31 | Not Visible |
| Dichloromethane | 2.5 | 10 | 1 | 1.4E+02 | 35 |
| DMSO | 2.5 | 10 | 1 | 23 | 2.9 |
| Ethanol | 2.5 | 10 | 1 | 14 | 1.9 |
| Ethyl acetate | 2.5 | 10 | 1 | 13 | 5.9 |
| Ethylene Glycol | 2.5 | 10 | 1 | 41 | 5.46 |
| Formaldehyde | 2.5 | 10 | 1 | 23 | 8.2 |
| iso-Octane | 2.5 | 10 | 1 | 9.5 | 2.1 |
| Methanol | 2.5 | 10 | 1 | 10 | 2.6 |
| N,N-Dimethylformamide | 2.5 | 10 | 1 | 15 | 1.3 |
| n-Hexane | 2.5 | 10 | 1 | 6.1 | 0.47 |
| Nitrobenzene | 2.5 | 10 | 1 | 19 | Not Visible |
| Pentane | 2.5 | 10 | 1 | N/A | Not Visible |
| Pink Sugar Mixture | 2.5 | 10 | 1 | 93 | 31 |
| Sodium Bicarbonate | 2.5 | 10 | 1 | 20 | 4.5 |
| Sodium Phosphate | 2.5 | 10 | 1 | 3.5 | Not Visible |
| Sodium Perchlorate | 2.5 | 10 | 1 | 10 | 3.90 |
| Sparkler | 6 | 10 | 1 | 0.050 | 0.0036 |
| Splenda | 2.5 | 10 | 1 | 52 | 0.72 |
| Sucrose | 2.5 | 10 | 1 | 10 | 2.2 |
| Tannerite | 6 | 10 | 1 | 0.050 | 0.004 |
| Toluene | 2.5 | 10 | 1 | 14 | Not Visible |
| Trichloroethylene | 2.5 | 10 | 1 | 16 | 0.40 |
| Triethylamine | 2.5 | 10 | 1 | 7.3 | Not Visible |

FIG. 52

IDL values at 266 and 355 nm excitation

| # | Compound | λ nm | Power mJ | Gain | Accum | LOD mg*cm⁻³ |
|---|---|---|---|---|---|---|
| 1 | Acetone | 266 | 2.5 | 10 | 1 | ND |
|   |   | 355 | 6 | 150 | 30 | 5 - 7 ± 1 |
| 2 | Acetonitrile | 266 | 2.5 | 10 | 1 | 7.4 |
|   |   | 355 | 6 | 175 | 30 | 5 - 8 ± 1 |
| 3 | Benzene | 355 | 6 | 125 | 30 | 5 - 6 ± 1 |
| 4 | 1-Butanol | 355 | 6 | 150 | 30 | < 8.1 |
| 5 | Chloroform | 266 | 2.5 | 10 | 1 | 6.1 |
|   |   | 355 | 6 | 150 | 30 | 5 ± 2 |
| 6 | Cyclohexane | 266 | 2.5 | 10 | 1 | 0.48 |
|   |   | 355 | 6 | 200 | 30 | 4 ± 2 |
| 7 | 1,2-Dichlorobenzene | 266 | 2.5 | 10 | 1 | ND |
|   |   | 355 | 6 | 200 | 30 | < 12.5 |
| 8 | 1,2-Dichloroethylene | 266 | 2.5 | 10 | 1 | 1.3 |
| 9 | Dichloromethane | 266 | 2.5 | 10 | 1 | 3 |
|   |   | 355 | 6 | 200 | 30 | 7.9 ± 1 |
| 10 | N,N-Dimethylformamide | 266 | 2.5 | 10 | 1 | 1.35 |
|   |   | 355 | 6 | 200 | 30 | < 9.5 |
| 11 | Dimethyl Sulfoxide | 266 | 2.5 | 10 | 1 | 2.9 |
|   |   | 355 | 6 | 200 | 30 | < 11 |
| 12 | 2,4-Dinitrotoluene | 266 | 2.5 | 200 | 1 | 2.6 |
| 13 | Ethanol | 266 | 2.5 | 10 | 1 | 1.8 |
|   |   | 355 | 6 | 200 | 30 | 5.6 - 7.3 ± 0.5 |
| 14 | Ethyl acetate | 266 | 2.5 | 10 | 1 | 5.9 |
|   |   | 355 | 6 | 200 | 30 | < 9.6 |
| 15 | Ethylene Glycol | 266 | 2.5 | 10 | 1 | 5.3 |
| 16 | Formaldehyde | 266 | 2.5 | 10 | 1 | 8.2 |
|   |   | 355 | 6 | 200 | 30 | < 11 |
| 17 | n-Hexane | 266 | 2.5 | 10 | 1 | 0.47 |
|   |   | 355 | 6 | 150 | 30 | 4.9 - 6.5 ± 0.1 |
| 18 | Methanol | 266 | 2.5 | 10 | 1 | 2.7 |
|   |   | 355 | 6 | 150 | 30 | 5 ± 1 |
| 19 | 3-Methyl-1-butanol | 266 | 2.5 | 10 | 1 | 1.3 |
|   |   | 355 | 6 | 200 | 30 | ≥ 8.0 |
| 20 | Nitrobenzene | 266 | 2.5 | 10 | 1 | ND |
|   |   | 355 | 6 | 200 | 30 | ND |
| 21 | Nitromethane | 266 | 2.5 | 10 | 1 | ND |
|   |   | 355 | 6 | 200 | 30 | ND |
| 22 | 2-Nitrotoluene | 266 | 2.5 | 200 | 1 | 3.6 |
|   |   | 355 | 6 | 200 | 30 | ND |
| 23 | 3-Nitrotoluene | 266 | 2.5 | 10 | 1 | ND |
|   |   | 355 | 6 | 200 | 30 | ND |
| 24 | 4-Nitrotoluene | 266 | 2.5 | 200 | 1 | 3.1 |
| 25 | Iso-Octane | 266 | 2.5 | 10 | 1 | 2.1 |
|   |   | 355 | 6 | 200 | 30 | 5.8 - 6.5 ± 0.8 |
| 26 | Pentane | 266 | 2.5 | 10 | 1 | ND |
|   |   | 355 | 6 | 150 | 30 | 4.0 - 5.3 ± 0.4 |
| 27 | Pink Sugar Mixture | 266 | 2.5 | 10 | 1 | 31 |
| 28 | Sodium Bicarbonate | 266 | 2.5 | 10 | 1 | 4.5 |
| 29 | Sodium Perchlorate | 266 | 2.5 | 10 | 1 | 3.9 |
| 30 | Sodium Phosphate | 266 | 2.5 | 10 | 1 | ND |
| 31 | Sparkler | 266 | 6 | 10 | 1 | 0.0036 |
| 32 | Splenda | 266 | 2.5 | 10 | 1 | 0.72 |
| 33 | Sucrose | 266 | 2.5 | 10 | 1 | 2.2 |
|   |   | 355 | 6 | 150 | 30 | < 10.5 |
| 34 | Tannerite | 266 | 2.5 | 10 | 1 | 0.0041 |
| 35 | Toluene | 266 | 2.5 | 10 | 1 | ND |
|   |   | 355 | 6 | 125 | 30 | 62 - 68 ± 1 |
| 36 | Trichloroethylene | 266 | 2.5 | 10 | 1 | 0.47 |
| 38 | Triethylamine | 266 | 2.5 | 10 | 1 | ND |
|   |   | 355 | 6 | 200 | 30 | 7.5 |

ND : Not Detected

FIG. 53

SYSTEMS AND METHODS USING MULTI-WAVELENGTH SINGLE-PULSE RAMAN SPECTROSCOPY

CROSS-REFERENCE TO RELATED APPLICATIONS

This application is a continuation-in-part of Ser. No. 17/213,869 filed Mar. 26, 2021, which is a continuation-in-part of Ser. No. 16/706,001, filed Dec. 6, 2019 which is a continuation-in-part of PCT International Application No. PCT/US2018/045227, titled "Systems and Methods Using Multi-Wavelength Single-Pulse Raman Spectroscopy," filed on Aug. 3, 2018, which is a continuation of U.S. application Ser. No. 15/723,103 filed on Oct. 2, 2017, which claims priority to U.S. Provisional Application Ser. No. 62/515,682 filed on Jun. 6, 2017, each of which is incorporated herein, in its entirety, by this reference.

FIELD OF THE INVENTION

The invention relates to a multi-wavelength single-pulse stand-off Raman spectroscopy system using unfocused laser excitation wavelengths provided as a viable solution for long-distance detection of trace materials at speed.

BACKGROUND

Since the discovery of the Raman effect in 1928 by C. V. Raman and K. S. Krishnan, Raman spectroscopy has become an established as well as a practical method of chemical analysis and characterization applicable to many different chemical species. The Raman effect, or Raman scattering, is well known. Briefly and simply, when a beam of light impinges on substances, light is scattered. This scattering is of several different types, the predominant type being Rayleigh scattering, wherein the wavelength of the scattered light is the same as that of the incident light. In the type utilized in the present invention, Raman scattering, the scattered light is of different wavelengths than the incident light; photons interact with the substance and are re-emitted at higher and lower wavelengths. A Raman spectrum of a substance is constituted of Raman scattered light and is spread across a wavelength band even if the incident light is monochromatic, that is, the incident light is of a single wavelength. There is a unique Raman spectrum of a particular substance for, or associated with, each incident wavelength. In practice, a monochromatic beam of incident light is typically used in Raman spectroscopy because of the difficulties in obtaining spectral separation. When Raman and Rayleigh scattered light is resolved into a spectrum by a spectrograph, Raman lines will appear on both sides of the Rayleigh line. The Raman line or lines on the low frequency side (or low wavenumber side or high wavelength side) of the Rayleigh line are more intense than those on the high frequency side and are called the Stokes line or lines; those on the high frequency side are called the anti-Stokes line or lines. Not all substances are Raman active; there must be a change in polarizability during a specific molecular vibration in order that a substance be Raman active. Substances which do exhibit Raman spectra can be characterized by means of their spectra. Qualitative analysis of a substance can be accomplished by comparison of the locations of its Raman lines with those of known standards. Quantitative analysis can be accomplished by comparison of intensities of Raman lines; this is generally a linear relationship. Of course, spectra which are compared must result from exciting radiation of the same wavelength. For purposes of this document, a substance is defined as any composition of matter, including a pure compound, and mixtures or solutions of chemical compounds.

SUMMARY

Accordingly, to address the limitations of the prior art and provide a solution to needs in the field of Raman spectrography and for identification of unknown samples at long range, the invention provides a multi-wavelength laser source that uses a single unfocused pulse of a low intensity but high power laser over a large sample area to collect Raman scattered collimated light, which is then Rayleigh filtered and focused using a singlet lens into a stacked fiber bundle connected to a customized spectrograph, which separates the individual spectra from the scattered wavelengths using a hybrid diffraction grating for collection onto spectra-specific sections of an array photodetector.

Unlike prior Raman spectroscopy systems, which requires alignment between the incident beam with the collection optics both focused on the same position in space, the present invention does not use a focused beams and thereby does not have the alignment issues of the prior art. Further, since the present invention does not require a beam that is focused on a single point, but rather uses a multi-wavelength unfocused beam, scattered light from a much larger sample area can be collected. This ability enables large sample areas to be scanned rapidly.

Additionally, because there are no focal plane requirements with either the incident or scattered light, and since the incident beam can be a single pulse, the target surface can be in motion (x-y-z axes) relative to the laser output and to the collection optics and still allow the system to record Raman spectra that are indicative of the targeted area.

Because the incident beam (i) is not focused onto the target area, in combination with (ii) the non-continuous single incident pulses can be used, low intensity, but high power, laser irradiation can be utilized to interrogate the sample. As a direct consequence, low penetration depth into the sample can be used yet allow large numbers of molecules to be interrogated. Raman scatter from samples that are strong absorbs of the incident and scattered wavelengths can still be observed with unprecedented efficiency.

Further, a low intensity incident beam that would typically be focused onto the sample can lead to sample degradation or destruction, resulting in high background noise and signals due to decomposition products, the resulting spectral measurements are unusable. Because there is no requirement to focus the incident beam in the current technology coupled with the ability to record spectra in a single incident laser pulse, sample damage is minimized and accurate Raman spectra that are free from photochemical artifacts can be obtained.

In one non-limiting embodiment, the apparatus for Raman spectra measurement, comprises: (i) a Nd YAG laser configured to simultaneously output a single pulse of an unfocused beam of photons in two or more excitation wavelengths selected from 213, 266, 532 and 1064 nm onto a sample, said laser output ranging from 1-100 mJ per pulse at 10 Hz; (ii) a dichroic Rayleigh filter stack in optical communication with scattered light from the single pulse of unfocused beam of photons incident on the sample; (iii) a singlet lens in optical communication with the dichroic Rayleigh filter stack to focus the scattered light from the sample and couple the scattered light into a proximal end of a stacked fiberoptic bundle; (iv) a spectrograph equipped with a hybrid diffraction grating attached to a distal end of the stacked fiberoptic bundle, said hybrid diffraction grating comprised of a stack of at least two diffraction surfaces, each diffraction surface configured for blaze density and wavelength for one of the two or more excitation wavelengths, each diffraction surface individually angle-tuned and target-adjusted to disperse the scattered light, wherein the spectrograph is configured to illuminate all of the at least two diffraction surfaces simultaneously; (v) an array detector system in optical communication with the spectrograph and configured to receive the dispersed scattered light from each diffraction surface onto a specific target section of an array detector, and output a spectral intensity measurement.

In another embodiment, there is also provided an apparatus, wherein the hybrid diffraction grating is a surface relief reflection grating wherein depth of a surface relief pattern on the grating modulates the phase of the scattered light.

In another embodiment, there is also provided an apparatus wherein the hybrid diffraction grating is a volume phase grating wherein the scattered light phase is modulated as it passes through a volume of a periodic phase structure.

In another embodiment, there is also provided an apparatus wherein the hybrid diffraction grating comprised of a stack of four diffraction surfaces.

In another embodiment, there is also provided an apparatus wherein the hybrid diffraction grating comprised of a stack of eight diffraction surfaces.

In another embodiment, there is also provided an apparatus wherein the laser output is 3-9 mJ per pulse at 10 Hz.

In another embodiment, there is also provided an apparatus wherein the array detector is selected from a charge-coupled device (CCD), an intensified charge-coupled device (ICCD), an InGaAs photodetector, and a CMOS photodetector.

In another embodiment, there is also provided an apparatus wherein the array detector system comprises two or more arrays selected from the group consisting of a CCD, an ICCD, an InGaAs photodetector, and a CMOS photodetector.

In another embodiment, there is also provided an apparatus wherein the apparatus is mounted on a vehicle, an unmanned vehicle, a piloted aircraft, a drone aircraft, or a satellite.

In another embodiment, there is also provided an apparatus wherein the dichroic Rayleigh filter stack and the singlet lens are mounted within a remote probe housing.

In another embodiment, there is also provided an apparatus wherein the laser, the dichroic Rayleigh filter stack, the singlet lens, the spectrograph, and the array detector system are mounted within a single housing.

In another embodiment, there is also provided an apparatus wherein the housing is 8-16 cm in height, 50-90 cm in length, and 30-90 cm in width.

In another embodiment, there is also provided a method for comparing the Raman spectral intensity measurement of an unknown sample against a library of spectral intensity measurements, comprising the steps: (i) providing an apparatus according to teachings and disclosure herein; (ii) subjecting the unknown sample to a single unfocused pulse from the Nd YAG laser, wherein said sample has a standoff distance from the laser ranging from 0.30 meters to 20,000 meters; (iii) obtaining a Raman spectral intensity measurement of the unknown sample; and (iv) comparing the Raman spectral intensity measurement of the sample against a library of spectral intensity measurements of known samples.

In another embodiment, there is also provided a method wherein the standoff distance from the laser ranges from 0.30 meters to 200 meters.

In another embodiment, there is also provided a method wherein the sample is selected from the group consisting of a particle, a powder, a flake, a solid, a liquid, a gas, a plasma, a gel, a foam, and combinations thereof.

In another embodiment, there is also provided a method further comprising the step of identifying a match for the spectral intensity measurement of the unknown sample from the spectral intensity measurement of the known samples.

In another embodiment, there is also provided a method further comprising the step wherein the identified match is used in a system selected from the group consisting of: real-time detection of a roadbed explosive; assessment of diamond quality; real-time identification of chemical species within a plasma reactor environment; real-time identification of drilling fluids; real-time identification of hydrocarbon oil mixtures; real-time identification of constituents of a process stream at an inlet of a reaction vessel; real-time characterization of fuel at a fuel dispenser; real-time monitoring of reacting chemicals in semi-conductor manufacturing; real-time monitoring of reacting chemicals in pharmaceutical manufacturing; real-time quality control in pharmaceutical, processed food, and consumer good manufacture; identification of a horticultural chemical; identification of a biochemical compound; identification and mapping of chemical spills; precision farming; identification of a polymer; authentication of a product; identification of a pathogen; identification of a toxin; real-time detection of a target compound on baggage in an airport; real-time detection of a target compound on shipping containers and boxes; real-time detection of a target compound in a water treatment facility; real-time detection of a target compound in smokestack emissions; real-time detection of a target compound in waste water; real-time detection of a target compound in a hazardous spill; real-time detection of a target compound on a law enforcement forensic sample; use in combination with LIDAR; use in combination with a drone; and combinations of the above.

BRIEF DESCRIPTION OF THE DRAWINGS

FIG. 1 shows how the unfocused fundamental and harmonic output of a Nd YAG laser system is allowed to strike the sample and scatter from the molecular components, where the naturally collimated scatter is filtered to remove Rayleigh scatter and coupled into a fiber optic using a single lens, where the fiber is connected to a spectrograph equipped with the hybrid grating allowing individual spectra from different scattered wavelengths to be simultaneously collected on an ICCD detector system.

FIG. 5 shows a blue box contains the UV information while the red box contains the visible information. Note the bright spots which are the spectral images of the individual fibers.

FIG. 20 shows an illustration of a multi-step process, including (i) subjecting an unknown sample to a laser unfocused single pulse, (ii) generating Raman scatter, (iii) receiving collimated light into the Rayleigh filter and using the singlet lens to focus the light and couple it to the fiber bundle, (iv) using the fiber to feed the light into the spectrograph and into the hybrid diffraction grating, (v) using the hybrid diffraction grating to angle tune and target adjust the light on a specific section of the array detector. Further steps may also include (vi) obtaining Raman spectra measurements for the unknown sample, (vii) comparing the unknown spectra against a library of known (sample) spectra, and (viii) using the identified compound or match in a specific application, such as detecting and identifying target compounds for military, public safety, industrial processes, environmental spill detection and mapping, quality control, hazard detection and the like.

FIG. 39 illustrates an exemplary device.

FIG. 52 illustrates the Instrument Detection Limits (IDL) (i.e., the material concentration needed to achieve signal intensity 3 times the standard deviation in the blank noise) for various compounds. The target trace surface coverage of 1 mg/cm2 has been selected as the standard for IDL. The combinations of detector sensitivity, laser peak power, and signal averaging (required that achieves this limit) for various compounds are tabulated here.

FIG. 53 illustrates a comparison between IDL values for 266 and 355 nm excitation of various compounds.

DETAILED DESCRIPTION OF THE INVENTION

Figure 1:
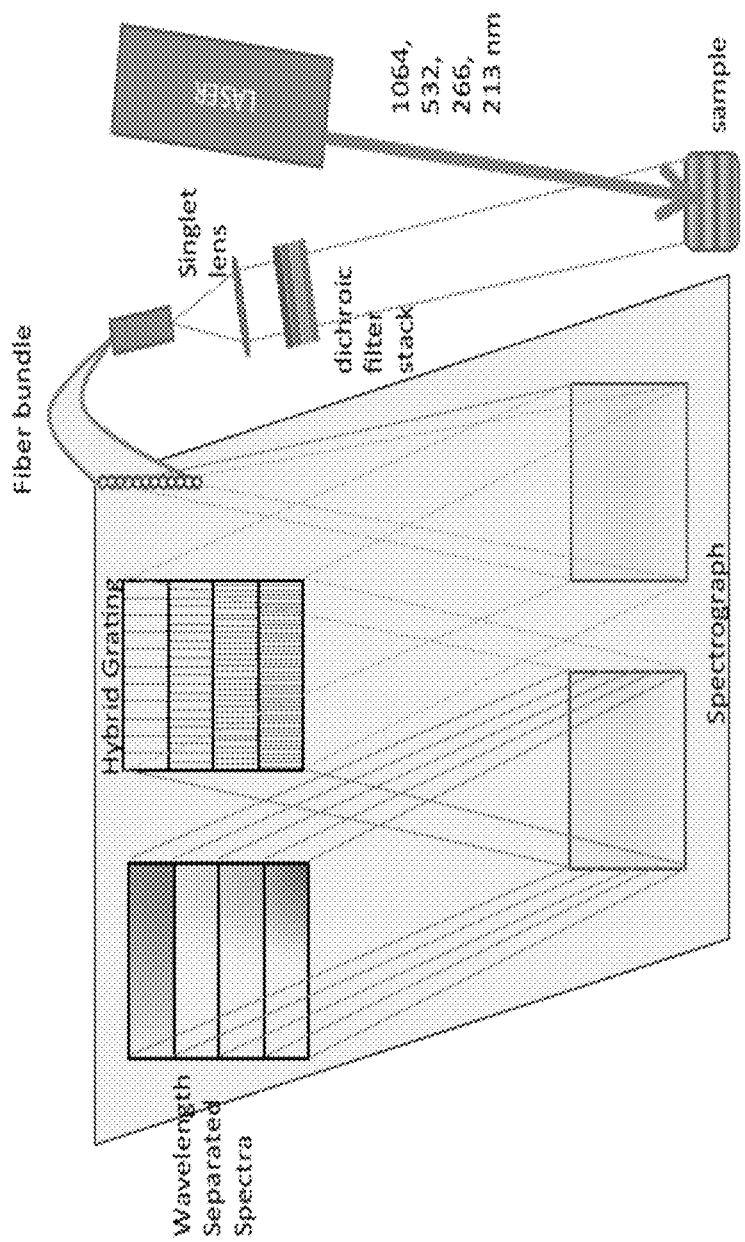
FIG. 1 is an illustration and shows a non-limiting example of an apparatus showing multi-wavelength Raman spectrograph based on hybrid stacked diffraction grating.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal subparts. As will be understood by one skilled in the art, a range includes each individual member.

Raman spectroscopy is a leading analytical technique for rapid and selective detection. Past sensitivity issues have been largely overcome due to the availability of efficient fiber-optic coupled spectrographic systems equipped with sensitive Intensified Charge-Coupled Device (ICCD) detection arrays and utilizing high intensity laser sources. In Raman spectroscopy a balance is made between the selection of the wavelength to be used as the scattering source and the resolution used to collect the resulting spectra. Scattering using ultraviolet wavelengths experience higher interaction cross-sections but suffer from absorption effects, luminescence from both analyte and background materials as well as photochemical degradation of the sample. Scattering using longer wavelengths is fundamentally weaker but may avoid absorption effects although background emission can still be a problem. High resolution spectra can be used to discriminate between closely related materials through analysis of fundamental frequencies but complete Raman spectra is difficult to obtain at the high-resolution limit.

Difficulties arising from trying to balance which regions of the spectrum to collect versus the information sought are mitigated by the development of the unique multi-wavelength Raman spectrographic system disclosed and claimed herein. The novel detection scheme described herein removes the necessity of making the choice of excitation wavelength and resolution a priori by collecting the Raman spectrum at multiple excitation wavelengths and/or resolutions simultaneously.

The use of high peak power laser systems capable of delivering intense light pulses provides the use Raman spectroscopy as a selective analytical technique for stand-off detection. Commercially available Nd:YAG laser sources are used to produce high fluencies of 1064, 532, 355, 266 and 213-nm excitation pulses simultaneously. The selection of excitation pulse to be used is a decision based on the balance between the characteristics of the analyte of interest, sources of background interferences, and overcoming low Raman scattering cross-sections. Frequency dependence of Raman cross-sections is described using a frequency to the 4th power ($v^{4th}$) excitation dependence. Thus, cross-sections observed using the fifth harmonic of Nd:YAG at 213 nm will be 500 to 1000 times greater than the same transitions observed using the fundamental at 1064 nm based solely on this $v^4$ dependence. A more important benefit of ultraviolet (UV) sources arises when the incident wavelength approaches the energy needed for electronic excitation of the scattering molecule. Resonance enhancement factors of $10^2$-$10^6$, or more, can be observed. Such large resonance enhancements to the Raman cross-sections could make the sensitivity of UV-based Raman spectroscopy comparable to typical luminescence detection techniques and possibly allow single molecule detection to become available.

The present invention addresses loss of intensity in both the incident and scattered beams due to absorption by the sample, interference by fluorescence and photochemical degradation of the sample unique to deep-UV excitation.

The invention also addresses spectral resolution. In liquids and solids, the fundamental resolution of scattered frequency for vibrational transitions is on the order of 2-5 $cm^{-1}$. Raman spectra require a range of approximately 4000 $cm^{-1}$ to cover the entire spectrum and using the general rule that 10 data points are needed to accurately define peak shapes. Therefore, ~10000 pixels of data are needed to collect an entire Raman spectrum at the fundamental limit of high resolution which is why selected regions of interest must be collected and entire spectra are not available.

The invention relates to the development of a multi-wavelength Raman spectroscopy system that allows several excitation wavelengths to be used simultaneously. The inventive design allows many of the difficulties associated with high fluence excitation to be mitigated.

Large sample areas were imaged into the detection system allowing low intensity (high power) excitation sources to be used while avoiding sample degradation and multi-photon absorption effects. Such large detection areas permitted large numbers of molecular scatters to be probed with minimal penetration depth. Alignment issues were minimized and the need for focal plane adjustments was eliminated.

The inventive technology also allowed multiple spectra to be collected simultaneously with selected resolutions thus allowing the entire spectrum at modest resolution and specific regions of interest to be examined at high resolution in a single laser pulse. This ability eliminates the need to guess at which spectral region may be required.

This approach avoids the need to select excitation wavelength by collecting multiple Raman spectra using several available excitation wavelengths simultaneously.

Referring now to the FIGURES, one non-limiting configuration is shown in FIG. 1. Specifically, the output wavelengths of a Nd:YAG, in which the fundamental at 1064 nm and the harmonics at 532, 355, 266 and 213-nm are generated, are all allowed to excite the sample simultaneously. The 3rd harmonic at 355 nm may also be available but for the purposes of this discussion was not considered. The scatter emanating from the sample at each of these wavelengths passes through dichroic filters to facilitate rejection of the intense Rayleigh scattered light. The remaining wavelengths are coupled into the end of a fiber optic bundle using a singlet lens. The distal end of the fiber is attached to a spectrograph equipped with a hybrid diffraction grating. The hybrid grating consists of a stack of diffraction surfaces, each designed to be optimized for blaze density and wavelength for one of the specific excitation wavelengths used. Each section of the hybrid grating stack is individually angle-tuned and adjusted to allow the scattered light, originating from each excitation wavelength, to be dispersed through the similar diffraction angles and onto different sections of the ICCD array. To accomplish this function, the collected light emerging from the fiber illuminates all four diffraction surfaces simultaneously. In turn, the diffracted light from each of the grating diffraction surfaces fall onto different sections of the ICCD detection device. As a result, unique Raman spectra are collected simultaneously at each of the excitation wavelengths.

Although Nd-YAG laser at 1064 nm is illustrated, any laser capable of producing a beam having multiple wavelengths is contemplated as within the scope of the invention. Non-limiting examples include Ytterbium (-YAG, -doped, or -glass), Titanium sapphire, Neodymium (-glass, -YCOB, -$YVO_4$, -YLF, or -CrYAG), Helium-Neon, and Argon lasers.

Although an ICCD is illustrated, any array photodetector or multiple arrays of photodetectors are contemplated as within the scope of the invention. Non-limiting examples include CCD, an InGaAs photodetector, a CMOS photodetector, FET photodetectors, and combinations thereof.

In another non-limiting embodiment, there is provided a multi-wavelength Raman spectrographic system to collect two different wavelength regions simultaneously. This prototype system uses an available monochromator to which a diode array detector system is attached.

In another non-limiting embodiment, there is provided a second system that utilizes a hybrid grating system fabricated using commercially available gratings. Gratings were purchased from Richardson Gratings as in-stock items. The gratings were selected to allow near optimal dispersion of the wavelengths used for this study at the wavelengths of interest. This non-limiting example is provided to illustrate the rapid availability of associated optical components, and therefore uses excitation wavelengths of 266 nm and 532 nm.

An existing spectrograph is modified extensively to accept the hybrid gratings in a computer controlled turret system. Fiber optic coupling of the input signals, as well as ICCD detection of the dispersed light from the hybrid grating system, is accomplished using a modified version of a commercial spectrograph (Acton SpectraPro 2300i spectrograph with a Roper 256×1024 PIMAX ICCD camera).

In other embodiments, the detector array is a CCD 2048 px detector array, or is a 256 px InGaAs detector array.

The laser system used is a Quantel Brilliant B Nd:YAG laser set to output 3 mJ of 266 with 9 mJ of 532 nm light per pulse at 10 Hz. Depending on the application, the laser power may be 100 mW, or it may range from 50-450 mW for small scale nearby applications. However, Nd-YAG lasers can be configured to project long distances. For example, a 3 MW Nd-YAG (1064 nm) laser at 12 PPM (PRF) has a range up to 999 m, a 4 MW Nd-YAG (1064 nm) laser at 10 Hz (PRF) has a range up to 9995 m, and a 3 MW Nd-YAG (1064 nm) laser at 5 Hz (PRF) has a range up to 19,995 m. Accordingly, sample detection also contemplates the long range use of a Nd-YAG (1064 nm) laser and Raman analysis would only be limited by the detection system.

The detection system herein also contemplates the use of enhanced receiving optics that may include a detector filter, a pre-amplifier, an amplifier, as well as Fast A/D digital signal processing chips and electronics for amplifying optical signals, such as signal averaging (10x) of received waveforms to improve SNR. In some embodiments, multiple pulses may be necessary at very long ranges to take advantage of the averaging that can take place from the high pulse repetition frequencies (PRFs) possible with some Nd-YAG lasers.

A suitable fiber optic bundle may be purchased from Acton and adapted for use in this system. As shown in this non-limiting example, the fiber bundle has 19 fibers, and may be arranged as a vertical stack to facilitate vertical alignment from fiber to detector array.

The spectrograph and detector is controlled using Winspec 32 software. ICCD output is to a display, a recording device, etc. Additional library software for identification and comparison to spectra measurements may be purchased from existing Raman library vendors, or customized libraries can be loaded into memory of the apparatus.

The term "stand off" means the ability to project a laser impulse or beam onto a distant sample. The distance contemplated herein ranges from 0.30 meters-20,000 meters (20 Km). Nd-YAG lasers are used in laser range finding and are only limited by atmospheric attenuation or line of sight problems. For specific use applications, the apparatus and laser can be configured for distances ranging from 0.30 to 1.0 meter, from 0.30 to 30 meters, from 0.30 to 300 meters, from 30 to 1000 meters, from 100 to 300 meters, from 1000 to 5000 meters, from 1000 to 20,000 meters, as well as ranges falling there-between.

In other embodiments, the apparatus may be a portable device with an integrated touch screen. Alternatively, the apparatus may be a stand-alone unit with attached peripherals. It is contemplated as within the scope of the invention that the apparatus or device may have external data ports to a computer, including USB 2.0, USB 3.0, USB-C, lightning connector, WiFi connection, Bluetooth, and Ethernet port(s).

Where the unit is portable, it is contemplated that the apparatus fits into a portable-sized housing, such as 305 mm×380 mm×168 mm, in order to fit on a 19 inch rack. In another example, the unit may be 8-16 cm in height, 50-90 cm in length, and 30-90 cm in width. In another non-limiting example, the unit may be a handheld device having a housing size 2-5 cm in height, 10-40 cm in length, and 10-30 cm in width.

The apparatus may include a 16 bit A/D converter, a 32-bit, and/or a 64-bit ADC. The apparatus may use Windows O/S, Linux or Linux variants, or custom, especially where the GUI of a built-in touchscreen display is used on a portable unit. The unit is also contemplated as having sufficient internal memory, e.g. from 16 MB to 4 GB, to run the various processors necessary for the electronics to run the spectrograph and display the output.

For a portable unit, power is contemplated for 25-30 W portable, whereas for a desktop unit 100-200 W desktop is contemplated. It is also contemplated that the apparatus is mounted on a vehicle, or on a platform appropriate to the field in which the apparatus is being used, e.g. wherein the identified match is used in a system selected from the group consisting of: real-time detection of a roadbed explosive; assessment of diamond quality; real-time identification of chemical species within a plasma reactor environment; real-time identification of drilling fluids; real-time identification of hydrocarbon oil mixtures; real-time identification of constituents of a process stream at an inlet of a reaction vessel; real-time characterization of fuel at a fuel dispenser; real-time monitoring of reacting chemicals in semi-conductor manufacturing; real-time monitoring of reacting chemicals in pharmaceutical manufacturing; identification of a horticultural chemical; identification of a biochemical compound; identification of a polymer; authentication of a product; identification of a pathogen; identification of a toxin; real-time detection of a target compound on baggage in an airport; real-time detection of a target compound on shipping containers and boxes; real-time detection of a target compound in a water treatment facility; real-time detection of a target compound in smokestack emissions; real-time detection of a target compound in waste water; real-time detection of a target compound in a hazardous spill; real-time detection of a target compound on a law enforcement forensic sample.

The term "sample" means a liquid, solid, gas, mixture, and/or plasma, but also materials that are targeted and tested using the apparatus and methods described herein. Non-limiting examples of materials include roadbed surfaces—paved and unpaved, solids such as diamonds or crystalline materials, natural fibers, synthetic fibers, fabrics, polymers, co-polymers, powders, shavings, pellets or particles, metals, foil, alloys, ceramics, glass, human or animal tissue, hair, fur, dried human or animal fluids or excretions, fluids including chemicals within a reactor environment, oil and gas drilling fluids, hydrocarbon oil mixtures; constituents of a process stream in a reaction vessel, fuels at a fuel dispenser; chemicals in semi-conductor manufacturing and pharmaceutical manufacturing, horticultural chemical, agricultural products including vegetables, grains, meat, dairy products, fruit, wine, beer, beverages and herbs, biochemicals, pathogens including bacteria, fungi, viruses, yeast and mycoplasma, biological and chemical toxins, bagage surfaces, shipping containers and boxes, smokestack gases, and forensic samples for governmental, law enforcement, and industrial monitoring purposes.

The term "sample" may also include the substrate, surface, container or form on or in which a material is found. As a non-limiting example, a liquid sample may be enclosed in a testing cuvette or container, as part of a reaction chamber, in a holding pond, in a storage tank, or as a stream of liquid. A solid sample may be part of a soil sample, a swatch of fabric, a block, or tissue or cells from an animal, plant, or microorganism. A gas sample may be confined within a capture chamber, may be within a larger confined space, or may be part of emission column or cloud into the atmosphere.

It is also contemplated that the apparatus work with a Li ion battery or with standard 110/230 V AC power supply.

Figure 2:
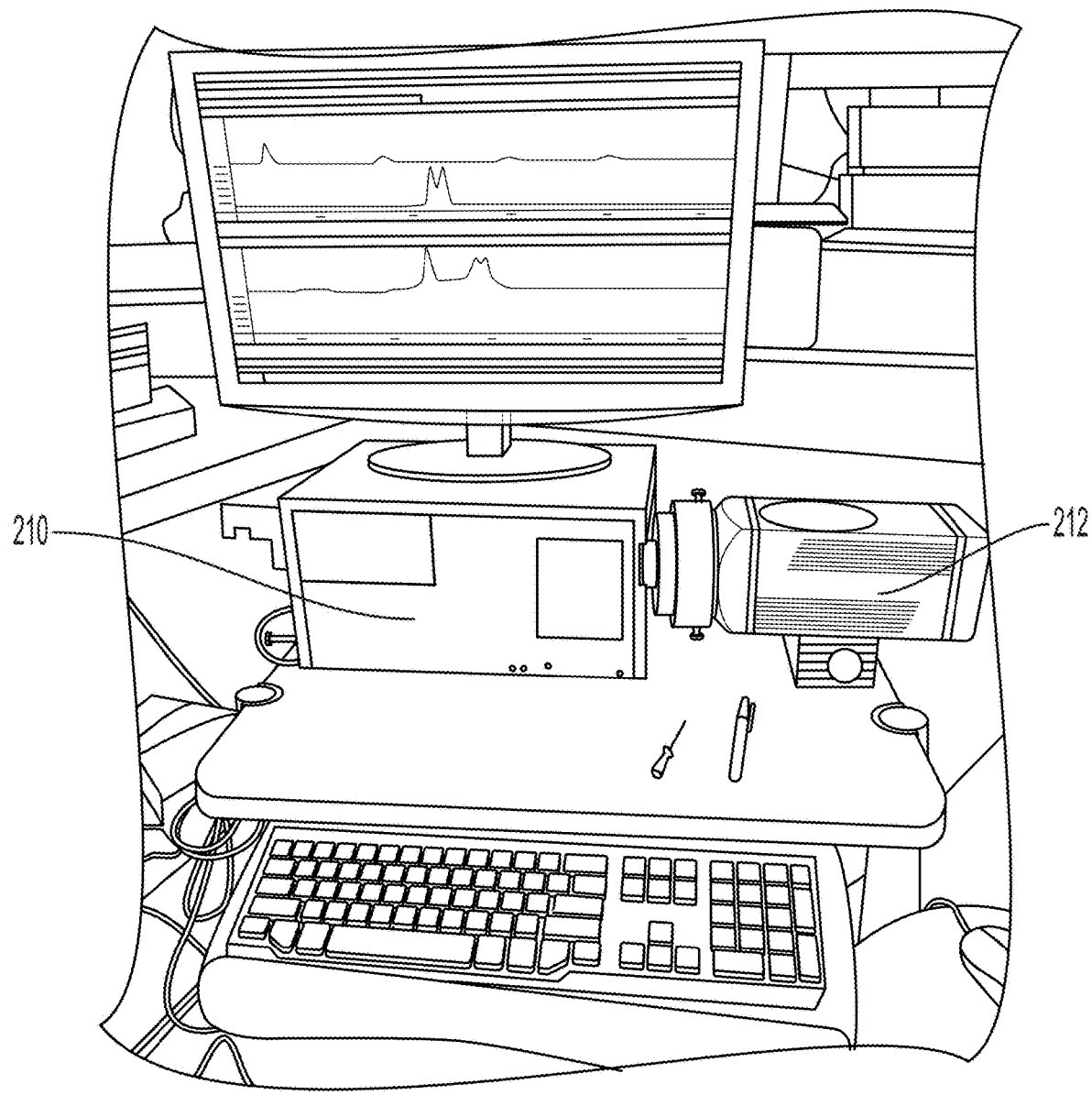
FIG. 2 is a photograph and shows a non-limiting example of a spectrograph and detector system connected to a computer having a keyboard and a display screen.
Figure 3:
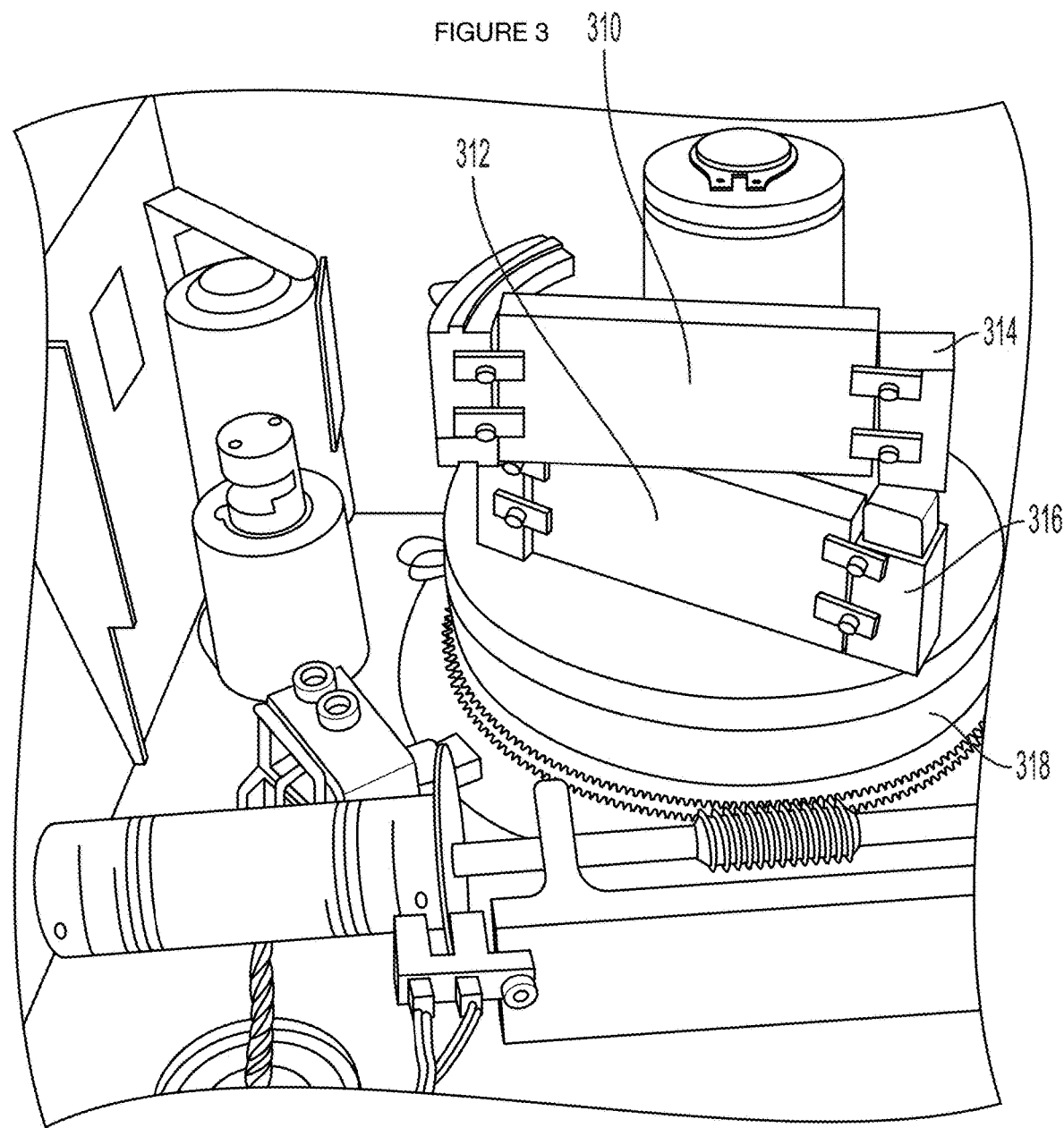
FIG. 3 is a photograph and shows a non-limiting example of hybrid grating and turret.
Figure 4:
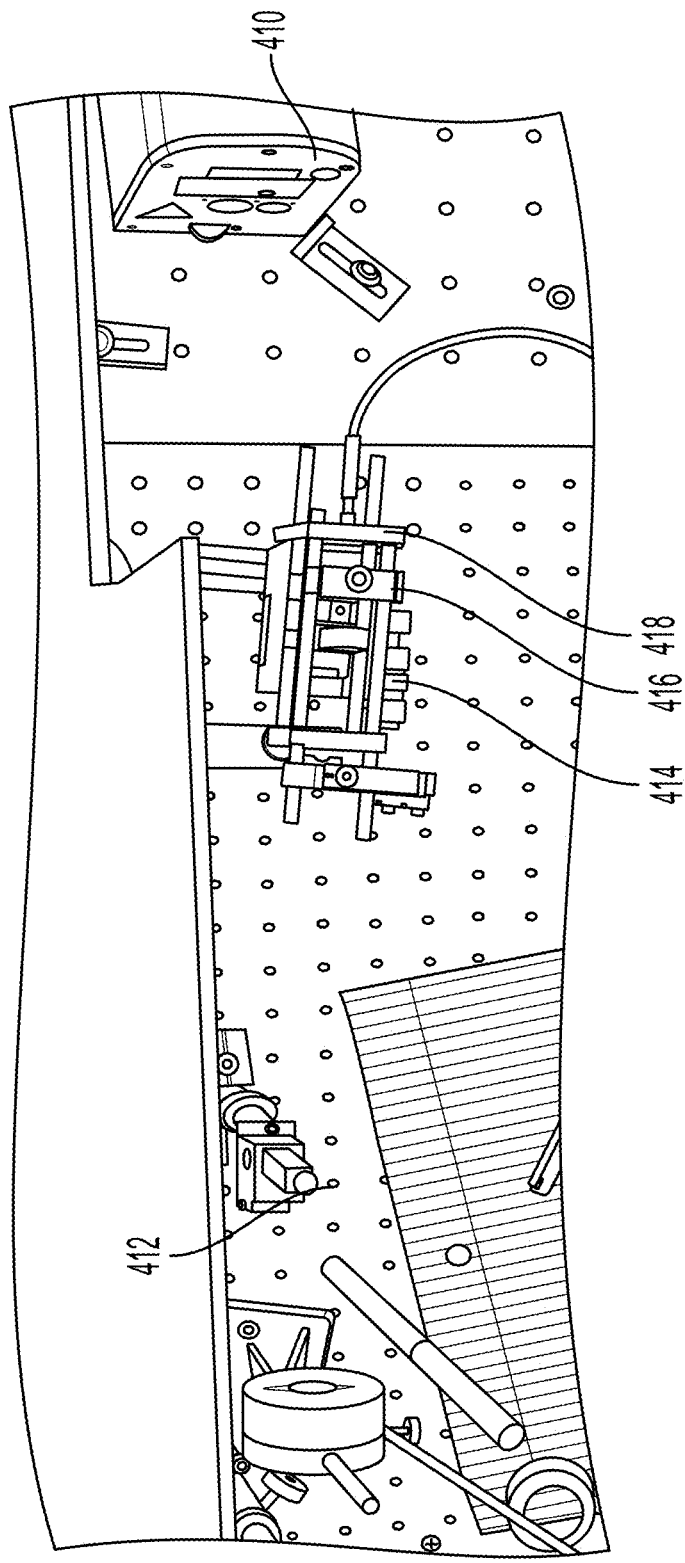
FIG. 4 is a photograph and shows a non-limiting example of collection optics and sample compartment layout

A computer controlled spectrograph and detector system is shown in FIG. 2. The designed hybrid grating system mounted inside the Acton spectrograph is shown in FIG. 3. The sample compartment and the collection optics showing the stand-off optical arrangement in the ~180° backscattered configuration are shown in FIG. 4. Notice that the laser table has tapped mounting holes on 1-inch centers which can be used to estimate the scale of the apparatus.

The present invention provides Raman spectral measurements with sensitivities and resolutions commensurate with what could be expected for original spectrographs when operated under normal (non-hybrid) conditions. Target specifications include 10 $cm^{-1}$ resolution with sensitivities capable of identifying the strongest transitions of a known analyte during a single laser pulse. Combinations of laser pulses, and different pulse powers are also provided.

In one non-limiting example, a 266 nm laser rejection filter is used prior to the fiber bundle to block scattered excitation. A 420 nm cut-off filter is used in front of the visible grating to block second order scatter. A 532 nm notch is sometimes used; the commercially available filter absorbs at 266 nm extensively such that it is less than optimal for dual wavelength work.

The typical setup uses two different 25×50 mm gratings stacked in a hybrid set. For the dual wavelength data shown, a 600 gr/mm 500 nm blazed grating is used to collect the visible spectra while a 1800 gr/mm blazed at 250 nm is used to collect the UV spectrum. The difference in groove density, and thus dispersion at these two wavelengths, is needed to insure spectral coverage of the detector array at the individual wavelengths used. In this configuration, the top section of the detector array contains UV data while the bottom contains visible data.

Figure 5:
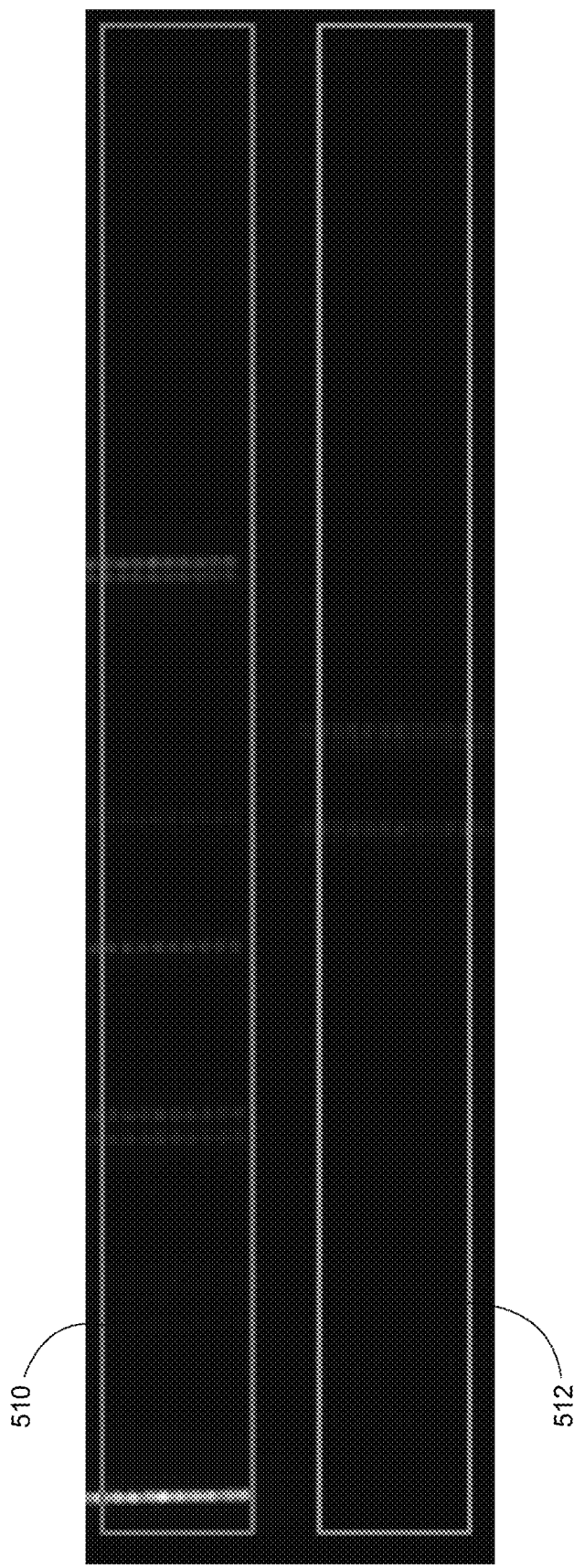
FIG. 5 is a photographic image and shows a non-limiting example of a detector array image.

The image of the detector array is shown in FIG. 5 which also displays the region of interest (ROI) for the two spectral regions (blue box—UV ROI, red box—visible ROI). As can be seen in FIG. 5, the wavelength separated images of the individual fibers are observed. Each spectral image should contain 19 individual fibers. Only ~10 are included in the ROI in each case because of detector size constraints. The remaining fiber images are off the top (or bottom) of the detector and their intensity is lost. The use of a larger detector as described herein may increase the detector efficiency.

The output of the fiber is then dispersed onto the convex collection mirror inside the spectrograph and collimated toward the hybrid grating stack. The collimated beam can be 25 to 200 mm in diameter or more depending upon the manufactures specifications. Customized sizing of gratings is required to optimize the diffraction efficiency through choice of grating size (both width and height) as well as blaze wavelength and density. Selection of individual grating components to make up the hybrid grating stack is contemplated as within the scope of the invention.

It is also contemplated as within the scope of the invention to use VPH transmission gratings. The gratings work much like conventional surface relief reflection gratings, except in transmission. They are periodic phase structures, whose fundamental purpose is to diffract different wavelengths of light from a common input path into different angular output paths. The phase of incident light is modulated as it passes through a volume of the periodic phase structure, hence the term "Volume Phase".

Example—Cyclohexane

Figure 6:
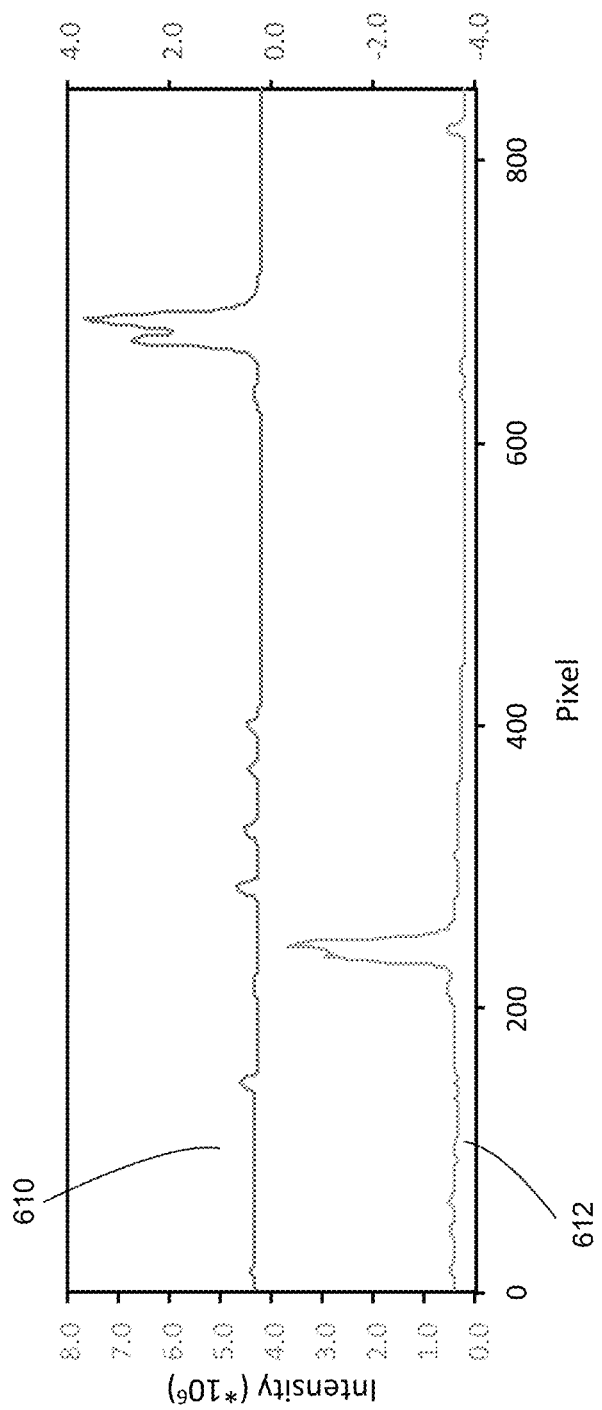
FIG. 6 is a line graph and shows a non-limiting example of Rayleigh-filtered Raman scatter from cyclohexane using both 266 nm (blue trace) and 532 nm (green trace) light to excite the sample. Axis labels are the color of the spectrum they represent.

Cyclohexane has been studied extensively and is used as a standard in Raman spectroscopy cross-section studies. A set of spectra obtained after excitation of a sample of cyclohexane in a quartz cuvette with 12 mJ total laser power (3 mJ at 266 and 9 mJ at 532 nm) is shown in FIG. 6. The blue trace is obtained by summing the columns of pixels within UV spectral ROI while the green trace is the sum of the pixel columns in the visible ROI. Signal to noise in both of these spectra is excellent. The major bands in the visible spectrum are in fact UV signal 2nd-order diffracted into the visible region. When a 420 nm cut-off filter is added in front of the visible grating to block the UV components, the visible spectrum is revealed (FIG. 7, blue trace).

Figure 7:
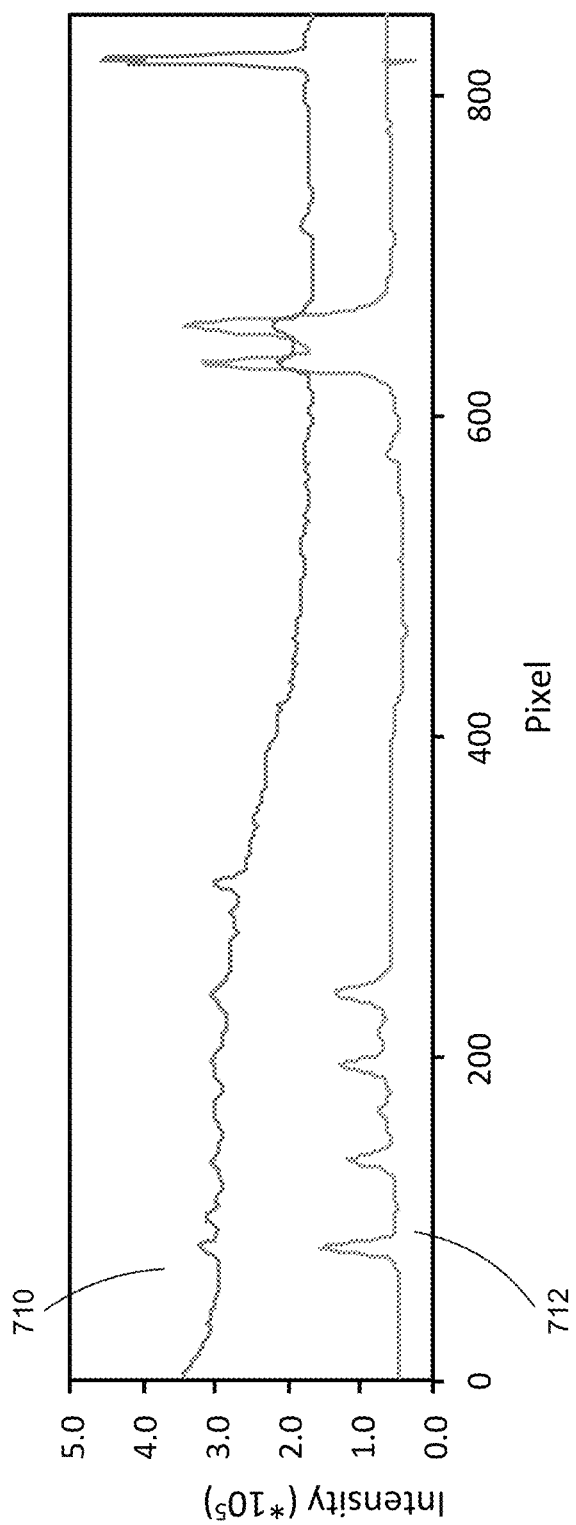
FIG. 7 is a line graph and shows a non-limiting example of Rayleigh-filtered (blue trace) and Rayleigh- and UV filtered (green trace) 532 nm Raman scatter from cyclohexane. Both 266 nm and 532 nm light were used to excite the sample but only the visible components are shown.

As seen in FIG. 7 with the addition of the UV filter, there remains a significant background contribution from stray Rayleigh scatter to the observed intensity. The green trace is obtained when a 532 nm laser rejection filter is placed before the collection optics. This rejection filter also absorbs light of wavelengths below 300 nm thus eliminating both the second order scatter and the excessive background due to stray Rayleigh from the observed spectrum. Comparison between the 266 nm and 532 nm spectra reveals that the UV spectrum is more intense by more than an order of magnitude. The theoretical v4 dependence of scattering cross-section provides a factor of between 16-20 increase. Given that the UV excitation pulse is lower intensity than the visible and that the spectrograph is less sensitive to the visible than it is to UV, it is clear that UV excitation is more effective in observing the Raman spectrum of this analyte.

Example—Acetonitrile

Figure 8:
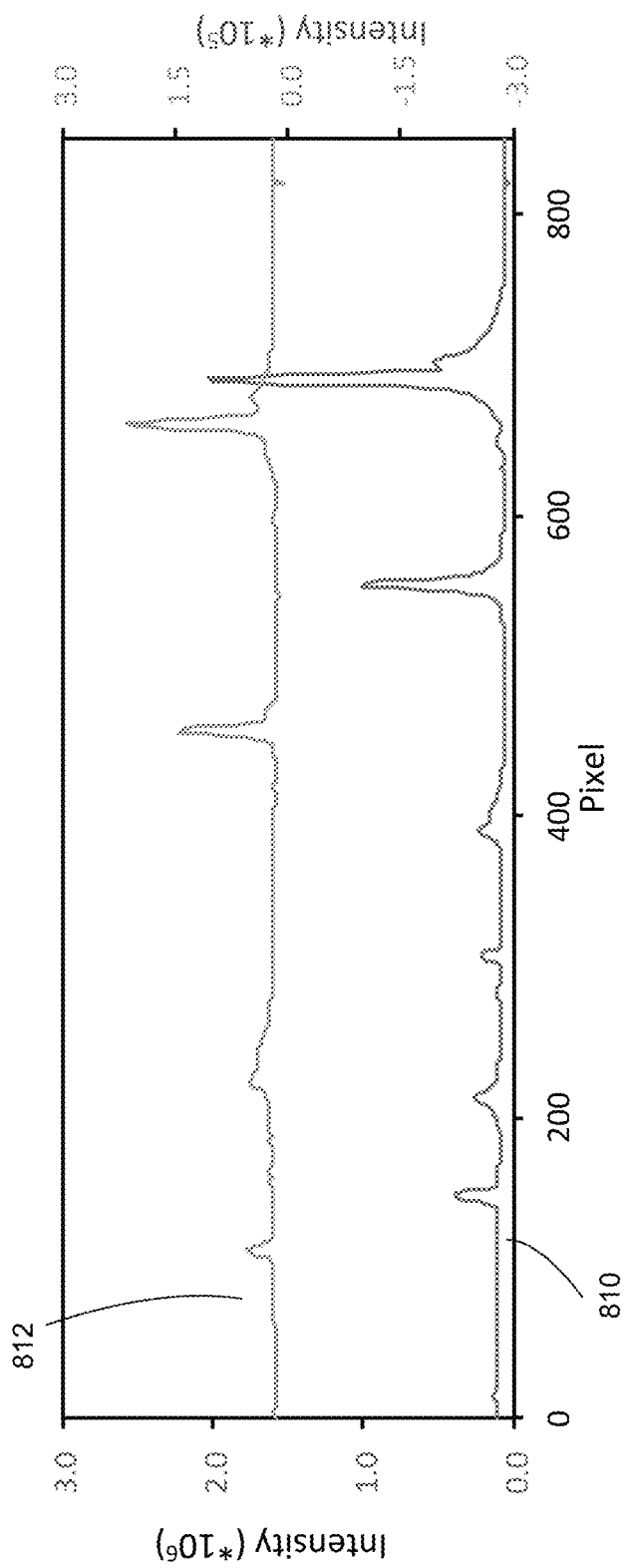
FIG. 8 is a line graph and shows a non-limiting example of Rayleigh-filtered and UV unfiltered 266 nm Raman spectrum (blue trace) and laser rejection filtered Raman spectrum (green trace) 532 nm Raman scatter from acetonitrile.

Similar spectra are collected for acetonitrile as shown in FIG. 8. The figure includes the 266 nm Raman spectrum along with the 532 nm laser rejection filtered visible spectrum. Note that the difference in observed intensity between the two spectra is again an order of magnitude. Clearly, for samples that do not absorb at 266 nm or 532 nm the increase in scattering cross-section for UV excitation makes 266 nm the excitation wavelength of choice.

Example—Acetone

Figure 9:
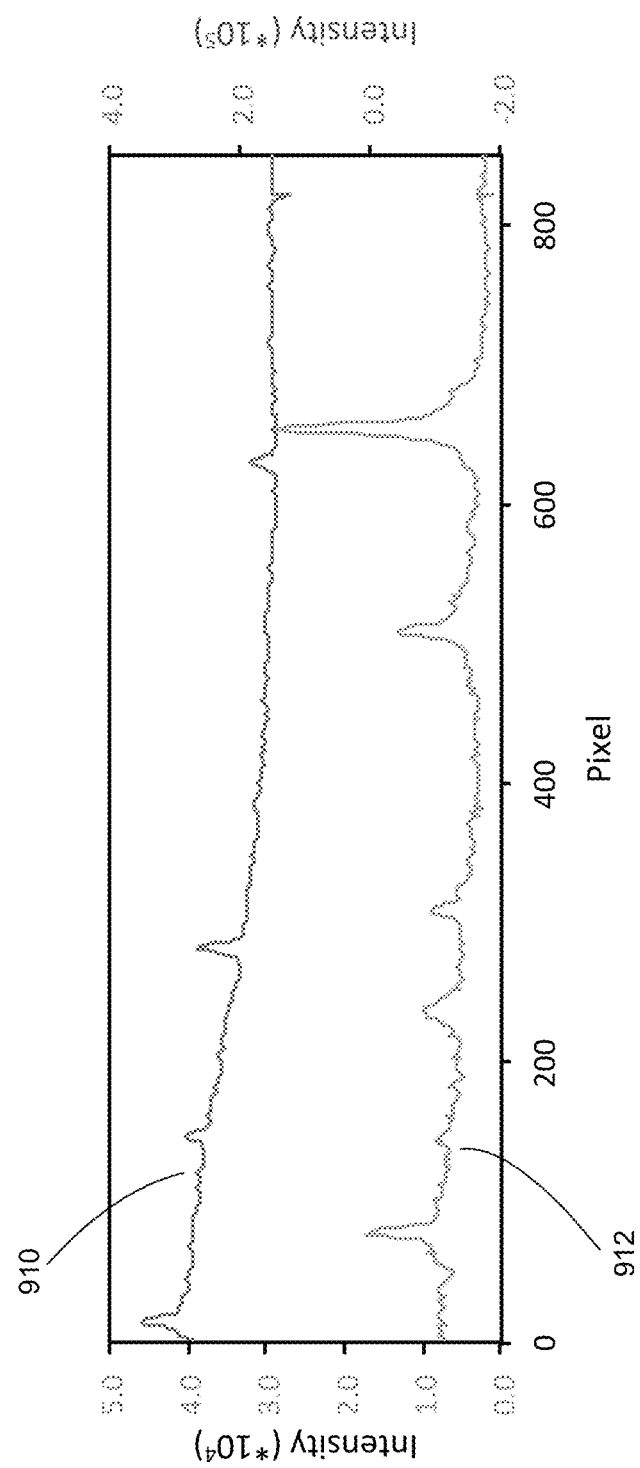
FIG. 9 is a line graph and shows a non-limiting example of Rayleigh-filtered and UV unfiltered 266 nm Raman spectrum (blue trace) and laser rejection filtered 532 nm Raman scatter (green trace) from acetone.

The feasibility of using UV excitation on samples that absorb in this region (i.e., aromatic materials, ketones, etc.) is tested by measuring the Raman spectra at both 266 and 532 nm for acetone. The acetone spectrum is shown in FIG. 9. It is clear from the set of spectra that the 266-nm excitation does not allow a discernible spectrum to be recorded while the 532-nm spectrum is recorded with relative ease. For this solvent, the absorption of both the excitation pulse and the scattered wavelengths within the sample is a concern when UV excitation is used. The possibility of absorption is of no concern for the visible spectrum because the material does not absorb at these wavelengths. Thus, even with the nearly 20 fold decrease in scattering cross-section, the 532-nm excitation Raman spectrum is much more easily observed than the same spectrum taken using 266 nm laser pulses.

Example—Toluene

Figure 10:
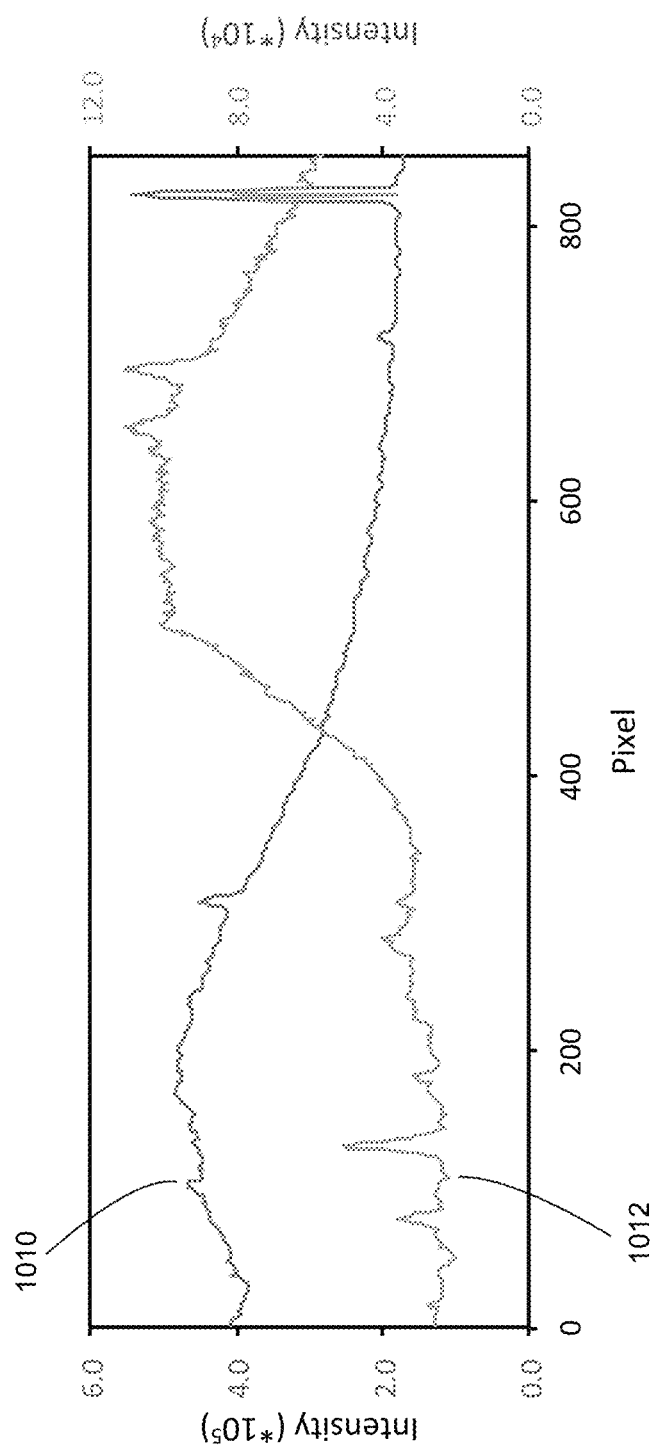
FIG. 10 is a line graph and shows a non-limiting example of Rayleigh-filtered and UV unfiltered 266 nm Raman spectrum (blue trace) and laser rejection 532 nm Raman spectrum (green trace) from toluene.

An additional example of absorbing material is included in FIG. 10 where toluene spectra are displayed. Examination of the blue trace shows that 266-nm excitation does not allow a discernible spectrum to be recorded in this case, similar to what is observed for acetone described above. Significant fluorescent background conspires with absorption to hide the weak Raman signals when 266 nm light is used. Here again, the 532 nm spectrum is recorded with ease, although a significant 2nd order diffraction of the ultraviolet emission signal is observed through the visible notch filter. Additional internal filtering may be used to remove artifact signal from the trace; it is shown in this case as a illustration of this potential problem.

Clearly, when absorption of the excitation pulse and scattered signals is significant, even with the increase in scattering cross-sections in the ultraviolet and the potential for resonance enhancement that approaching an absorptive transition implies, the visible scatter is more easily observed in practice. The difference in penetration depth is not compensated by the increase in scattering cross-sections. Solid samples have limited penetration depths due to particle scattering and thus may exhibit different behavior than observed in the case of liquids.

Example—Solid Samples

Figure 11:
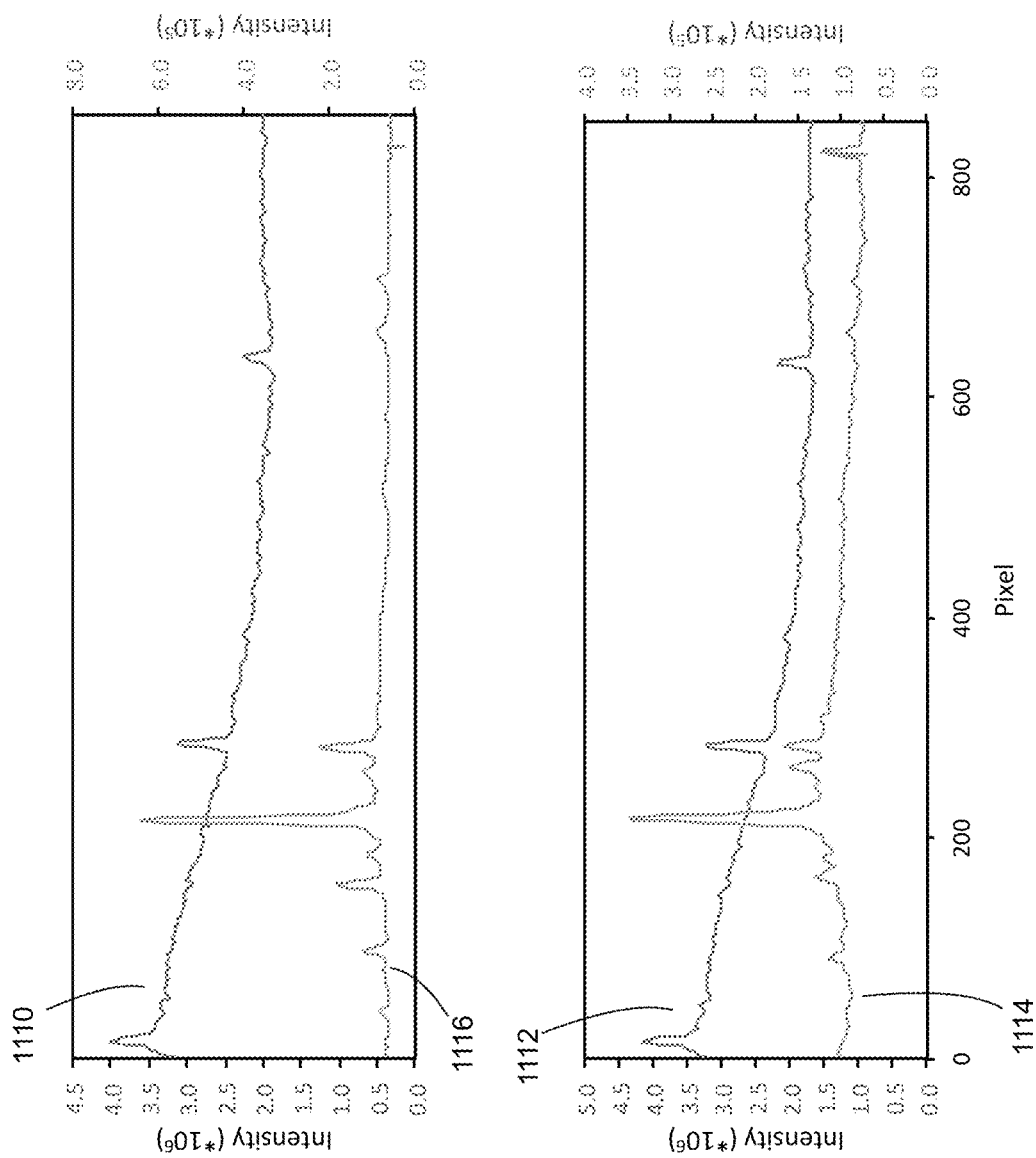
FIG. 11 is a line graph and shows a non-limiting example of Rayleigh-filtered and UV unfiltered 266 nm Raman spectrum (blue traces) and laser rejection filtered 532 nm Raman spectrum (green traces) from nitroaromatic solids. Top set are for 4-nitrotoluene while the bottom set are for 2,4-dinitrotoluene.

Solid samples of 4-nitrotoluene and 2,4-dinitrotoluene are ground into fine powders and placed between quartz plates. Nitroaromatic materials have low fluorescent yields due to rapid photochemical deactivation processes making them good candidates to observe resonance enhancements. The resulting spectra are shown in FIG. 11. The 266 nm spectra do not contain Raman spectral information because of significant background luminescence which accumulates faster than the weak Raman signals; subtraction of the pair of UV spectra results in random noise with no discernible spectral peaks being observed. The visible spectra are far superior in this regard and very clean spectra with high signal to noise are readily recorded.

It is contemplated as within the scope of the invention that other commonly targeted similar compounds would also be readily detectable using the invention herein. For example, compounds such as trinitrotoluene (TNT), Pentaerythritol tetranitrate (PETN), Research Department Explosive (RDX), RDX-based explosives including C4 and Semtex, triacetone triperoxide (TATP), Composition B (a castable mixture of RDX and TNT), Urea Nitrate, and Tetranitronaphthalene (TENN) are well-known targets when detecting for explosive devices.

Figure 12:
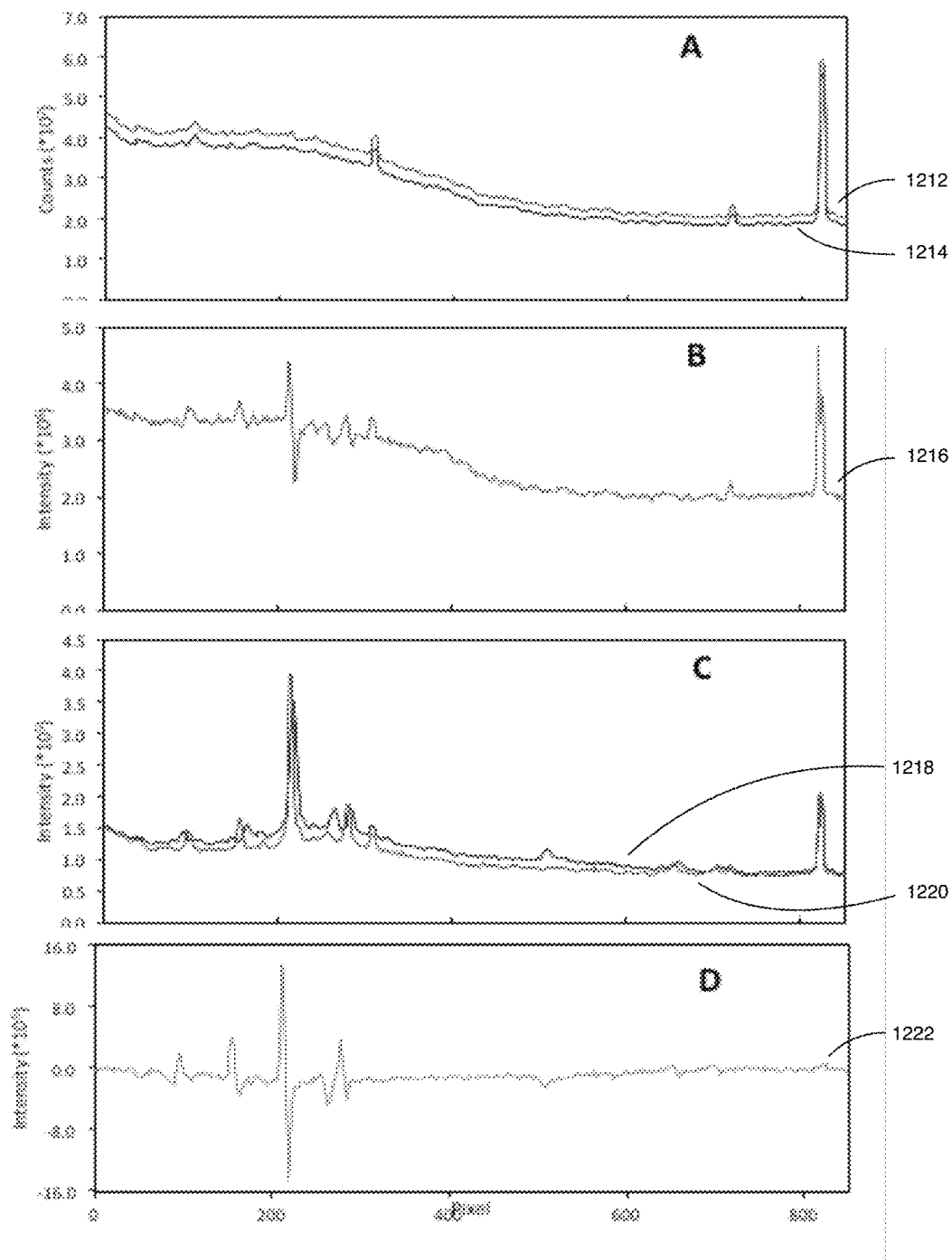
FIG. 12 is a line graph and shows a non-limiting example of UV filtered spectra of 4-nitrotoluene and 2,4-dinitrotoluene and shown in the top panel. Raman spectral information is included in these spectra as demonstrated by subtraction (panel B). Laser rejection filter allows the individual traces to be observed (panel C) and the subtraction of the two spectra shows direct similarity to the difference spectrum in panel B.
Figure 14:
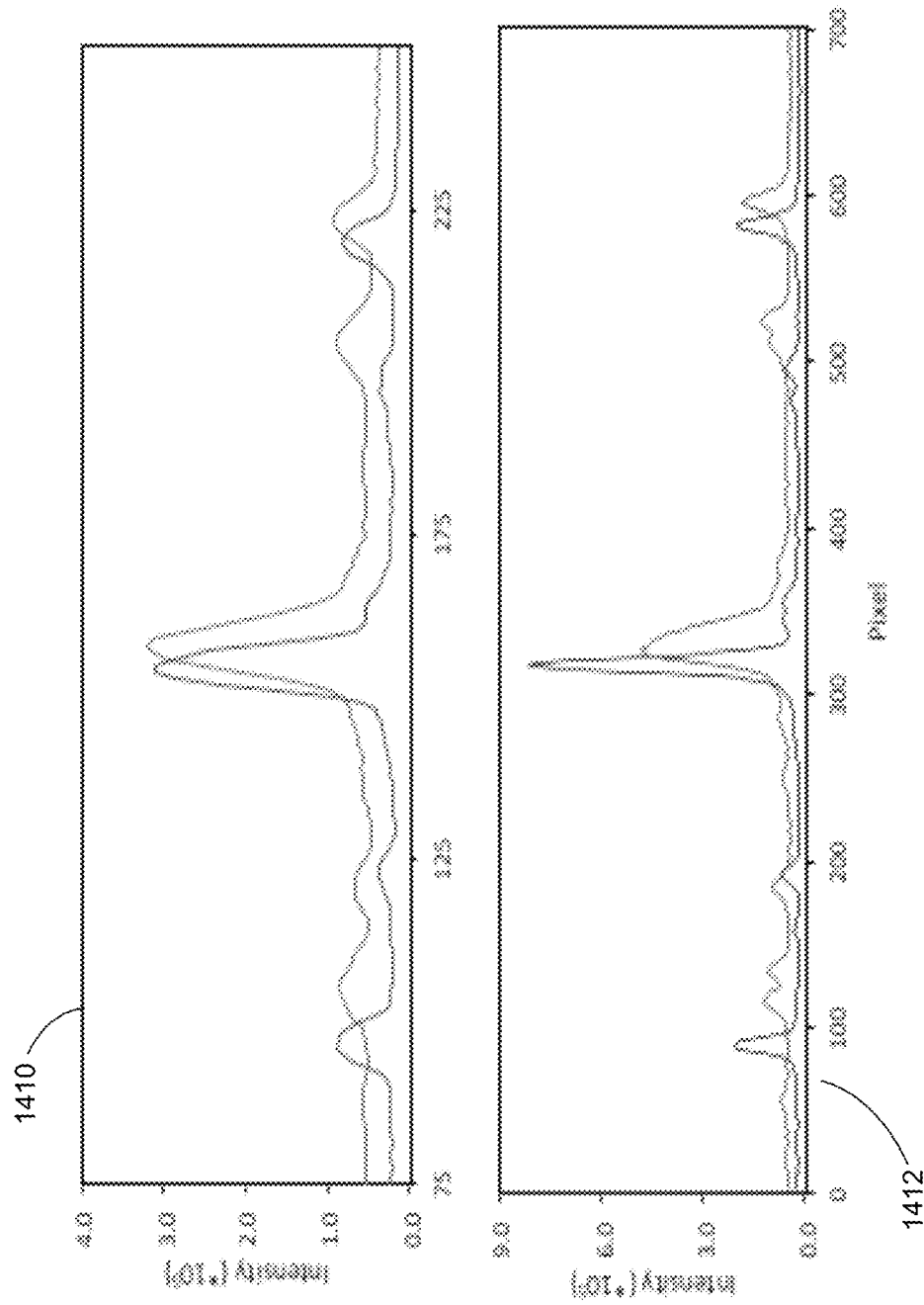
FIG. 14 is a line graph and shows a non-limiting example of Raman spectral comparison of 4-nitrotoluene and 2,4-dinitrotoluene taken at low resolution (A) and high resolution (B) for 532-nm excitation.
Figure 15:
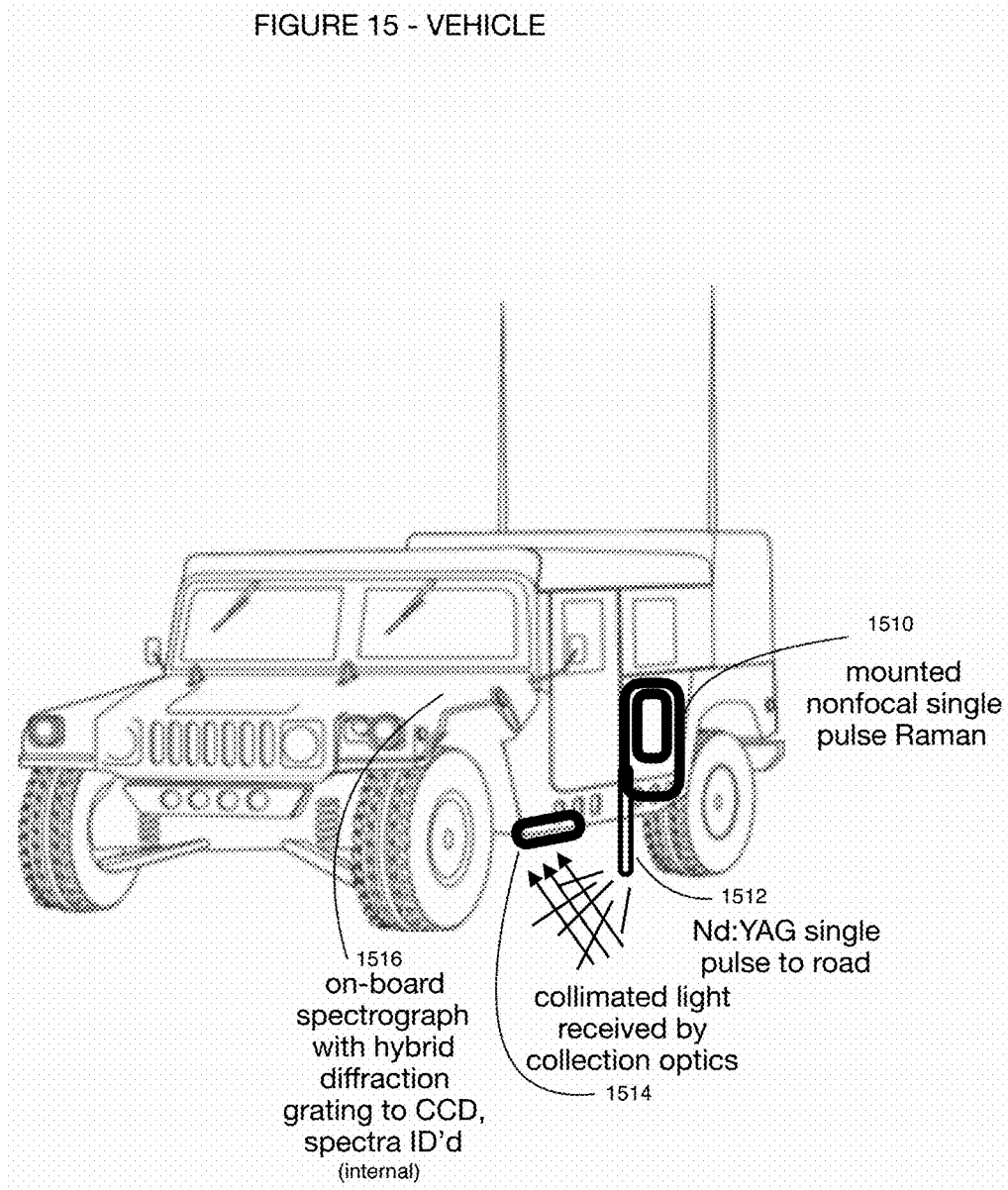
FIG. 15 is a line drawing and shows an illustration of an apparatus according to the present invention used in an application for detection of target compounds from a moving vehicle.

Referring now to FIG. 12, to highlight the difference between visible and UV spectral accumulation, the following series of spectra are presented FIG. 14. The visible laser rejection notch filter is removed and stray Rayleigh from the laser is accumulated on the detector along with weak Raman scatter. A 420 nm cut-off filter is placed within the spectrograph to remove the 2nd order scatter (FIG. 12, top). The resulting spectra have significant background intensities and it is difficult to see Raman transitions in the individual spectra. Subtraction of the two spectra allows removal of the stray light components leaving behind the weak Raman spectra as a difference spectrum. When the visible laser rejection notch filter is replaced in the system, clear spectra are again observed, although it is not possible to record the UV spectra in this configuration. However, the difference spectrum obtained by subtraction of the two visible spectra confirms that the recovered spectra are authentic and that the invention collects both UV and visible spectra simultaneously.

Dual Resolution Spectroscopy

If the entire Raman spectrum is to be recorded (~4000 $cm^{-1}$), the resolution must be relatively low (>10 $cm^{-1}$). The fundamental Raman bandwidth for solids and liquids at room temperature is on the order of 3-5 $cm^{-1}$, thus setting the high limit of resolution to be ~4 $cm^{-1}$. In the past, the choice was to record only a fraction of the entire Raman spectrum at high resolution or to collect the entire spectrum at low resolution. Information is lost in either case.

In the present invention, a hybrid grating turret is arranged to have two visible gratings of different grove density, allowing two individual spectra to be observed simultaneously. Specifically, the high resolution spectrum was recorded using a 1800 gr/mm grating while the lower resolution spectrum is recorded using a 600 gr/mm gating. The blaze wavelength is 500 nm for both gratings.

Figure 13:
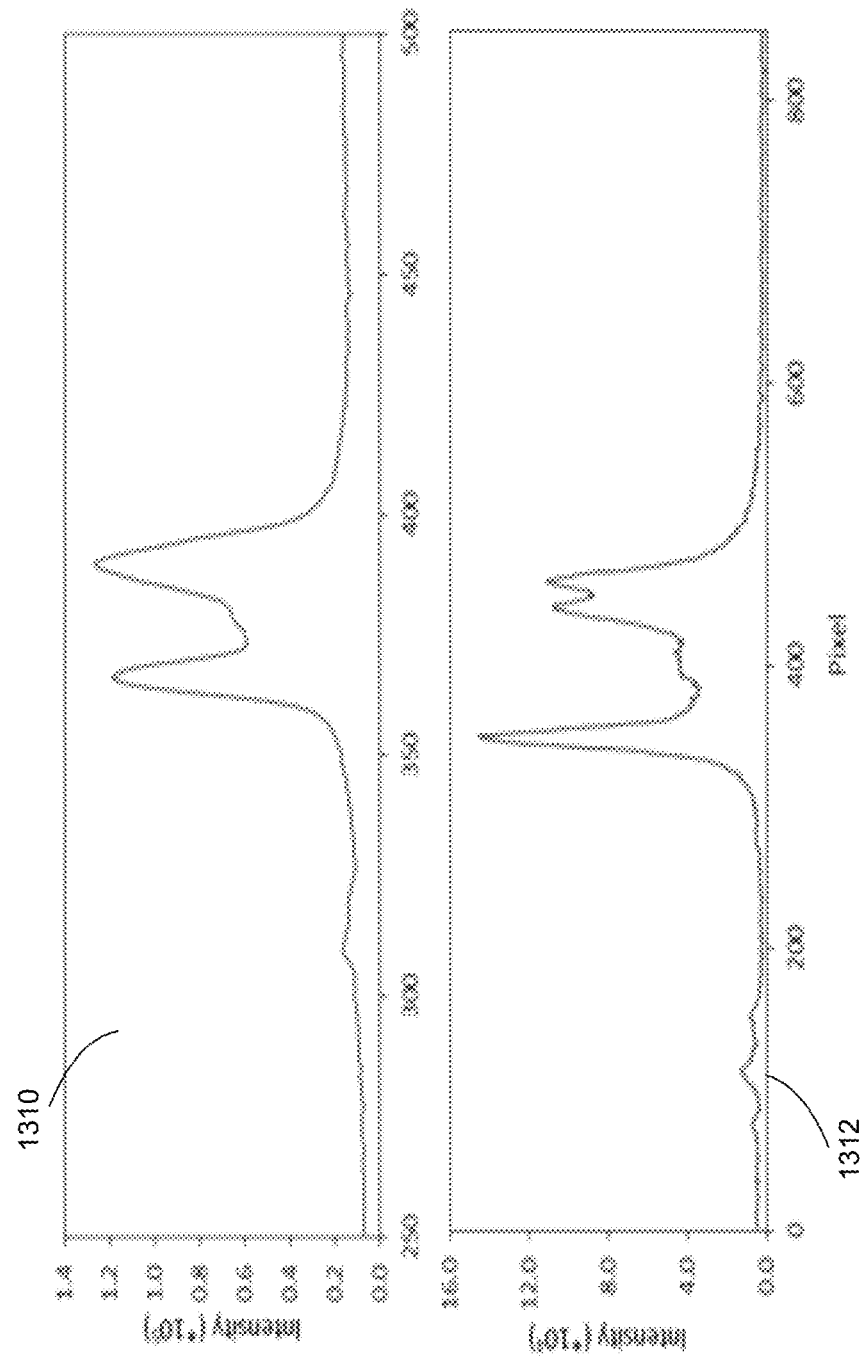
FIG. 13 is a line graph and shows a non-limiting example of unfiltered 266 nm Raman spectra of cyclohexane C-H stretching region taken at low resolution (A) and the same spectral region taken at high resolution (B).

FIG. 13 compares the high and low resolution spectra for cyclohexane. Notice the band shapes change significantly with more structure observed in the high resolution spectrum. Slight improvements in the high resolution spectrum is observed when a 2400 gr/mm grating is utilized. The trade off is in the fraction of the total Raman spectrum recorded.

The low resolution spectrum includes only 250 pixels of the 925 pixels that were recorded within the ROI accounting for nearly 2500 $cm^{-1}$ of the Raman spectrum. The entire high resolution spectrum consisting of 925 pixels is shown in FIG. 13, accounting for less than 800 $cm^{-1}$ of the entire Raman spectral range. At high resolution, at least four more spectra are required to collect the entire Raman spectrum.

In FIG. 14, turning to the nitroaromatic solids, the low resolution spectra share very similar characteristics. Previously, the major $NO_2$ antisymmetric stretch is characteristic for substituted nitroaromatics and the spectrum includes a single band for the 4-nitrotoluene and a pair of bands for the 2,4-dinitrotoluene for this transition. In the present invention, low resolution spectra have significant overlap between the bands, and in both cases, the bands appear as single transitions. The high resolution spectra shown in the bottom panel of FIG. 14 illustrates that the dinitrotoluene spectrum (blue) shows overlapping transitions while the mononitrotoluene spectrum remains a single sharp transition. More information is available in the high resolution spectrum but only 25% of the entire Raman spectrum is included. The low resolution spectrum shows only a portion of the spectral region collected (only 250 of 925 pixels are shown).

To address an additional problem where distributing signal over multiple gratings decreases signal intensity due to dispersion in each grating, a factor proportional to the number of gratings used, the invention in another aspect increases the overall efficiency of light collection, coupling that light into the fiber, dispersing the fiber output into the hybrid grating stack correctly, and collecting the diffracted intensity fully in order to mitigate signal losses at the detector.

In this non-limiting embodiment, there is provided a unique optical collection configuration that allows the coupling of scattered light from a low intensity, high power, excitation source to be efficiently coupled into a collection fiber. High excitation pulse powers can be used while simultaneously avoiding sample degradation and multiphoton effects and alleviating the need for deep penetration depths; samples that are difficult to measure using excitation wavelengths can be studied. This optical collection configuration also avoids the need for accurate focal plane adjustments by collecting light from a large sample cross-section while simultaneously matching the collected light to the numerical aperture of the fiber bundle. Accordingly, rapid analysis of moving samples is achieved with unprecedented efficiency.

Once the Raman scatter is coupled into the fiber, it is dispersed into the spectrograph. In the current embodiment, 200 um fibers are used. The alignment of the 19 individual fibers into a stack serves the same purpose as an entrance slit on the spectrograph. Using 200 um fibers amounts to a 200 um slit adjustment. Larger numbers of smaller-diameter fibers would allow much higher resolution (smaller "slit" widths) while maintaining high through-put.

In another embodiment, smaller diameter fibers are incorporated in the fiber bundle. The optimal fiber diameter will depend upon the detector pixel size. The detector pixel size of the system used in this study is ca. 25 µm; the standard pixel size for current detector systems is 14 µm. Matching the fiber diameter to the pixel size will optimize both resolution and collection efficiency. While the relationship between pixel size and recorded signal is complex, it is clear that collecting the entire signal on a single detector pixel will be more efficient than dispersing the same signal over multiple pixel units. An increase in the efficiency of more than an order of magnitude can be expected.

The output of the fiber is then dispersed onto the collection mirror inside the spectrograph and collimated toward the hybrid grating stack. The collimated beam is 70 mm in diameter, but could range from 25 mm to 150 mm. Customizing the grating size to optimize the beam is contemplated as within the scope of the invention.

After diffracting off of the grating stack, the signal intensity is dispersed through a solid angle that will depend upon parameters such as wavelength of interest, the blaze angle, and the groove density. Selecting these parameters to match the needs of the environment is important in optimizing the efficiencies of spectrograph. Custom gratings are contemplated as within the scope of the invention to optimize these parameters to match the data collection needs while also obtaining the correct size of grating.

Accordingly, a single-pulse stand-off Raman spectroscopy system using several excitation wavelengths is provided as a viable solution for detection of trace materials.

The operational utility of multi-wavelength and multi-resolution spectroscopy is demonstrated by collecting two different spectra simultaneously. The optical configuration used is shown to allow stand-off detection at distances of more than 10 meters, up to 40 meters. The spectra collected allow detailed evaluation of Raman scattering signatures for several classes of compounds within one laser pulse in both the UV and visible spectra regions. The systems provide at least four, and up to as many as eight, different spectra being collected simultaneously within a single laser pulse under stand-off conditions.

Identification

Once spectra are obtained, the apparatus can include identification software, such as RSIQ software, from Raman Systems, a business unit of Agiltron. The RSIQ software, and others like it, have a built-in library or have connectability to an online library of the Raman spectra of known materials, such as the one-click ID-Find program.

Referring now to FIGS. 15-18, FIG. 15 shows how an apparatus according to the present invention may be used in an application for detection of target compounds from a moving vehicle, such as a military personnel carrier like a "Hummer". An apparatus would be mounted on such a vehicle so that roadway or other surrounding surfaces could be accessed by the laser for Raman analysis. Target compounds in this example would be chemicals related to explosives.

Figure 16:
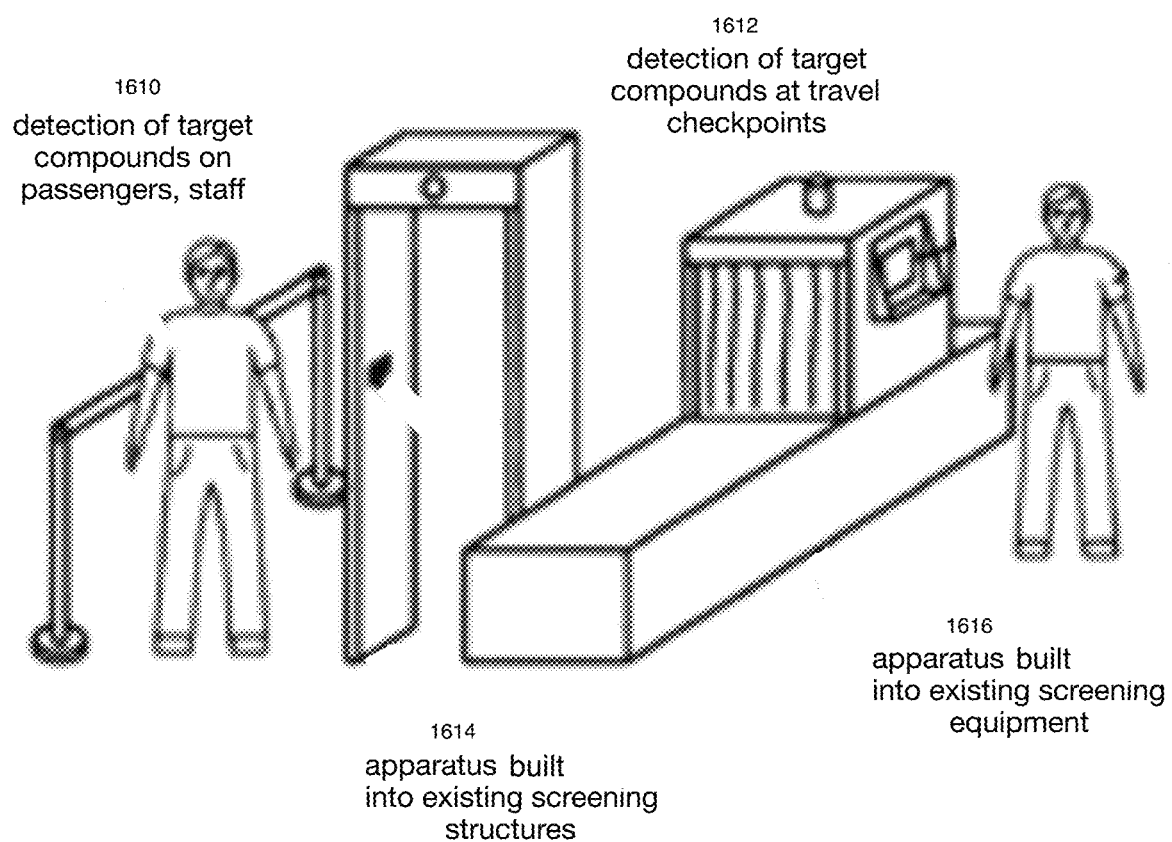
FIG. 16 is a line drawing and shows an illustration of an apparatus according to the present invention used in an application for detection of target compounds at a secure checkpoint such as an airport or other access-controlled facility.

FIG. 16 shows how an apparatus according to the present invention may be used in an application for detection of target compounds at a secure checkpoint such as an airport or other access-controlled facility. An apparatus according to the present invention could be mounted on a stationary platform, or could be used in a portable wheeled, or handheld device so that baggage, passengers, guests, or other surrounding surfaces could be accessed by the laser for Raman analysis. Target compounds in this example would be hazardous materials, biologicals, toxins, chemicals related to explosives, illegal drugs, weapons, or other contraband.

Figure 17:
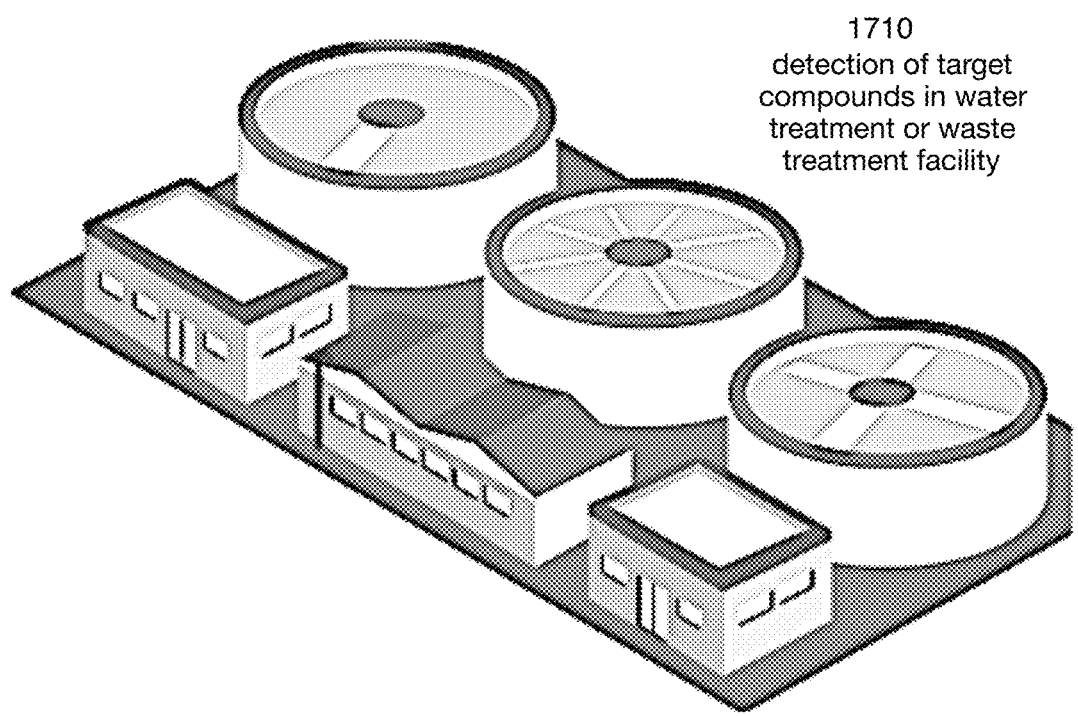
FIG. 17 is a line drawing and shows an illustration of an apparatus according to the present invention used in an application for detection of target compounds at a water treatment plant.

FIG. 17 shows how an apparatus according to the present invention may be used in an application for detection of target compounds at a water treatment facility or other utility. An apparatus could be mounted on a stationary platform, or could be used in a portable wheeled, or handheld device so that sample surfaces could be accessed by the laser for Raman analysis. Target compounds in this example would be chemicals related to toxins, contaminants, and so forth.

Figure 18:
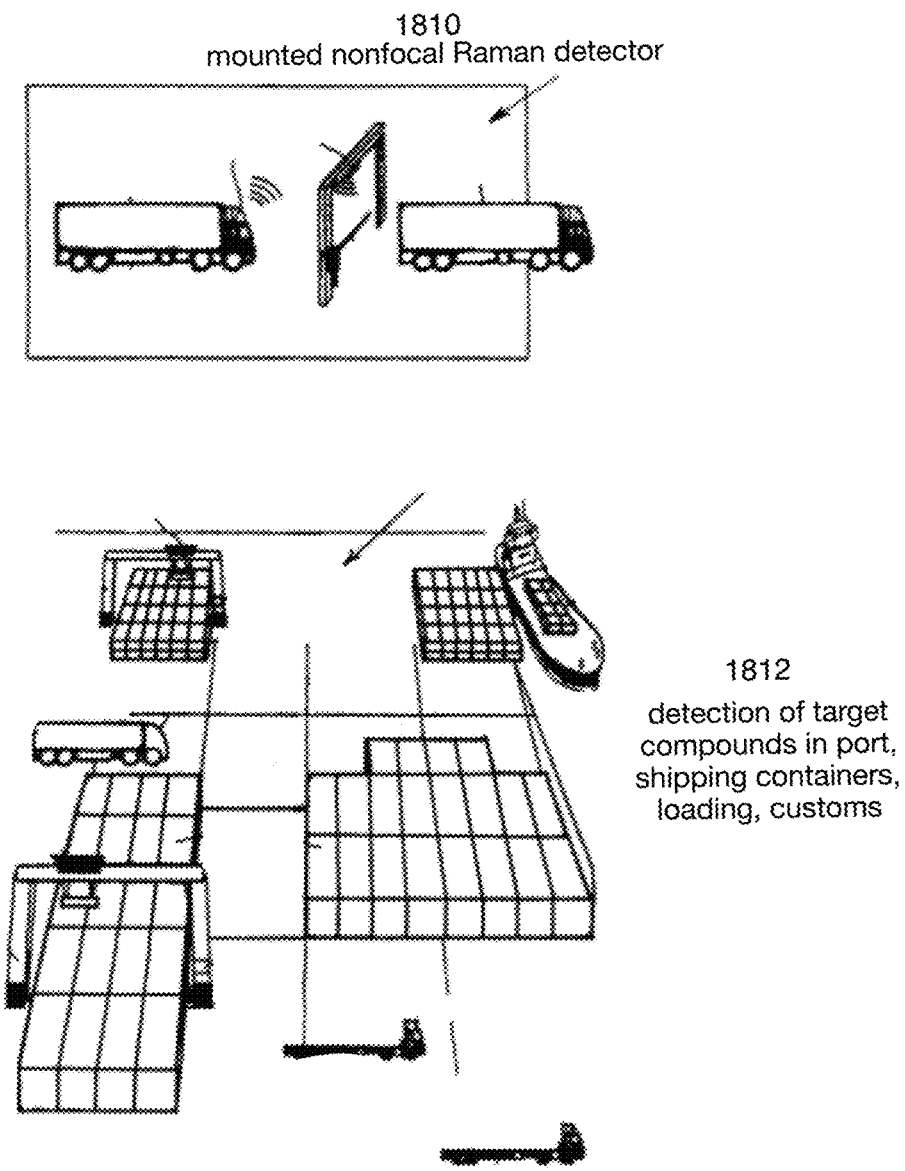
FIG. 18 is a line drawing and shows an illustration of an apparatus according to the present invention used in an application for detection of target compounds in shipping or transport.

FIG. 18 shows how an apparatus according to the present invention may be used in an application for detection of target compounds at a shipping or transportation hub, port or similar facility. An apparatus could be mounted on a stationary platform, could be used in a movable detector archway, a portable wheeled device, or a handheld device so that shipments, containers, trucks, storage, stevedors, passengers, visitors, or other surrounding surfaces could be accessed by the laser for Raman analysis. Target compounds in this example would be chemicals related to explosives, illegal drugs, weapons, or other contraband.

Figure 19:
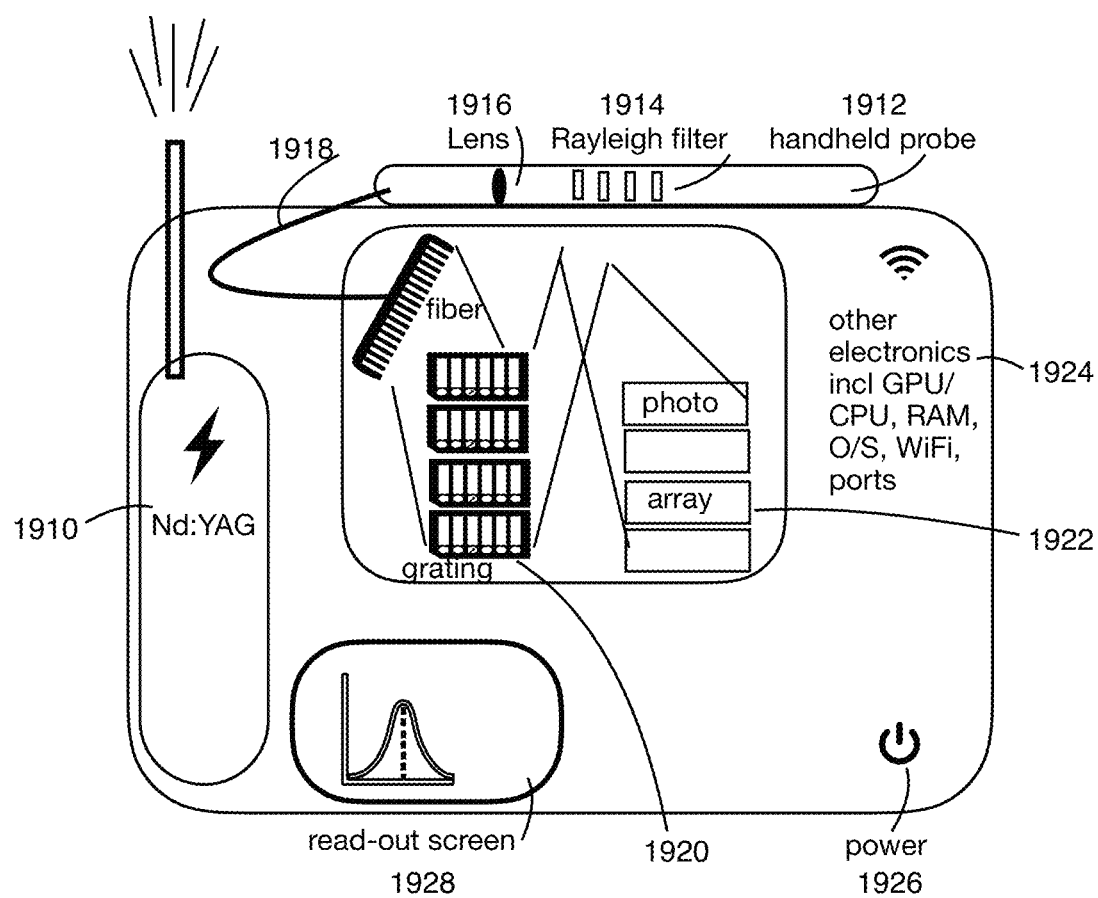
FIG. 19 is an illustration of a portable unit and shows how a portable unit contains a multi-wavelength laser source, a read-out screen, a handheld wand or probe containing the collection optics of the lens and Rayleigh filter, the spectrograph with fiber bundle, hybrid diffraction grating and dedicated photodetector array, along with accessory electronics for proper functioning.

FIG. 19 shows a portable unit containing a multi-wavelength laser source, a read-out screen, a handheld wand or probe containing the collection optics of the lens and Rayleigh filter, the spectrograph with fiber bundle, hybrid diffraction grating and dedicated photodetector array, along with accessory electronics for proper functioning.

Figure 20:
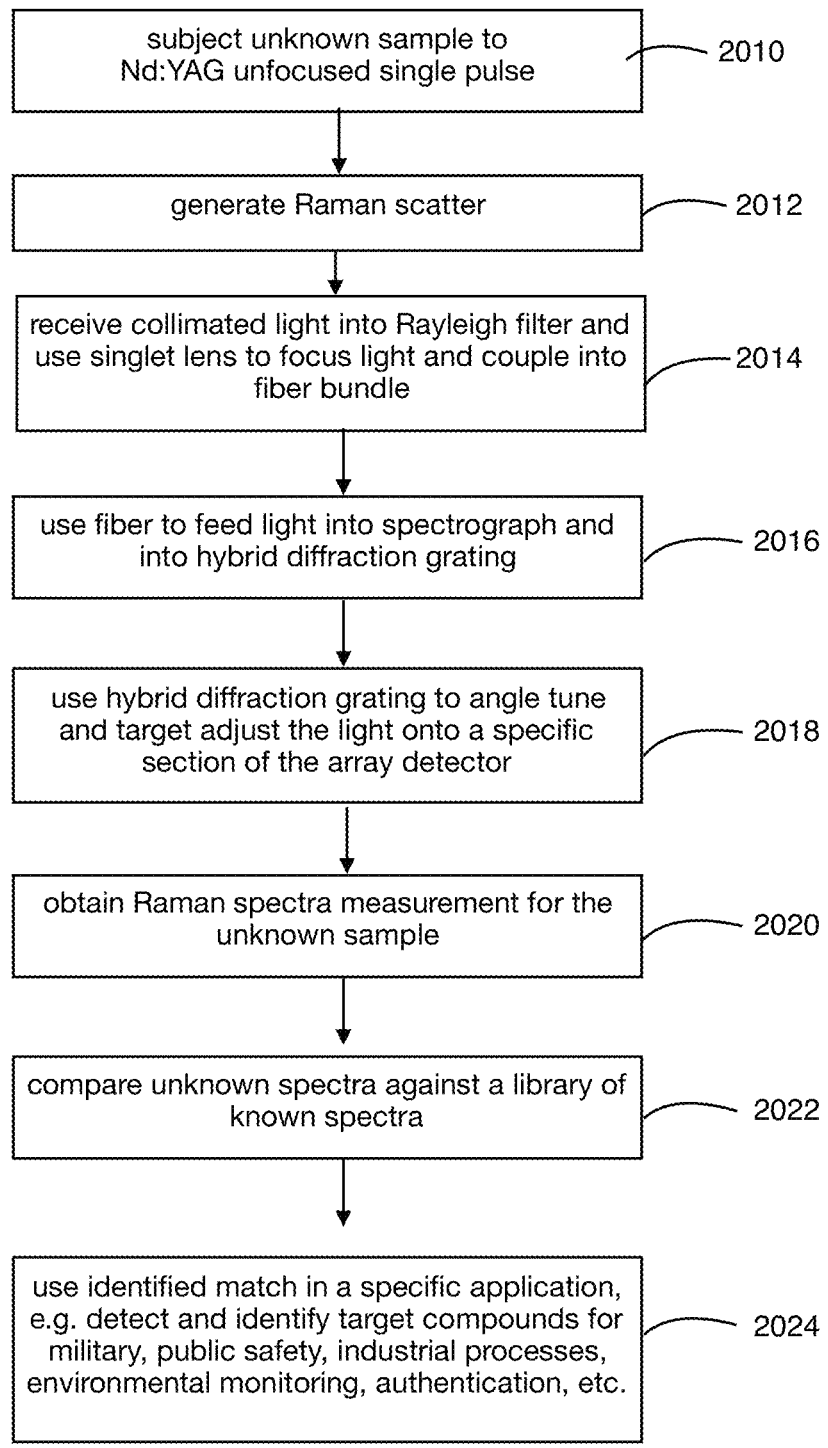

FIG. 20 shows an illustration of a multi-step process, including (i) subjecting an unknown sample to a laser unfocused single pulse, (ii) generating Raman scatter, (iii) receiving collimated light into the Rayleigh filter and using the singlet lens to focus the light and couple it to the fiber bundle, (iv) using the fiber to feed the light into the spectrograph and into the hybrid diffraction grating, (v) using the hybrid diffraction grating to angle tune and target adjust the light on a specific section of the array detector, (vi) obtaining Raman spectra measurements for the unknown sample, (vii) comparing the unknown spectra against a library of known (sample) spectra, and (viii) using the identified compound or match in a specific application, such as detecting and identifying target compounds for military, public safety, industrial processes, environmental monitoring, authentication, and so forth.

Additional Examples

Explosives

Figure 21:
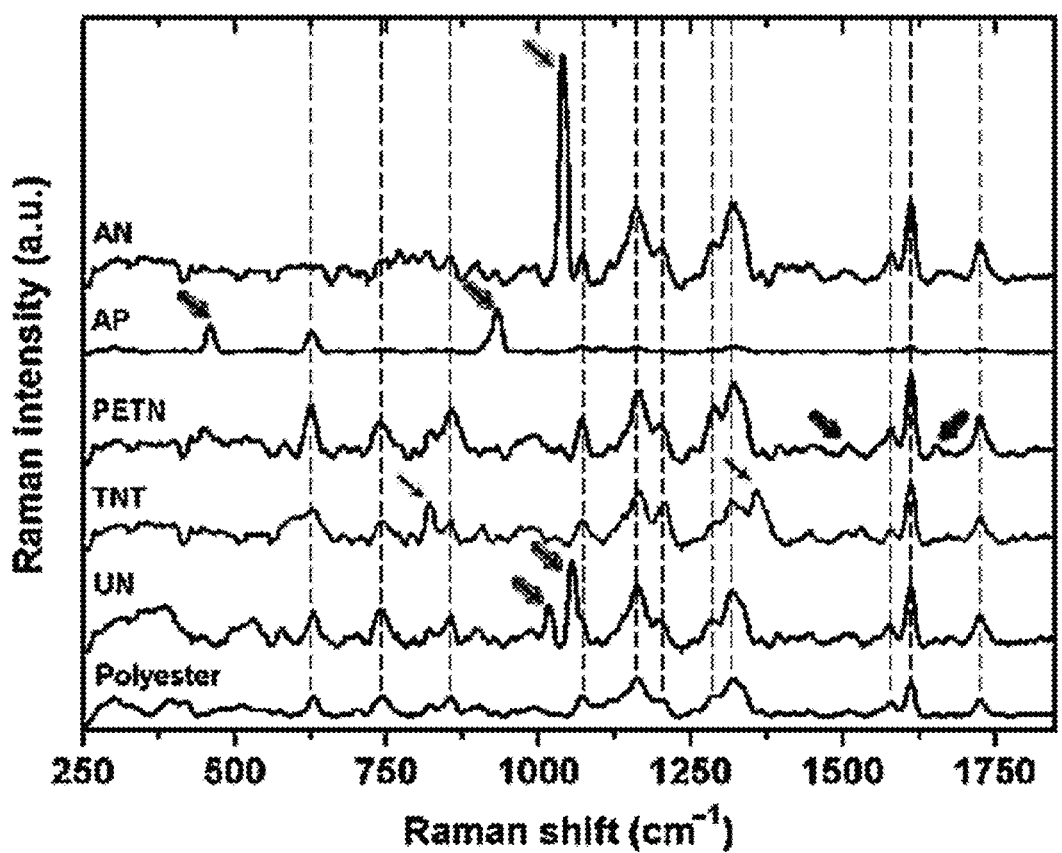
FIG. 21 is a line graph and shows a non-limiting example of Raman spectral measurement that may be performed for various types of explosives (ammonium nitrate-AN, triacetone triperoxide-AP, pentaerythritol tetranitrate-PETN, trinitrotoluene-TNT, urea nitrate-UN) on a polyester background for detection.

In this example, FIG. 21 illustrates how the user is attempting to identify an explosive. The apparatus of the present invention is used to perform a Raman spectral measurement of a sample, which is compared against Raman spectral measurement for various types of explosives (ammonium nitrate-AN, triacetone triperoxide-AP, pentaerythritol tetranitrate-PETN, trinitrotoluene-TNT, urea nitrate-UN) on a polyester background for detection.

Diamonds

Figure 22:
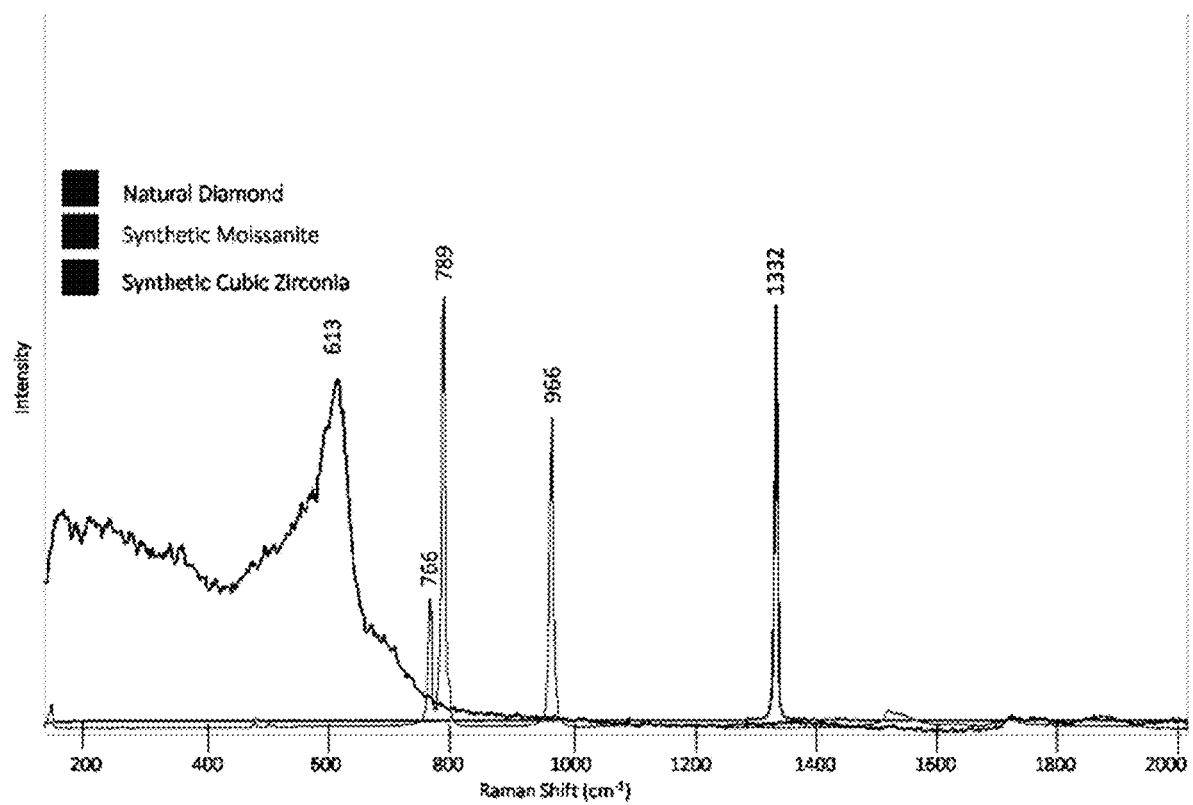
FIG. 22 is a line graph and shows a non-limiting example of Raman spectral measurement that may be performed for comparison of natural diamond, synthetic moissanite, and synthetic cubic zirconia.

In this example, FIG. 22 illustrates how the user is attempting to identify an explosive. The apparatus of the present invention is used to perform a Raman spectral measurement of a sample, which is compared against Raman spectral measurement for natural diamond, synthetic moissanite, and synthetic cubic zirconia.

Chemical Identification

Figure 23:
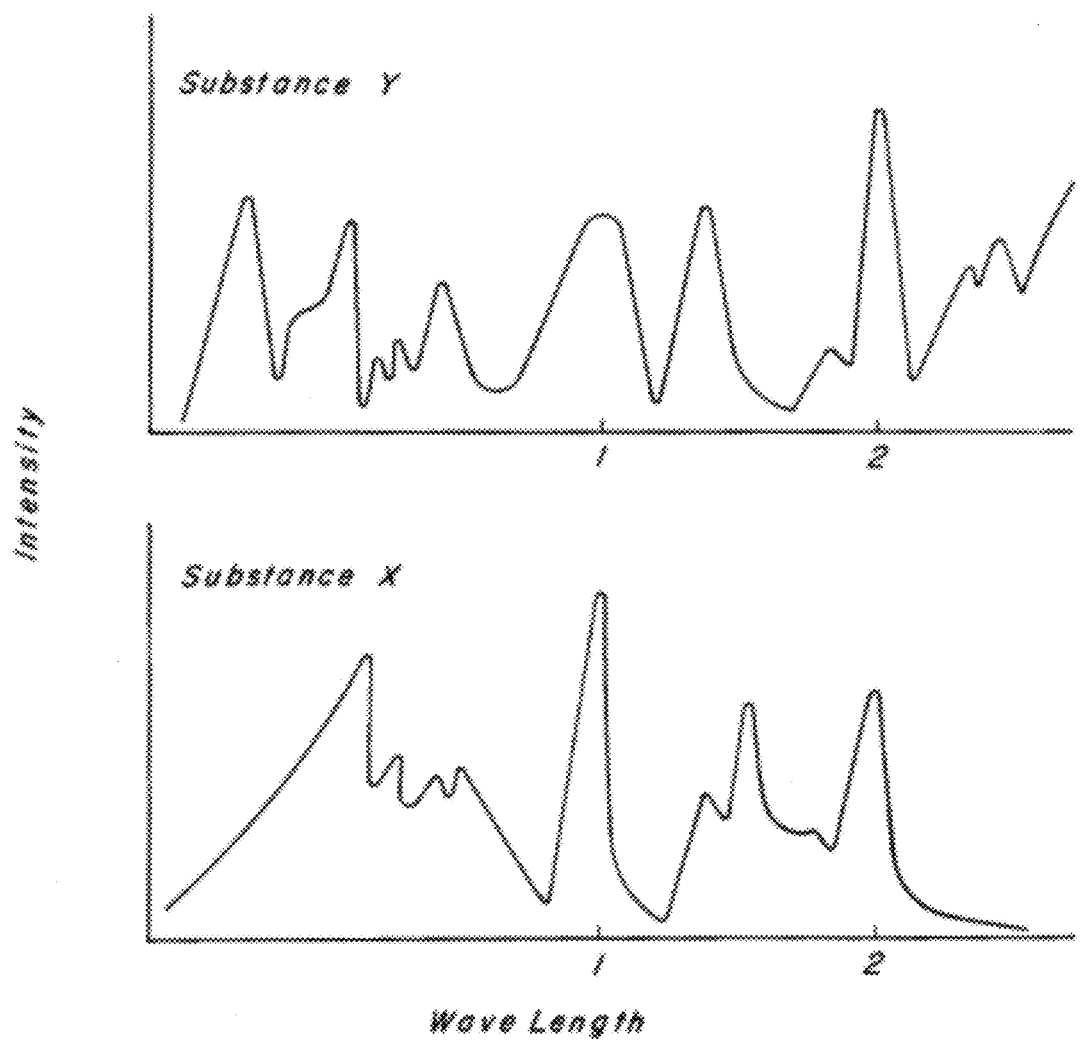
FIG. 23 is a line graph and shows a non-limiting example of Raman spectral measurement that may be performed for general identification of chemical species in, e.g. an industrial setting.

In this example, FIG. 23 illustrates how the user is attempting to identify an chemical species. The apparatus of the present invention is used to perform a Raman spectral measurement of a sample, which is compared against Raman spectral measurement for general identification of chemical species in, e.g. an industrial setting.

Drilling Fluids

Figure 24:
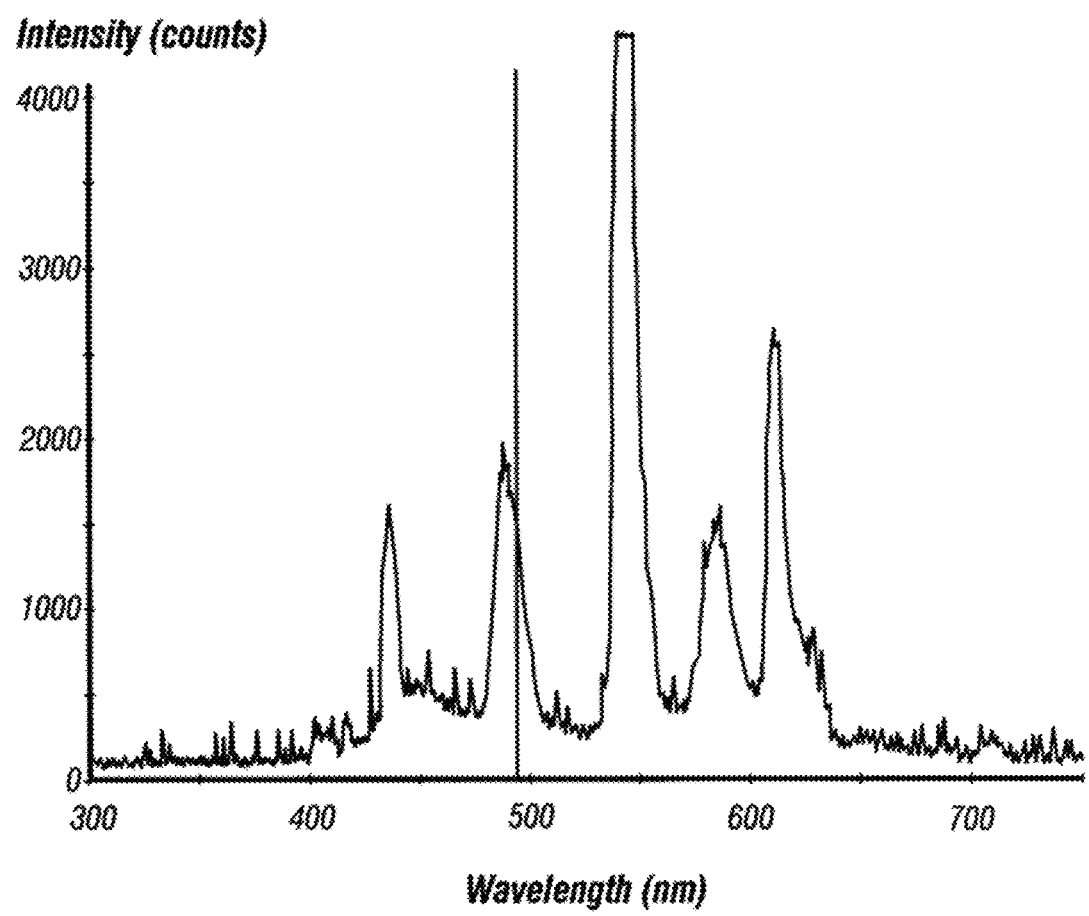
FIG. 24 is a line graph and shows a non-limiting example of Raman spectral measurement that may be performed for drilling fluids.

In this example, FIG. 24 illustrates how the user is attempting to identify drilling fluids. The apparatus of the present invention is used to perform a Raman spectral measurement of a sample, which is compared against Raman spectral measurement for drilling fluids.

Industrial Or Commercial Oils

Figure 25:
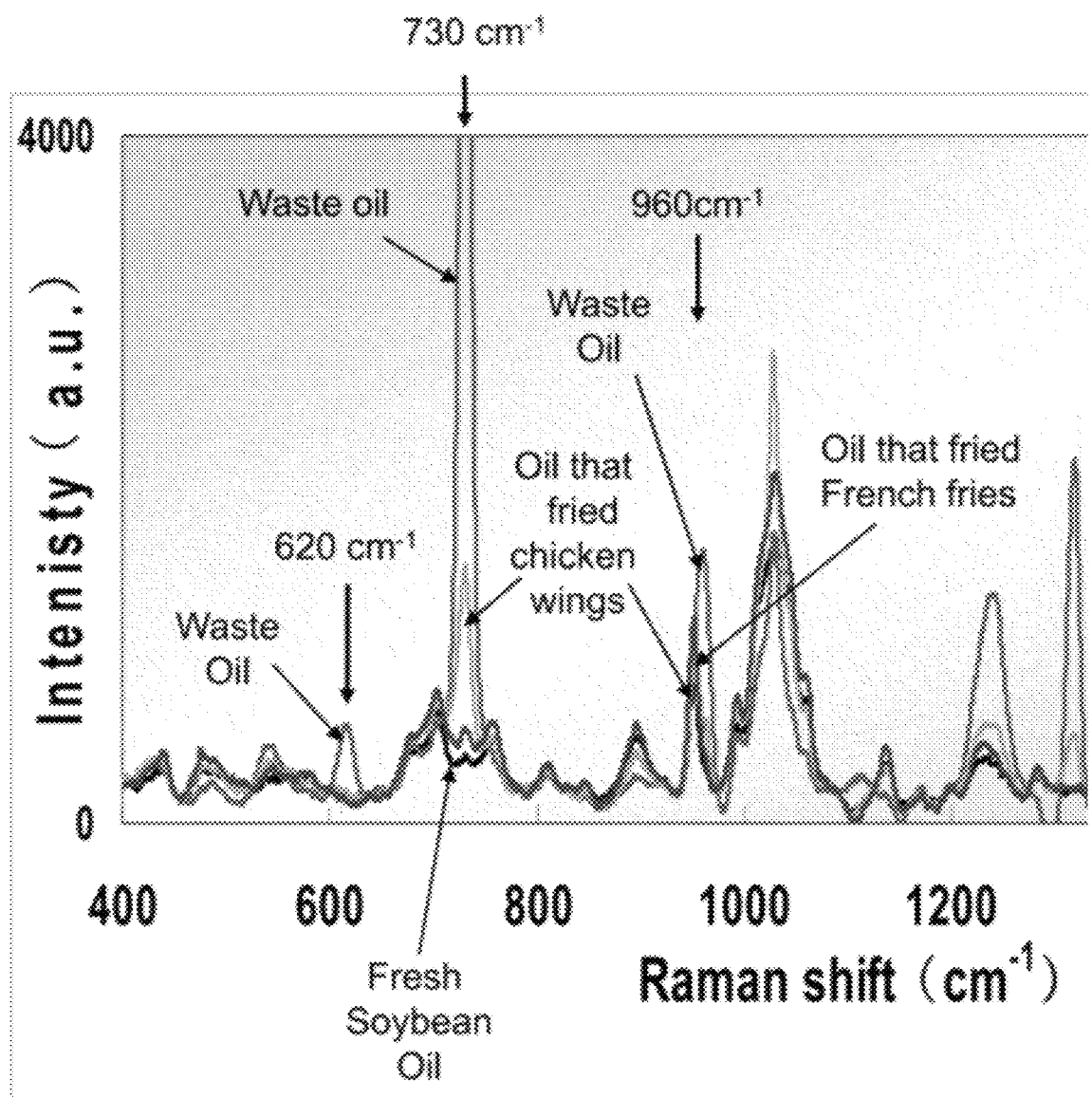
FIG. 25 is a line graph and shows a non-limiting example of Raman spectral measurement that may be performed for analyzing various oils.

In this example, FIG. 25 illustrates how the user is attempting to identify commercial oils. The apparatus of the present invention is used to perform a Raman spectral measurement of a sample, which is compared against Raman spectral measurement for analyzing various oils.

Industrial Process Stream, Pharma

Figure 26:
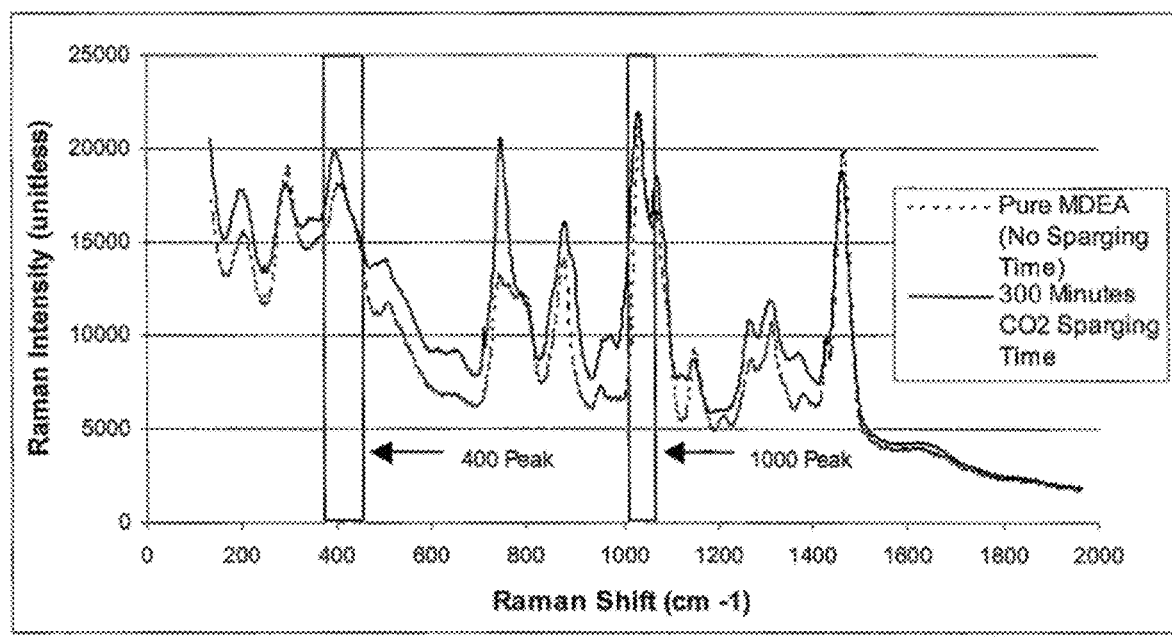
FIG. 26 is a line graph and shows a non-limiting example of Raman spectral measurement that may be performed for an industrial process stream.

In this example, FIG. 26 illustrates how the user is attempting to identify a pharmaceutical compound. The apparatus of the present invention is used to perform a Raman spectral measurement of a sample, which is compared against Raman spectral measurement for an industrial process stream.

Fuels

Figure 27:
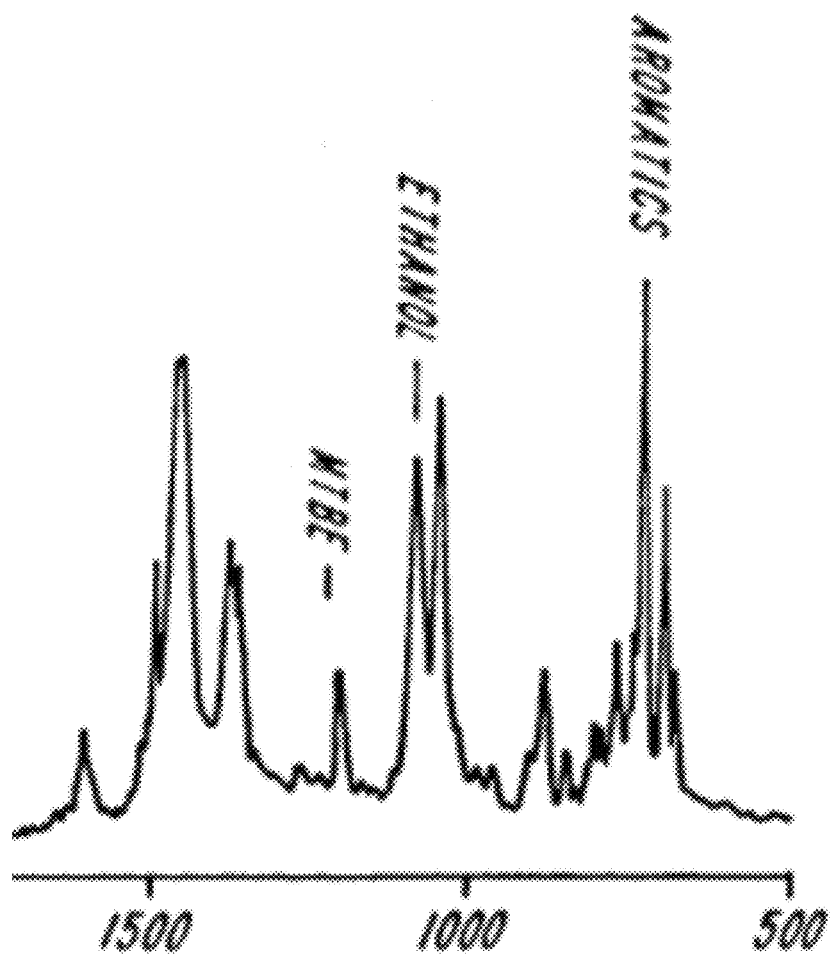
FIG. 27 is a line graph and shows a non-limiting example of Raman spectral measurement that may be performed for analyzing additives and contents of fuel.

In this example, FIG. 27 illustrates how the user is attempting to identify components or impurities in fuel. The apparatus of the present invention is used to perform a Raman spectral measurement of a sample, which is compared against Raman spectral measurement for analyzing additives and contents of fuel.

Semiconductor Manufacturing

Figure 28:
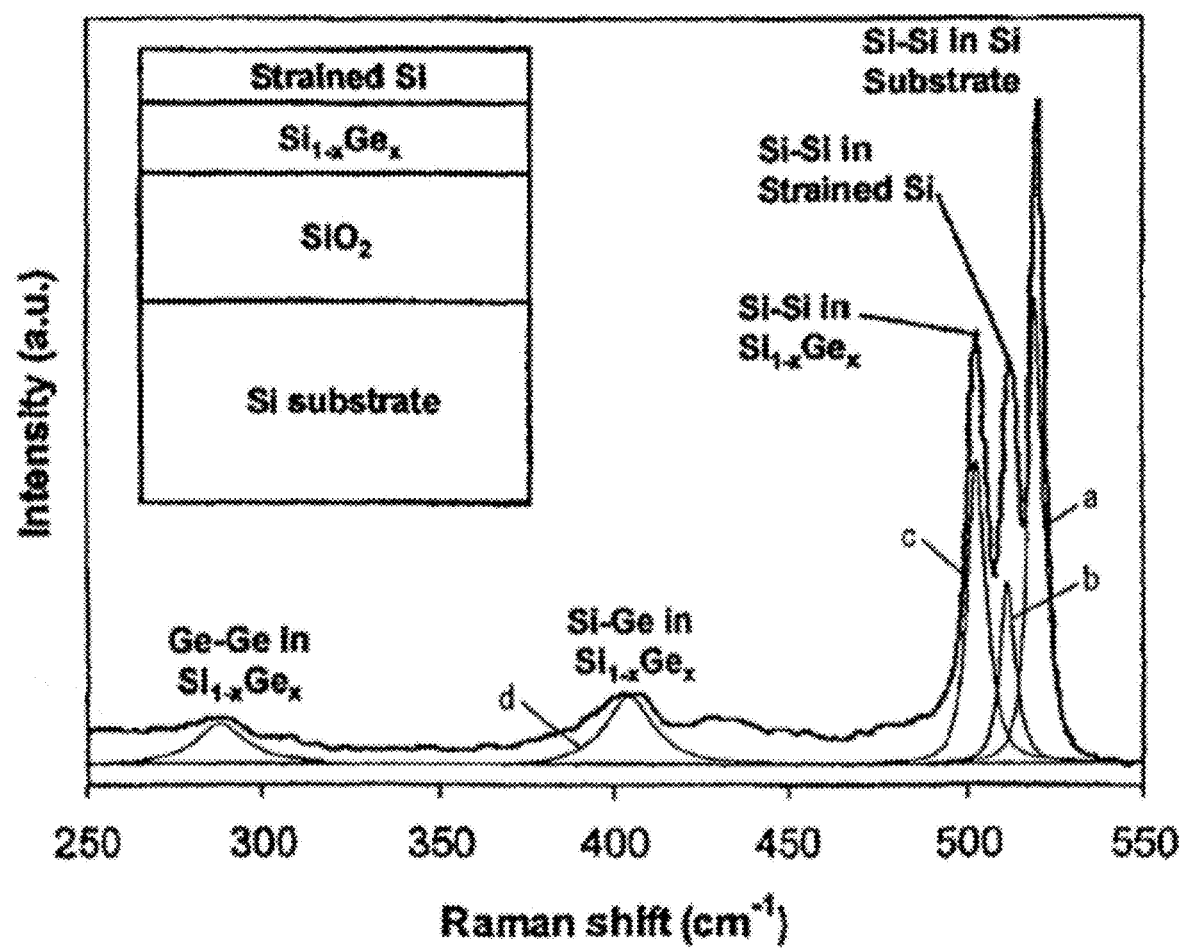
FIG. 28 is a line graph and shows a non-limiting example of Raman spectral measurement that may be performed for analyzing silicon and other substrates in semiconductor manufacturing.

In this example, FIG. 28 illustrates how the user is attempting to identify materials used in semiconductor manufacturing. The apparatus of the present invention is used to perform a Raman spectral measurement of a sample, which is compared against Raman spectral measurement for analyzing silicon and other substrates in semiconductor manufacturing.

Authentication/Tracking With Nanoparticles

Figure 29:
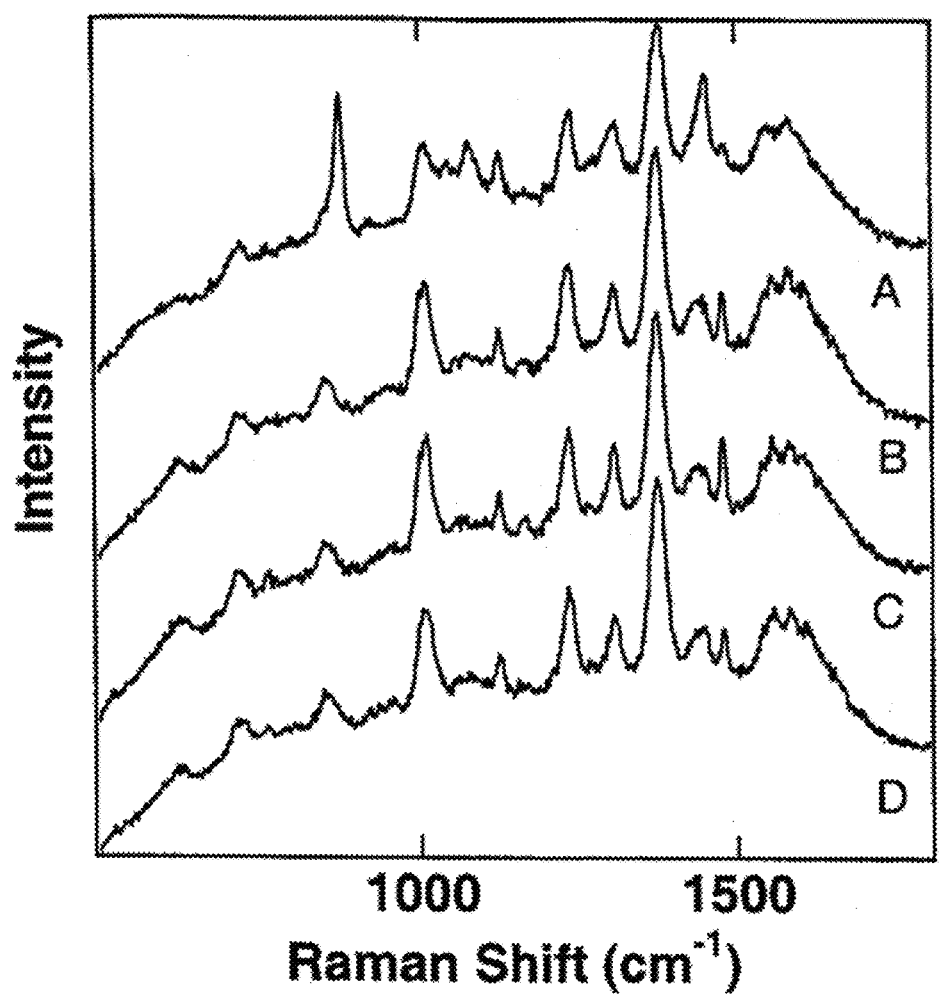
FIG. 29 is a line graph and shows a non-limiting example of Raman spectral measurement that may be performed for nanoparticles that can be used for authentication and/or tracking.

In this example, FIG. 29 illustrates how the user is attempting to identify a fake or gray-market item. The apparatus of the present invention is used to perform a Raman spectral measurement of a sample, which is compared against Raman spectral measurement for nanoparticles that can be used for authentication and/or tracking.

Antibodies

Figure 30:
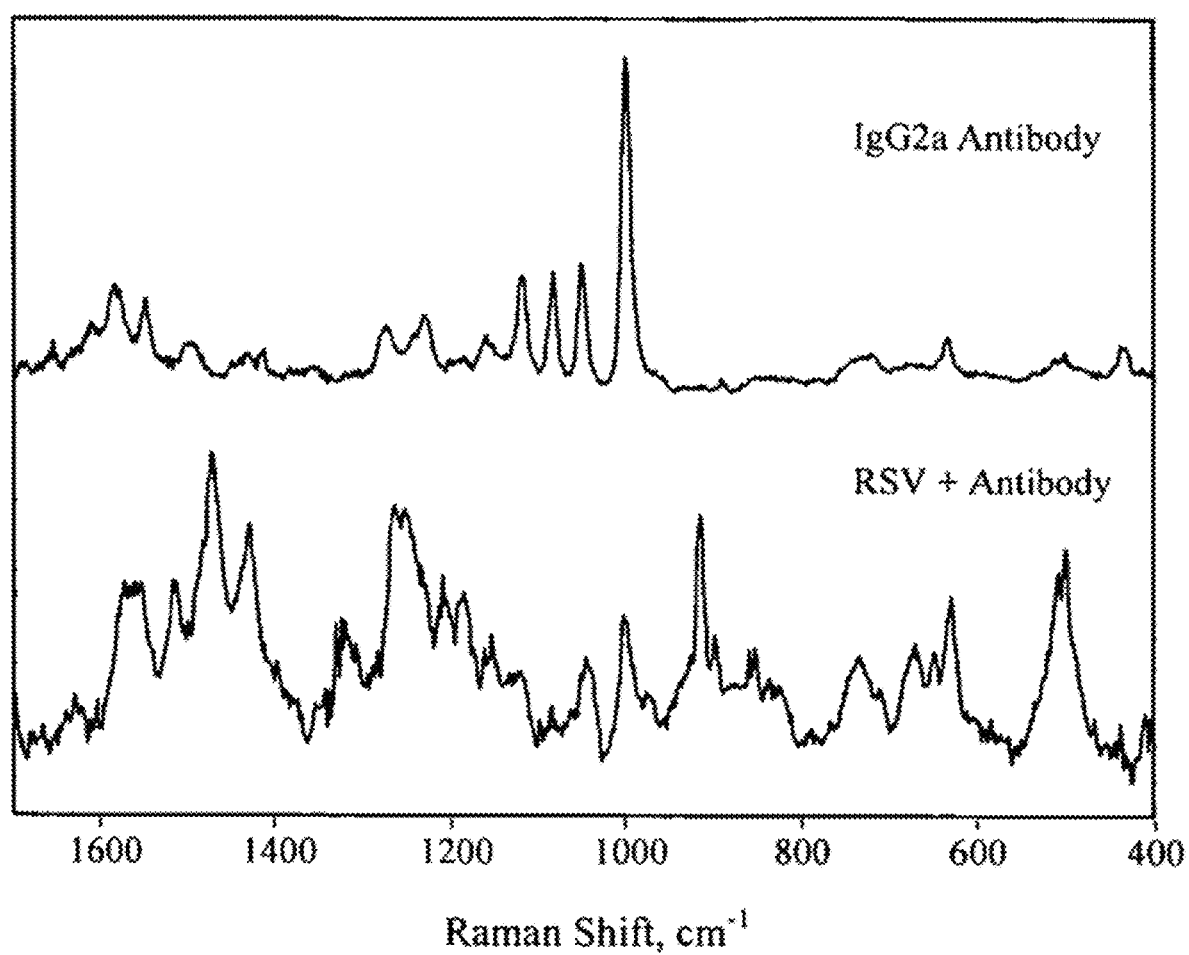
FIG. 30 is a line graph and shows a non-limiting example of Raman spectral measurement that may be performed for detection and analysis of antibodies and conjugated antibody pairs.

In this example, FIG. 30 illustrates how the user is attempting to identify an antibody. The apparatus of the present invention is used to perform a Raman spectral measurement of a sample, which is compared against Raman spectral measurement for detection and analysis of antibodies and conjugated antibody pairs.

Fiber Analysis

Figure 31:
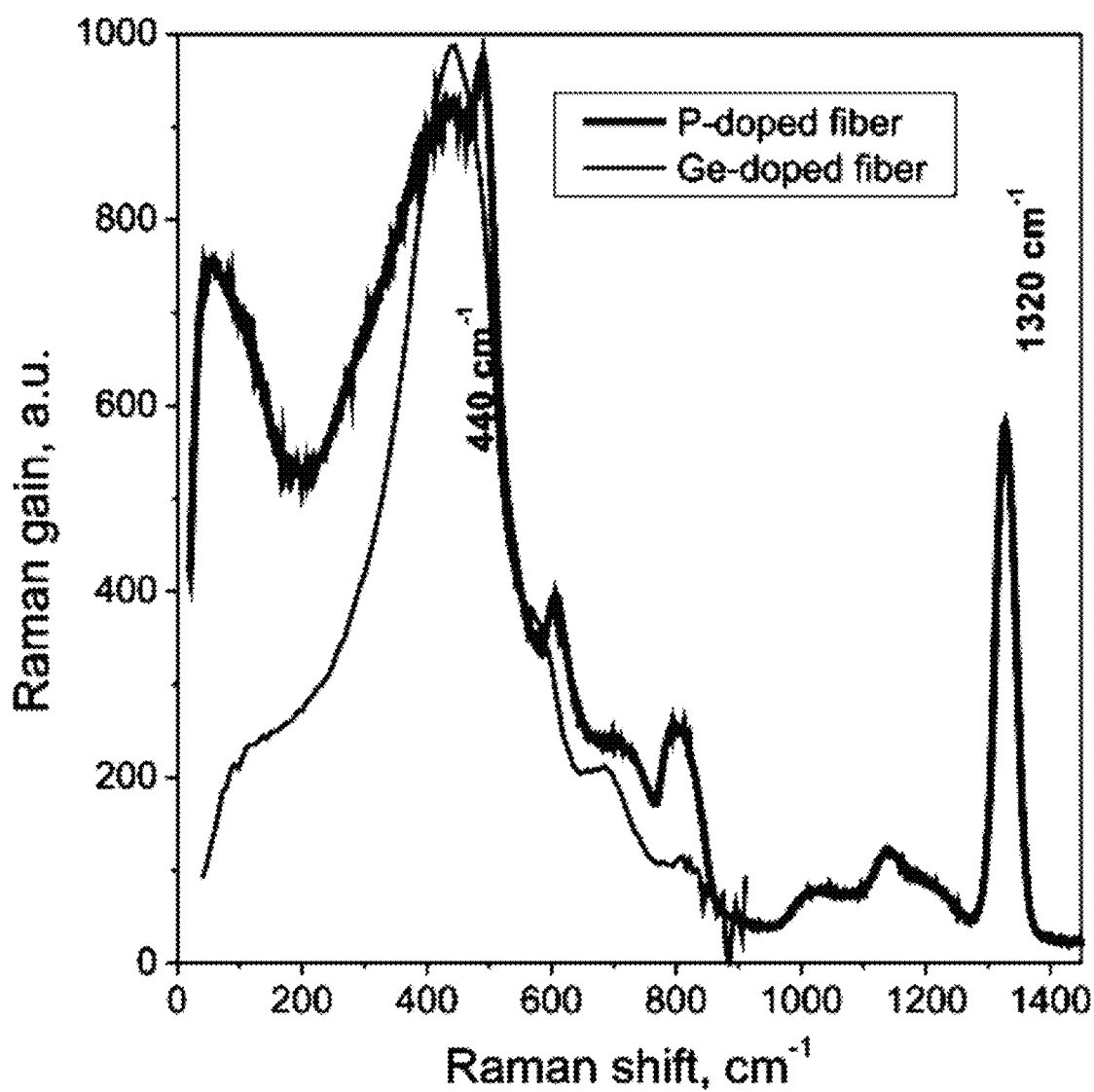
FIG. 31 is a line graph and shows a non-limiting example of Raman spectral measurement that may be performed for analysis of fibers.

In this example, FIG. 31 illustrates how the user is attempting to identify a collection of fibers, in this case, silica doped fiber. The apparatus of the present invention is used to perform a Raman spectral measurement of a sample, which is compared against Raman spectral measurement for analysis of fibers.

Toxin

Figure 32:
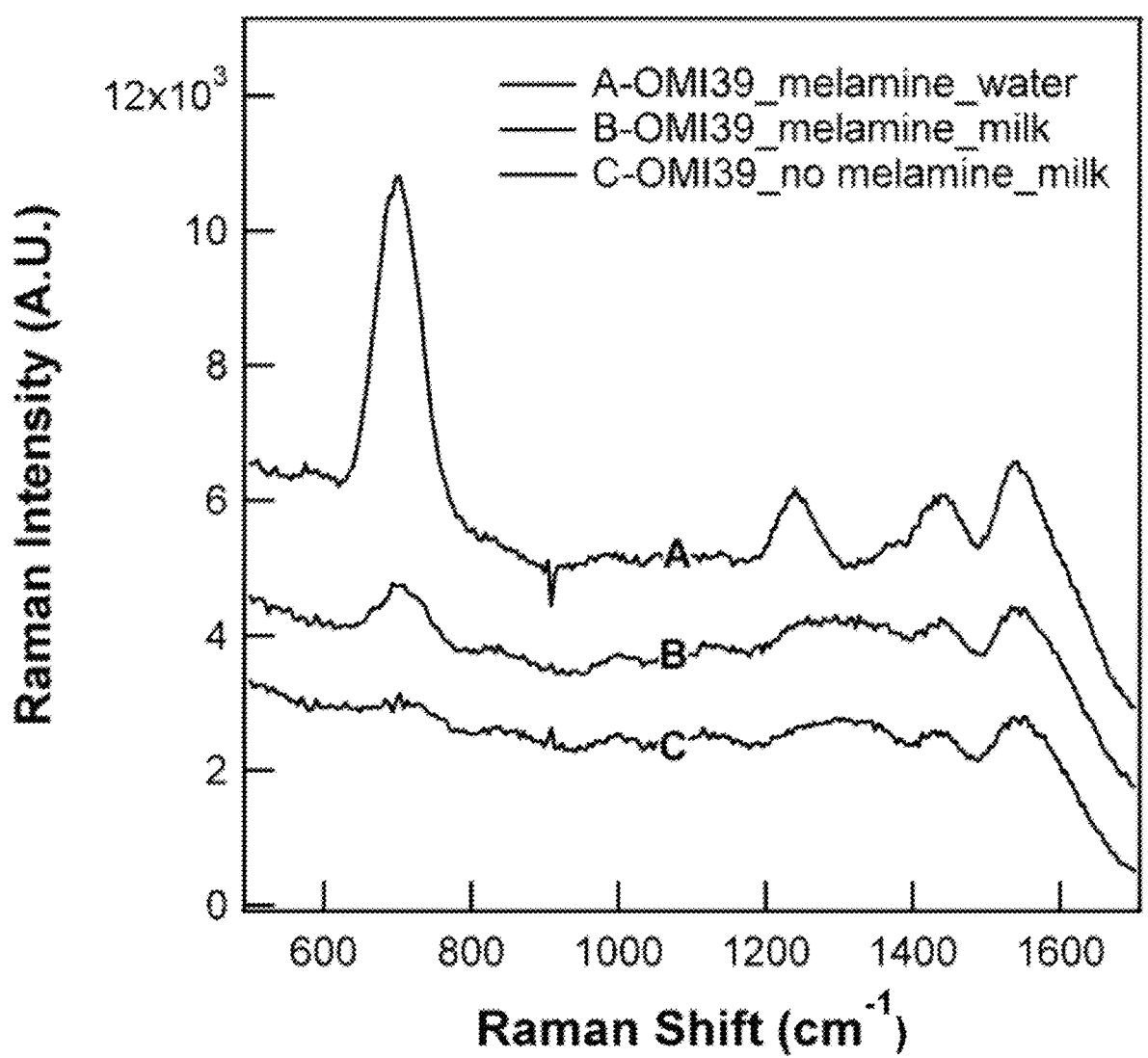
FIG. 32 is a line graph and shows a non-limiting example of Raman spectral measurement that may be performed for detection and analysis of a toxin, e.g. melamine in milk.

In this example, FIG. 32 illustrates how the user is attempting to identify a toxin. The apparatus of the present invention is used to perform a Raman spectral measurement of a sample, which is compared against Raman spectral measurement for detection and analysis of a toxin, e.g. melamine in milk.

Biochemistry

Figure 33:
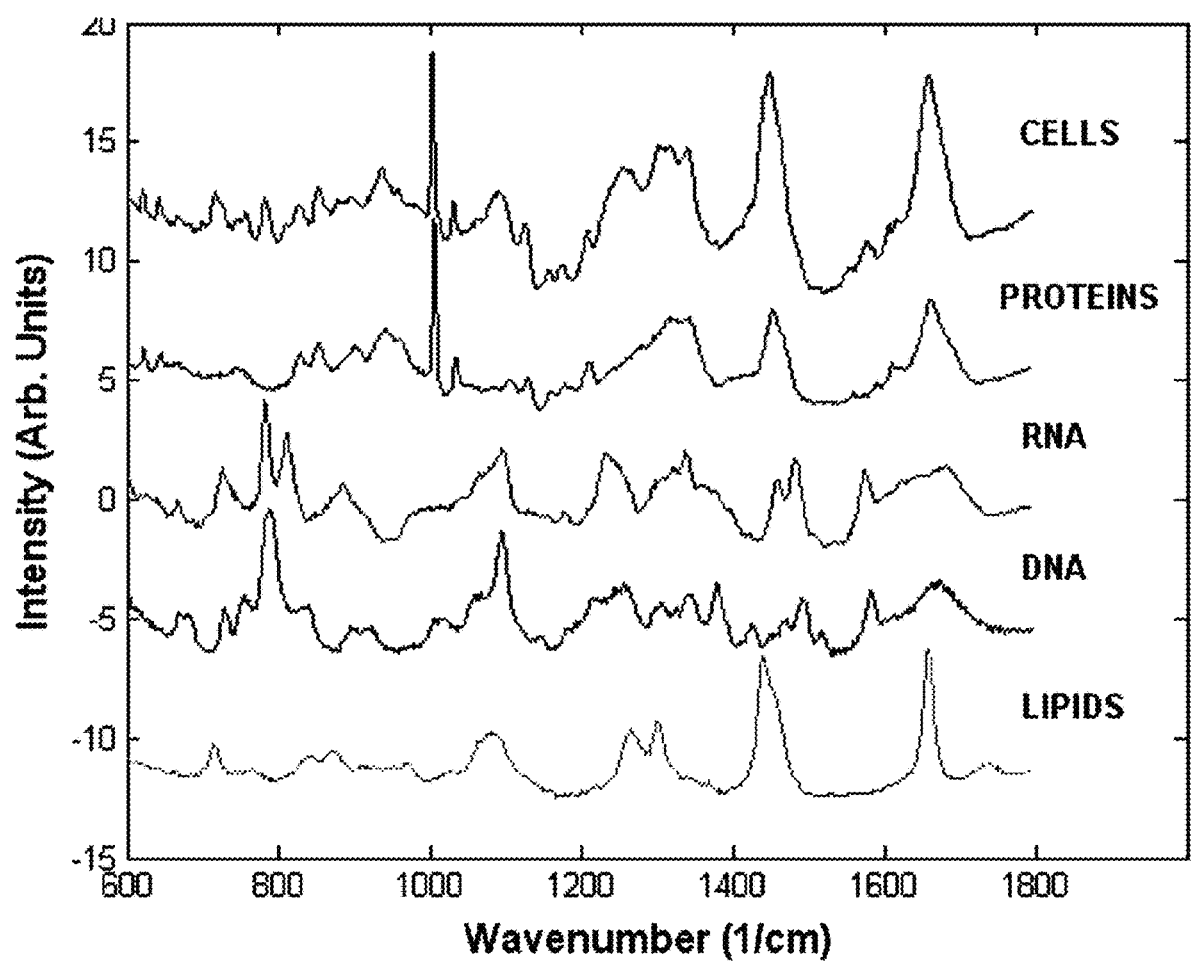
FIG. 33 is a line graph and shows a non-limiting example of Raman spectral measurement that may be performed for detection and analysis of various types of biochemical items, e.g. cells, proteins, nucleic acids, and lipids.

In this example, FIG. 33 illustrates how the user is attempting to identify various items commonly detected in biochemistry setting. The apparatus of the present invention is used to perform a Raman spectral measurement of a sample, which is compared against Raman spectral measurement for detection and analysis of various types of biochemical items, e.g. cells, proteins, nucleic acids, and lipids.

Forensic Body Fluids

Figure 34:
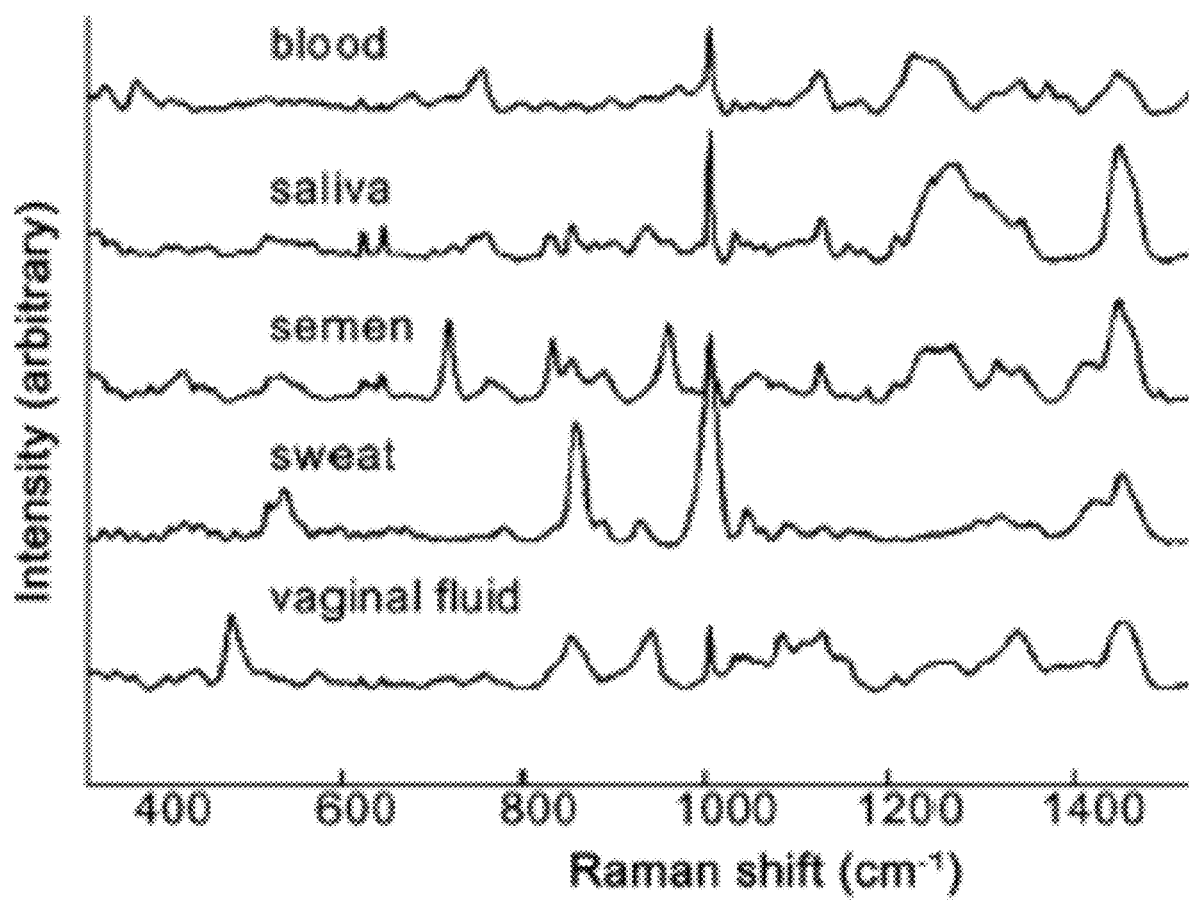
FIG. 34 is a line graph and shows a non-limiting example of Raman spectral measurement that may be performed for forensic detection and comparison of or for scientific research on body fluids including blood, saliva, semen, sweat, and vaginal fluid.

In this example, FIG. 34 illustrates how the user is attempting to identify fluid in a forensic analysis. The apparatus of the present invention is used to perform a Raman spectral measurement of a sample, which is compared against Raman spectral measurement for forensic detection and comparison of or for scientific research on body fluids including blood, saliva, semen, sweat, and vaginal fluid.

Scanning Of Luggage, Packages, & Bags

Figure 35B:
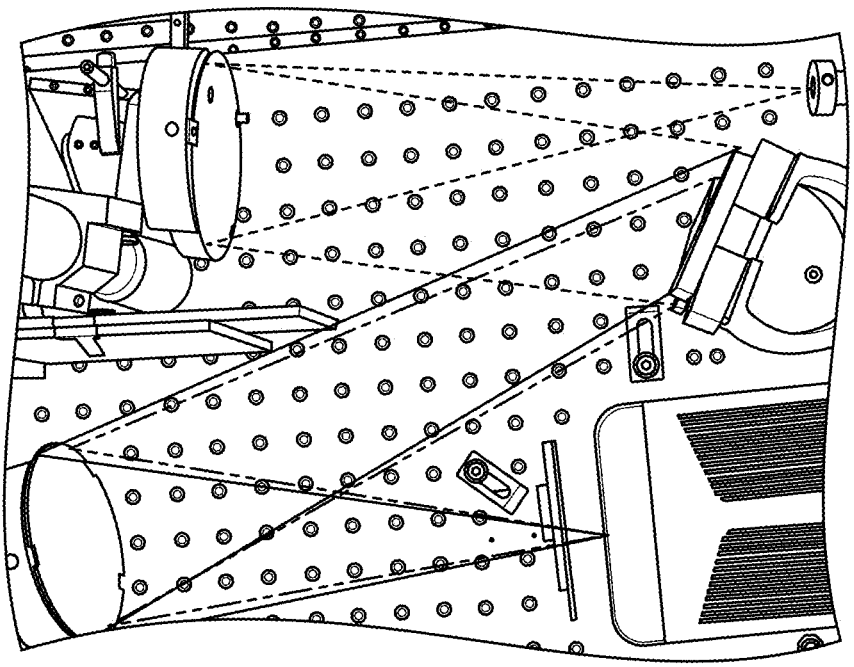
FIG. 35 is a photograph of an example device showing collection optics, MWRS spectrograph optical path, and multi-grating turret.
Figure 35A:
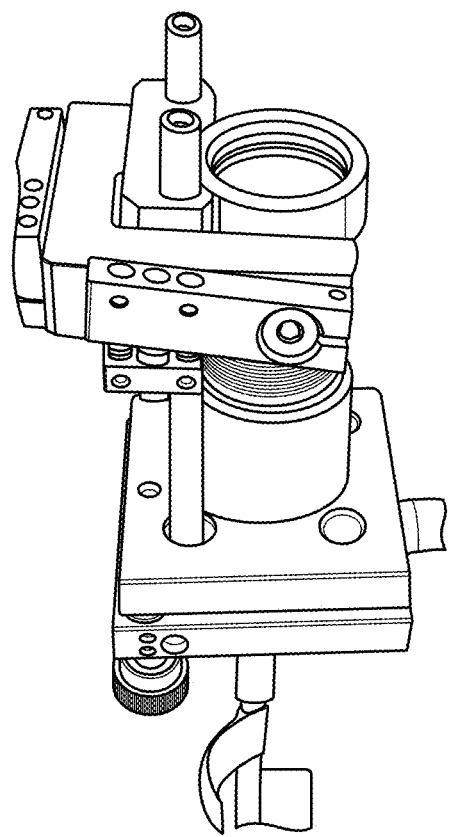
Figure 35C:
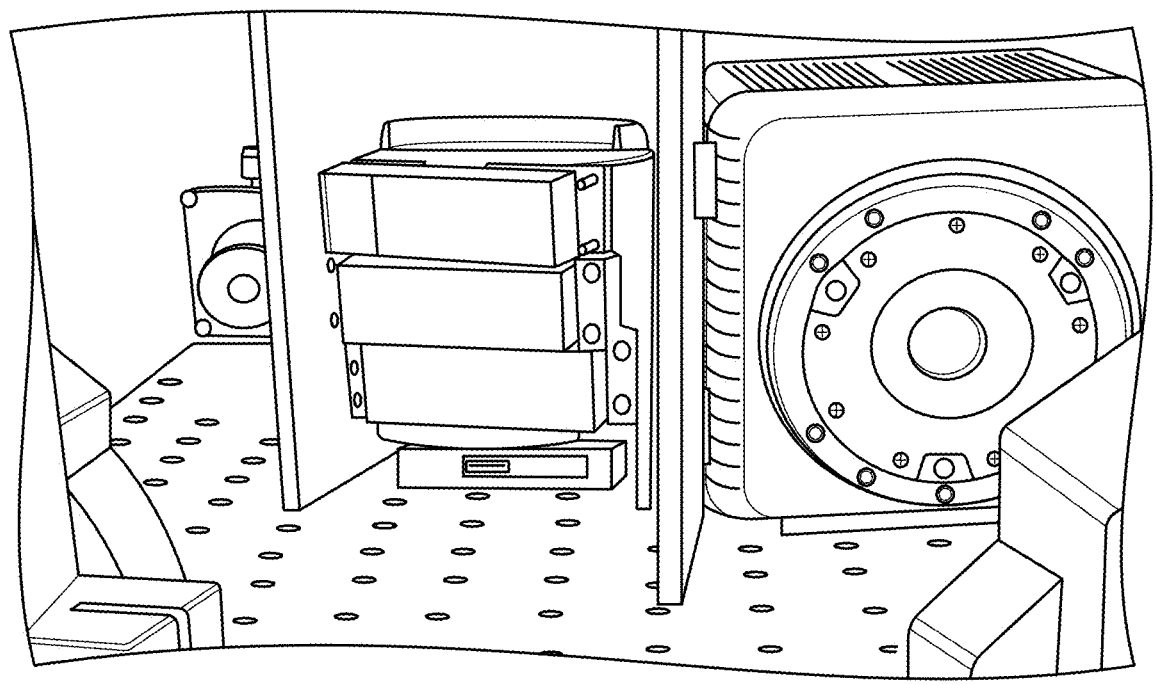

In this example, the scanner includes an air-cooled YAG laser, a CMOS camera, and a miniature spectrograph equipped with wireless communications. As has been described, the approach is to collect Raman spectra using deep-UV excitation coupled with an intensified charge coupled device (ICCD) detection system. The high peak powers of the incident pulses result in significant scattered intensity at wavelengths where the detector quantum efficiency is high. Scattering cross-sections in the deep UV are 50 to 100 times greater than in the visible where typical systems work. The entire Raman spectrum occurs within ca 15 nm of the incident radiation. Fluorescence emission, both from the analyte and background sources, generally occurs at longer wavelengths such that these emission sources do not interfere with the observation of Raman scattering. Moving into the UV along with the gated detection system has the added advantage of allowing Raman spectra to be collected under ambient light conditions. Combining these traits allows single laser pulse analysis of moving samples at stand-off distances of more than 25 meters with unprecedented efficiency. The use of solid state Nd:YAG lasers also has advantages related to stability and durability. There are no moving parts, other than cooling equipment, and no chemicals or dyes that degrade and require replacement. Typical duty cycles for these lasers are in the 50-100 M pulses. The system could run at 10 Hz, 24 hours per day for 3 months between required service calls. The modular design of the optical arrangement and the ease of alignment allows the active laser cavity to be fully removed and replaced with minimal skill, much like the toner cartridge in an everyday photocopier. The spent cavity could be returned to be refurbished and the efficiency of the laser system maintained at minimal cost. FIG. 35 illustrates a related device showing (a) collection optics, (b) MWRS spectrograph optical path, and (c) multi-grating turret.

Figure 36:
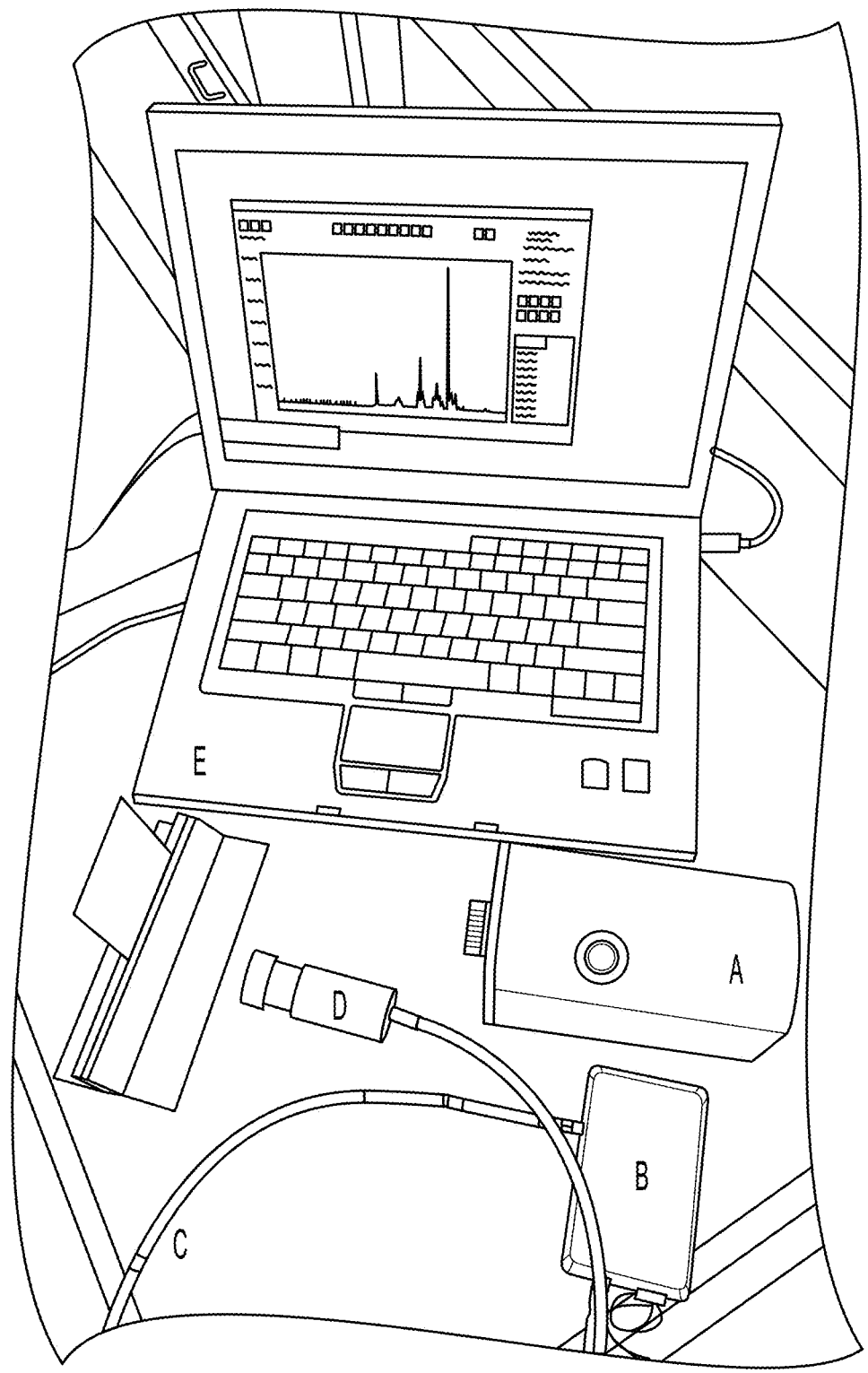
FIG. 36 is a photograph of an example device showing laser, detector, fiber optic, collection optic, and computer.
Figure 37:
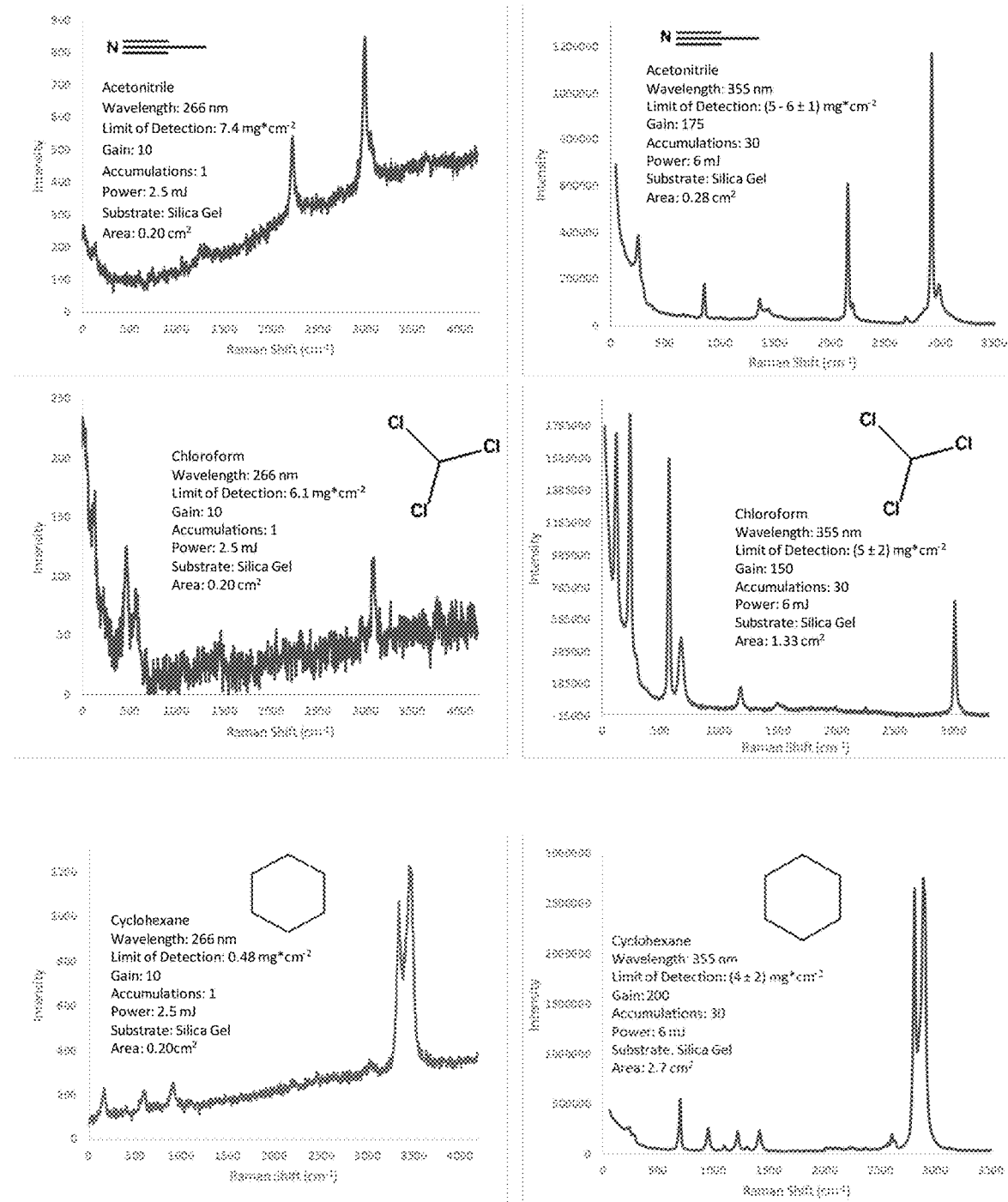
FIG. 37 provides exemplary spectra.

In related experimentation, characteristics were studied such as laser pulse energies and wavelengths, and detector response profiles. The scanner includes a Nd:YAG laser; a dichroic Rayleigh filter stack; an optical collection system; a fiberoptic bundle; and a spectrograph equipped with the appropriate detector system. All components were commercially available from existing vendors. As an example these studies used a Quantel Brilliant b laser. The detection system used was a commercially available ICCD detector (Princeton Instruments PI max 4 ICCD mounted on an Acton Spectropro 2300i spectrograph). An illustration of the system is provided in FIG. 36, showing: (a) laser, (b) detector, (c) fiber optic, (d) collection optic, and (e) computer. Examples of the library spectra entries are provided in FIG. 37.

The laser pulse powers were limited to below 5 mJ per pulse to avoid sample vaporization and surface damage to the underlying substrate. Initial experiments used 355-nm pulses, but it was found that significant emission from the underlying substrate masked scattered Raman signal. The excitation wavelength was then changed to 266-nm pulses to avoid these problems and the remaining studies used this wavelength. Silica gel was selected as a "sand simulant" when choosing the substrate to be used for these preliminary trace detection studies. The remaining measurements were carried out using these optimized configuration designs. The detection limits are comparable to the DoD suggested limits, typically ranging between 1-15 mg/cm$^2$. It was concluded that the scanner can detect many of these compounds in a single laser pulse at trace levels approaching the DoD target detection limits. The substrates studied included; white paper, brown cardboard, black ABS plastic, black vinyl, unfinished aluminum, aluminum oxide powder, and silica gel. The initial studies used 355-nm laser output. Many of these substrates fluoresce excessively when 355-nm light is used but showed significantly less emission with 266-nm light. When possible both detection limits are listed in the table.

One of the difficulties associated with using UV laser excitation in Raman spectroscopy is the need for detector standardization. Calibration of deep-UV spectra using cyclohexane, methanol, and acetonitrile in accord with ASTM standard guidelines ASTM-E2911-13 and ASTM-1840-96. These ASTM standard procedures do not extend down to the UV as this area of research is relatively new. To accommodate calibration of the Apogee system in the UV the ASTM methodologies were extended into this wavelength range. The standard methodologies for visible excitation are described within ASTM-E2911-13 (Intensity Correction) and ASTM-E1840-96 (Raman Shift standards). Specifically, the intensity and shift corrected spectra of cyclohexane, acetonitrile, and methanol at 532-nm excitation wavelengths were measured with the aim of using these systems as secondary standards. The spectra obtained in the visible are comparable to those described within the ASTM reports. These secondary standards are free from absorption of fluorescence issues down to the wavelengths important to this work and are commercially available at high purity.

The laser used was tuned to deliver 5-10 mJ pulses of 266 and 355 nm light at a cost of over $150K and weighs nearly 200 lbs when filled with cooling water. Based on the current experience with these detection systems it is believed that a suitable commercially available air-cooled YAG laser system operating at 24 volts DC and weighing only 8 lbs is a viable substitute. While in certain examples an ICCD detector system is disclosed; alternative examples can use multiple linear array detectors each weighing ca 2 lbs and operating on USB power delivered from a laptop computer. In one example a plurality of individual detectors is used with each laser. In one embodiment 4-6 individual detectors is used with each laser.

Limit of Detection (LOD) for Sample Compounds

| # | Compound | λ nm | Power mJ | Gain | Accum | LOD mg*cm$^{-2}$ |
|---|---|---|---|---|---|---|
| 1 | Acetone | 266 | 2.5 | 10 | 1 | ND |
|   |  | 355 | 6 | 150 | 30 | 5-7 ± 1 |
|   |  | 355 | 6 | 200 | 30 | >8.0 |
|   |  | 355 | 6 | 200 | 30 | ND |
| 2 | Nitromethane | 266 | 2.5 | 10 | 1 | ND |
|   |  | 355 | 6 | 200 | 30 | ND |
| 3 | 2-Nitrotoluene | 266 | 2.5 | 200 | 1 | 3.6 |
|   |  | 355 | 6 | 200 | 30 | ND |
| 4 | 3-Nitrotoluene | 266 | 2.5 | 10 | 1 | ND |
|   |  | 355 | 6 | 200 | 30 | ND |
| 5 | 4-Nitrotoluene | 266 | 2.5 | 200 | 1 | 3.1 |
| 6 | Sodium Perchlorate | 266 | 2.5 | 10 | 1 | 3.9 |
| 7 | Tannerite | 266 | 2.5 | 10 | 1 | 0.0041 |

ND: No Detection

A standardized method to report the limits of detection for Raman systems have yet to be defined by either NIST or ASTM. However, it is generally accepted by ASTM to report Instrument Detection Limits (IDL) as the material concentration needed to achieve signal intensity 3 times the standard deviation in the blank noise. The present disclosure selected a target trace surface coverage of 1 mg/cm$^2$ as standard for IDL. The combinations of detector sensitivity, laser peak power, and signal averaging required that achieves this limit will be different for all compounds (e.g., see FIG. 52). The comparison between IDL values for 266 and 355 nm excitation are listed in FIG. 53.

In one embodiment, the scanner utilizes an aluminum off-axis parabolic mirror collection system. In an alternative embodiment, the scanner utilizes quartz collection optics. In one related experiment, bulk samples were used to obtain calibration data for the system, specifically cyclohexane, acetonitrile, and methanol, as calibration standards. Analytical samples, both in bulk and distributed onto alumina coated plates (as a sand simulant) were used to determine the detection limits of the scanner.

Wireless operation of the device was achieved by using a Raspberry Pi micro-computer. These computers are small and can be battery operated, yet they have Wi-Fi capabilities which made them ideal for use with the scanner. The individual components, i.e. the laser and detector, were interfaced using the Raspberry PI to allow stand-alone operation with wireless data transfer. This design was then used to determine the detection characteristics of the scanner.

Figure 44:
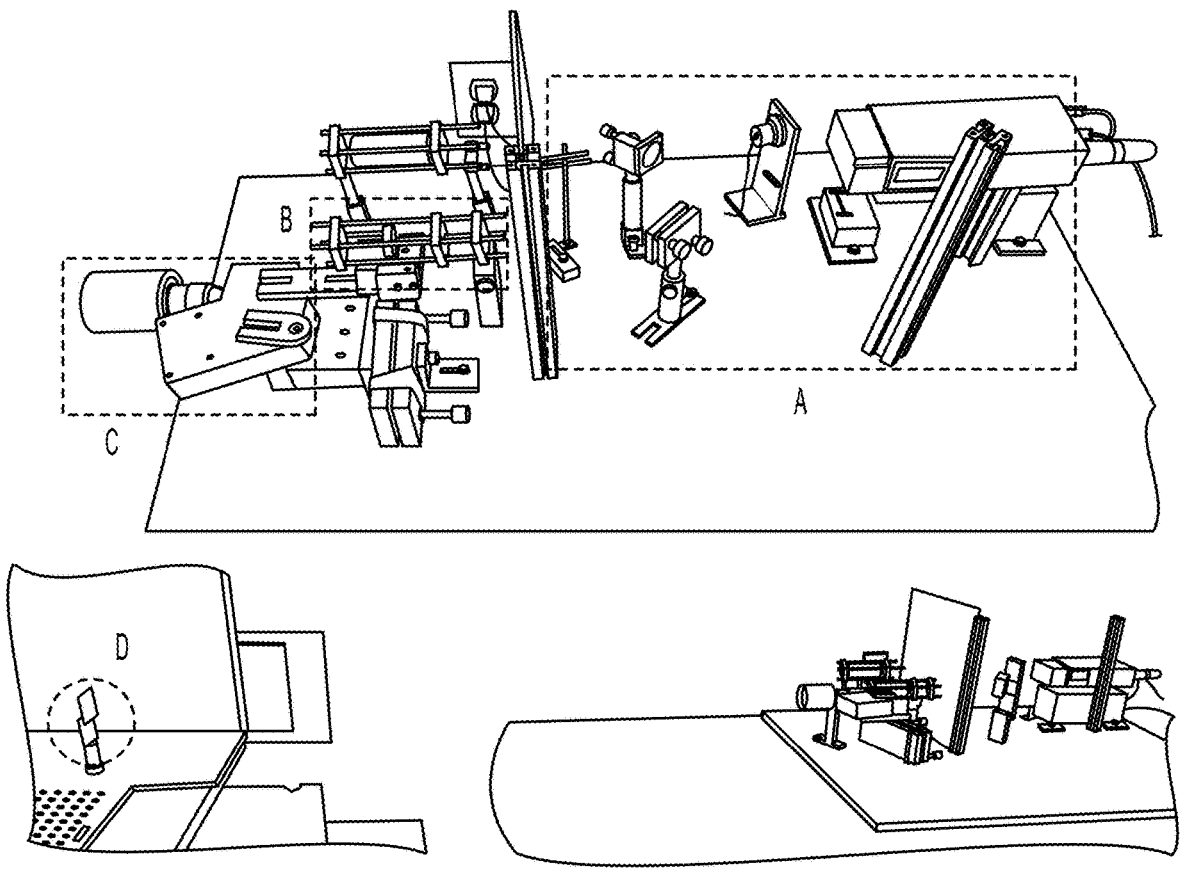
FIG. 44 illustrates an aviation style embodiment.

FIG. 44 provides the setup of one embodiment of the laser-detector system. A represents the Laser and the optics that filter out all non-266 nm light. B is the telescope responsible for changing the diameter of the beam at the sample. D is where the sample is located, and C is the detector+collection optics.

Figure 45:
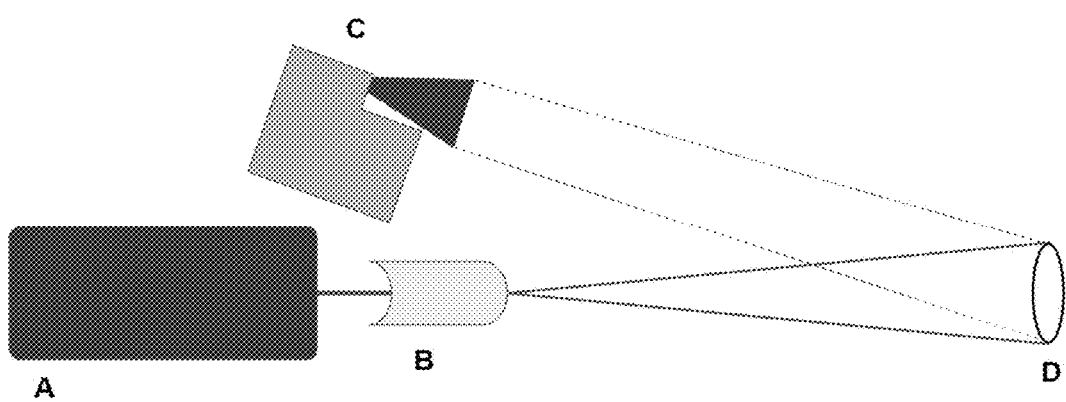
FIG. 45 provides a schematic of an aviation style embodiment.

FIG. 45 provides the setup of one embodiment of the laser-detector system in schematic form. A represents the Laser and the optics that filter out all non-266 nm light. B is the telescope responsible for changing the diameter of the beam at the sample. D is where the sample is located, and C is the detector+collection optics.

Figure 46:
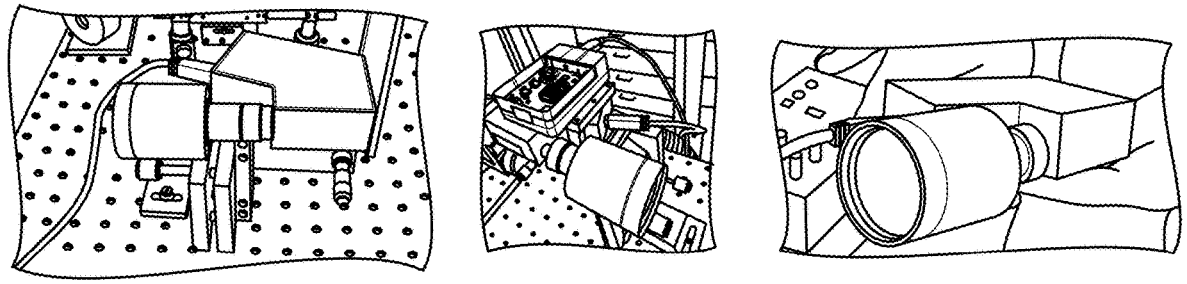
FIG. 46 provides further photographic representations of an aviation style embodiment.

FIG. 46 provides further photographic representations of this embodiment.

Figure 47:
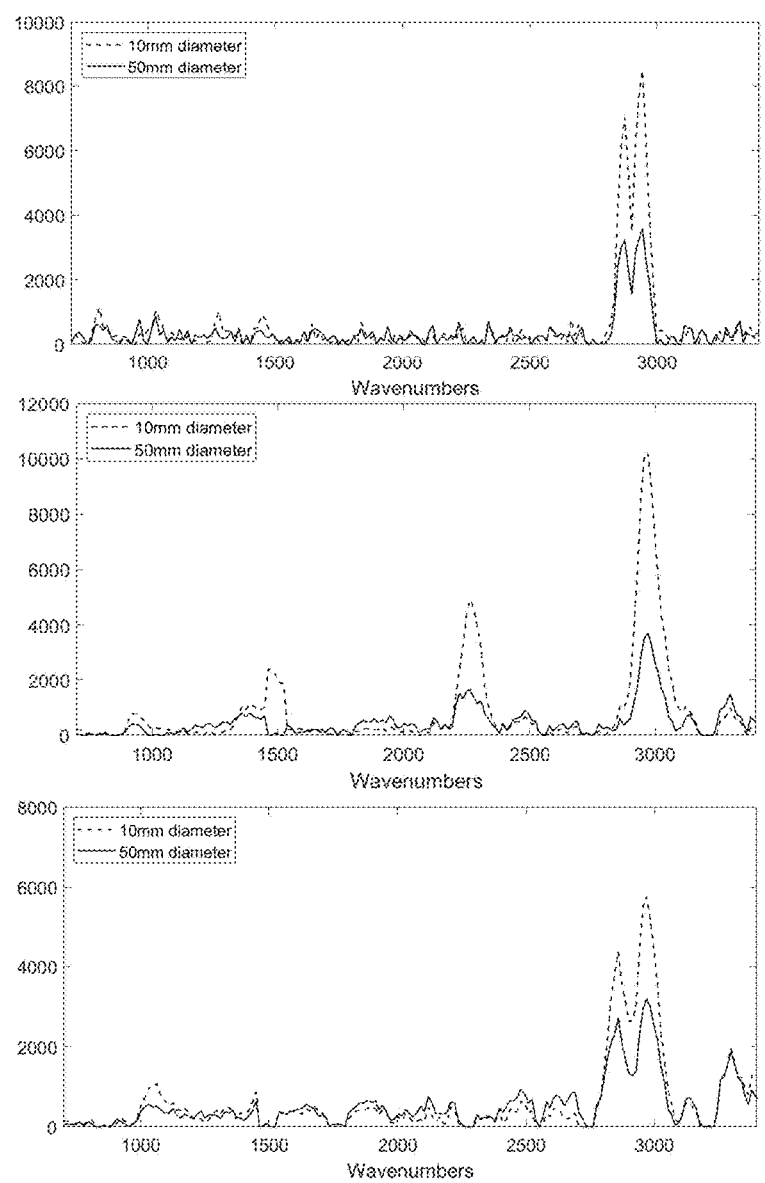
FIG. 47 illustrates the effect of beam area on intensity.
Figure 48:
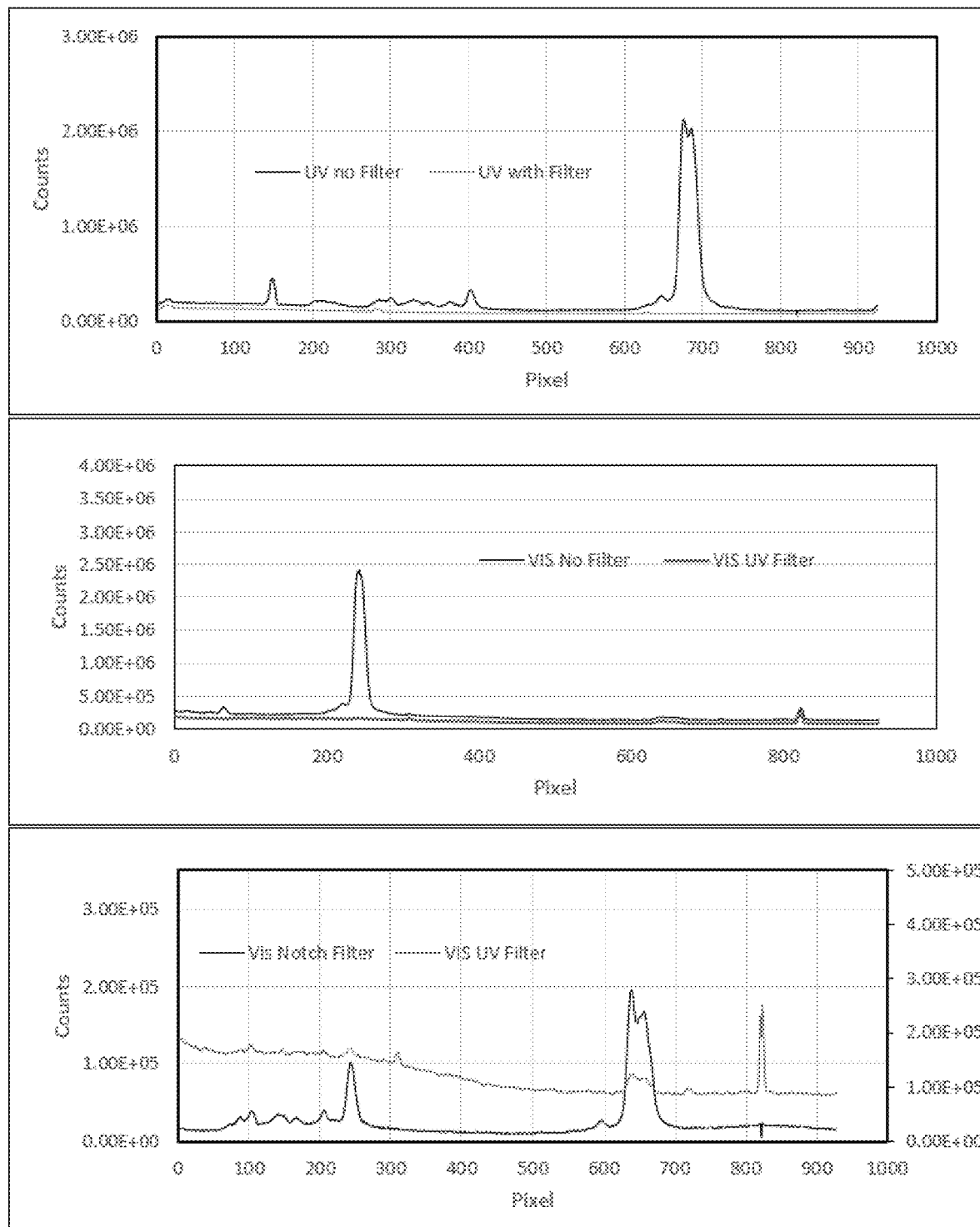
FIG. 48 illustrates various line graphs and show a non-limiting example of Rayleigh-filtered Raman scatter from n-Hexane ("HEX"). These spectra were collected as single shot laser excitations at 532, 266 and 213 nm excitations and are included as examples of the sensitivities of the MWRS at each of these laser wavelengths.
Figure 49:
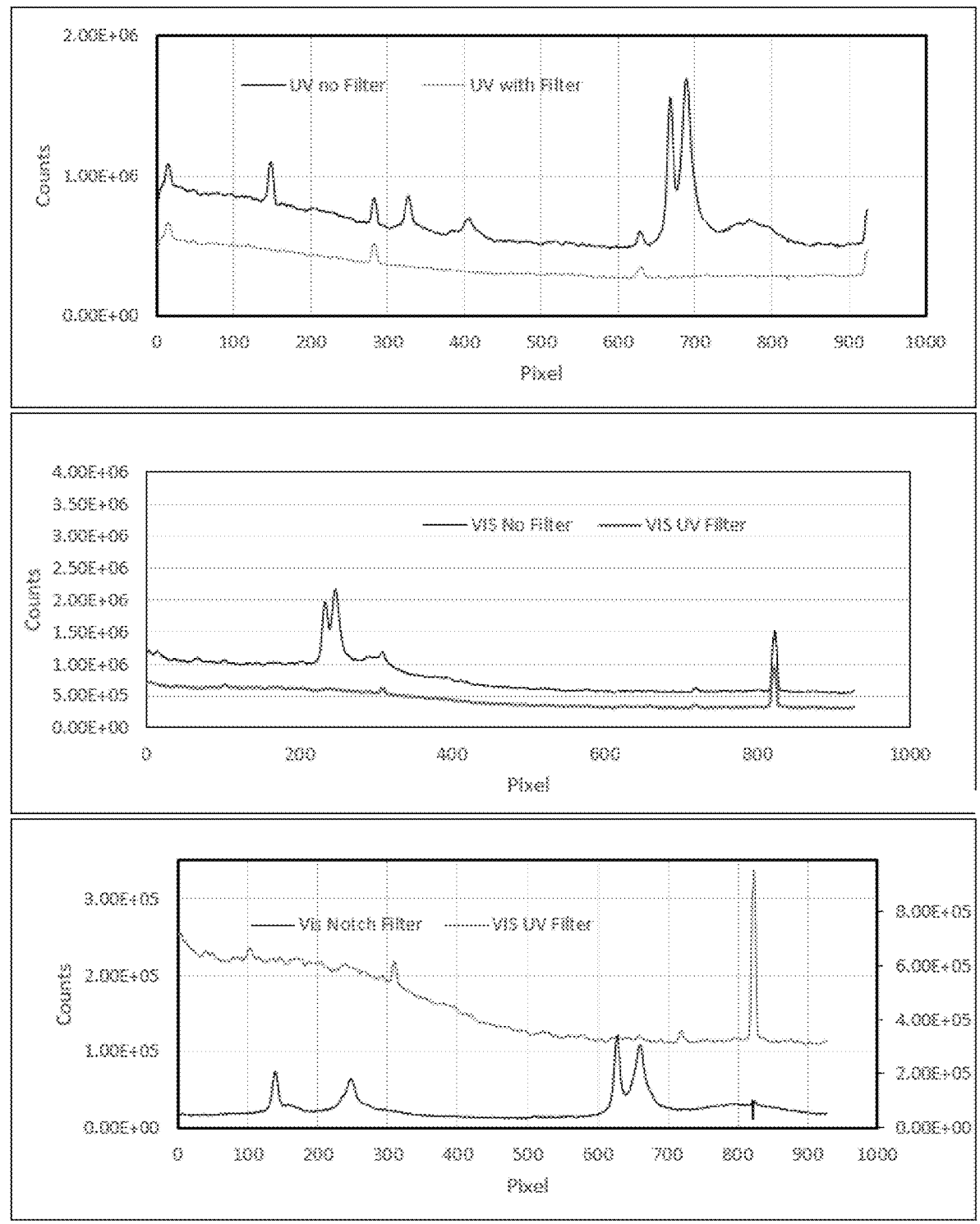
FIG. 49 illustrates various line graphs and show a non-limiting example of Rayleigh-filtered Raman scatter from methanol ("MEOH"). These spectra were collected as single shot laser excitations at 532, 266 and 213 nm excitations and are included as examples of the sensitivities of the MWRS at each of these laser wavelengths.
Figure 50:
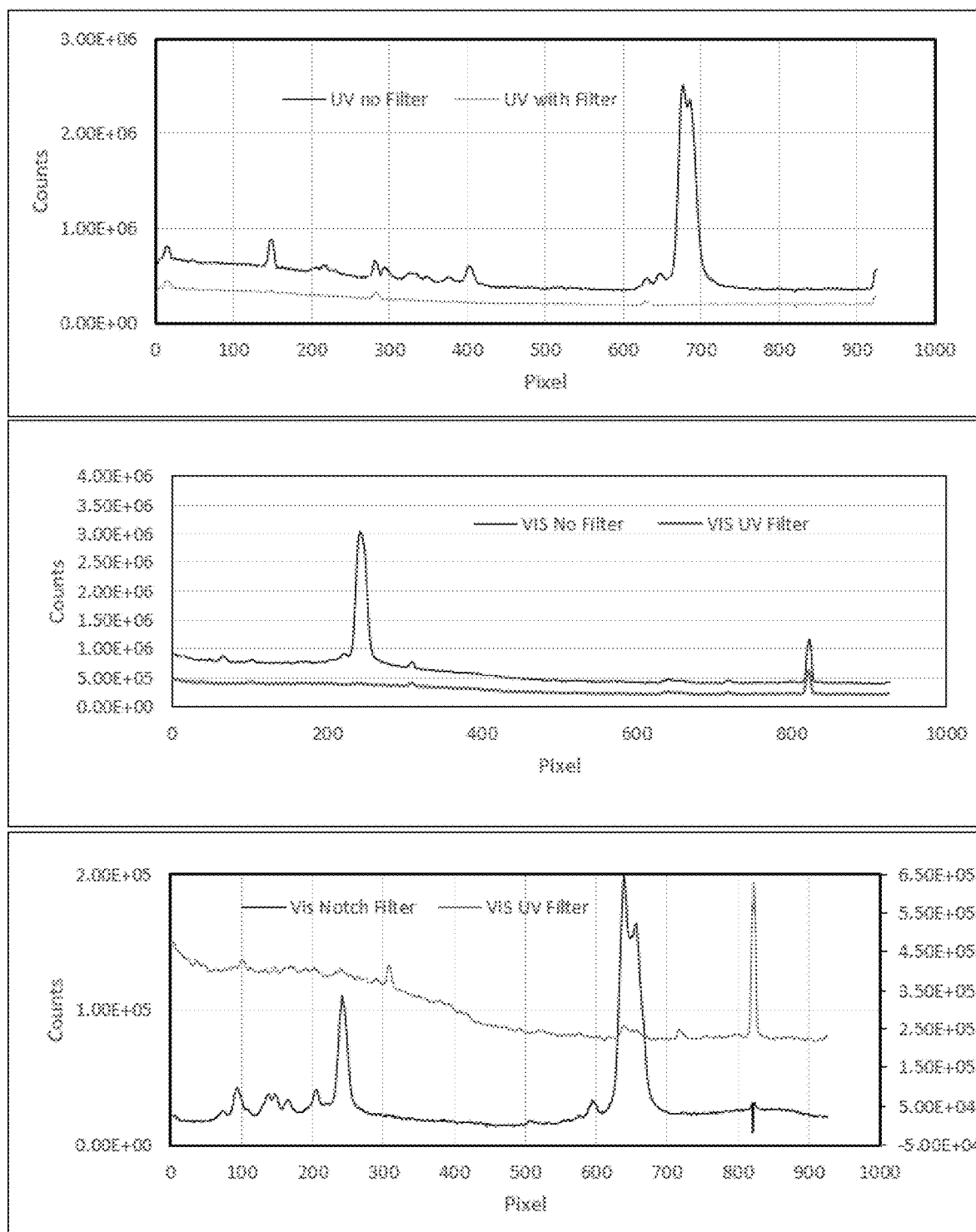
FIG. 50 illustrates various line graphs and show a non-limiting example of Rayleigh-filtered Raman scatter from pentane. These spectra were collected as single shot laser excitations at 532, 266 and 213 nm excitations and are included as examples of the sensitivities of the MWRS at each of these laser wavelengths.
Figure 51A:
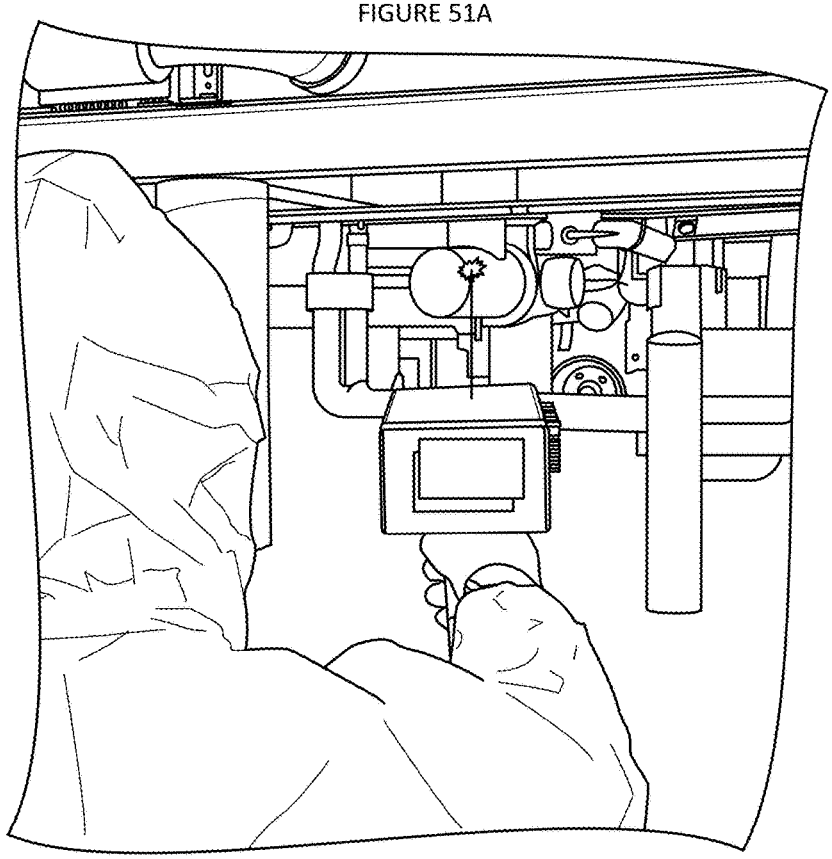
FIG. 51A illustrates a handheld embodiment of the present disclosure.
Figure 51B:
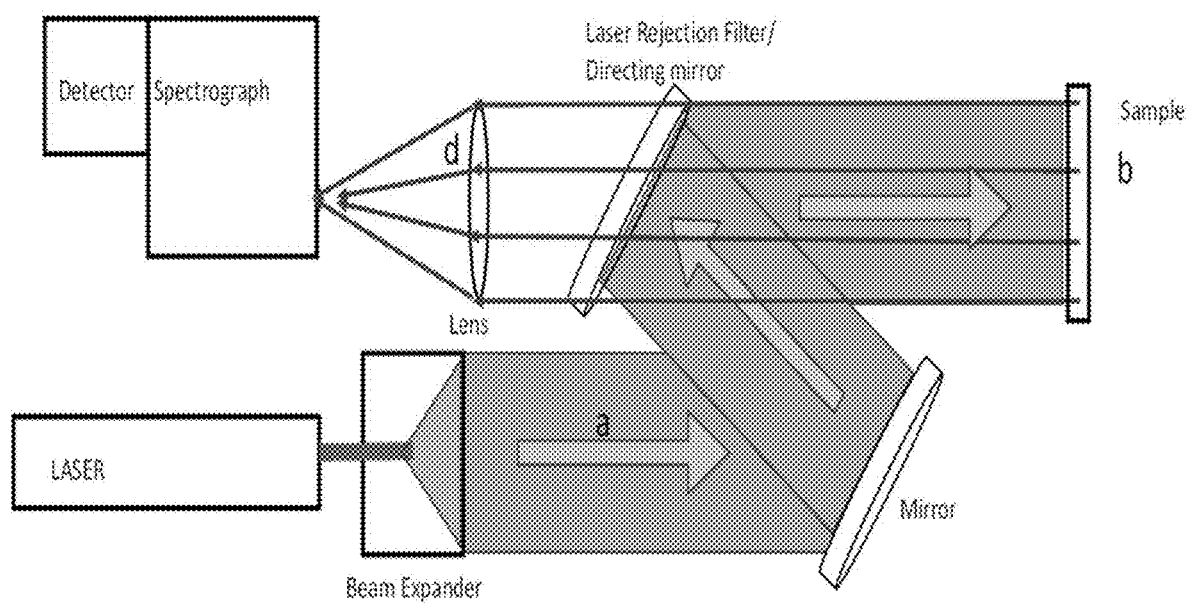
FIG. 51B illustrates cross-sectional block diagram of a handheld embodiment of the present disclosure.

Liquid samples were tested dripping ml quantities onto 50×50 mm squares, the laser power was changed to be 100 mW (5 mJ per pulse for a 20 Hz laser). Raman spectra were then collected using 266-nm excitation and excitation beam diameters of 10 and 50 mm. FIG. 47 illustrates the effect of beam area on intensity. From top to bottom, the samples were cyclohexane, acetonitrile, and methanol. The dashed line represents a sample being hit with a circular beam with a 10 mm diameter. The solid line shows the sample being hit with a 50 mm diameter beam. The integration time was 30 seconds or 600 captures. Analysis of the spectra indicate that samples could be distributed into two distinct classes; those samples that absorb 266 nm light vs those samples that do not. In general, samples that do not absorb strongly at 266 nm have detection limits close to 1 mg cm−2 while those samples that do absorb have significantly higher detection limits. This finding is the result of not only decreased scattering intensity due to absorption but also increased background emission due to fluorescence. These results also show that the Apogee scanner is capable of capturing Raman scatter from proximal distances more than 1.75 m for specific chemical compounds. In addition, post processing techniques will be able to identify these chemicals on a single-shot basis. These data also indicate that improvements to the detection system can be made to decrease further the detection limits. The excitation spot size difference shows clearly that fiber coupling of the detection system to the optical collection lenses would allow more scattered light to be focused into the detector and give larger Raman signals, thus lowering the detection limits further.

Drone Application

A device capable of detection of chemical hazards with near instantaneous response under daylight exposure conditions while in flight. The device incorporates a unique optical collection configuration that enables detection, from a distance, of a broad range of analytes at levels of 1 mg/cm2, with high signal-to-noise ratio, and high resolution; all with a single 6 nanosecond laser pulse. Applications include hazard detection.

The system is a flight ready detection system having a vehicle born excitation laser, an unmanned aerial vehicle (UAV) born detector and a Command and control system for interfacing between the laser system and the UAV detection system. IN one embodiment, detection limits approach a target of 1 mg/cm2 at proximal detection distances of 10 meters. Targeting and vibration control of the laser system is accomplished using a gimbal mounting system with a low power CW pointing laser. The alignment of the pointing laser with the projected path of the excitation pulse is synchronized to allow the airborne detection system to be pointing at the anticipated excitation impact area and allow Raman scatter to be collected. In total, the SWAP requirements for the excitation laser and its control system will be <5 lbs. and ca. 2500 cm3 volume with <300 W needed to run the excitation laser, the pointing laser and gimbal mount and control electronics. An off-axis parabolic collection mirror and spectrograph/detector are integrated into a single unit. The customized spectrograph detector system is based on a modified Czerny-Turner design which maximizes deep-UV through put while incorporating a USB interfaced camera.

Methods to detect hazardous or illicit materials accurately, rapidly, and at discreet distances, are needed to protect our warfighters and civilians from inadvertent exposure and harm. These hazards include chemical agents that have been purposefully dispersed as sprays, fallout from exploded ordnance, or chemical components that have been accidentally leaked or spilled into the environment. The capability to identify these hazards while avoiding direct contact and to map their spread in real time is a daunting task. Current technologies cannot provide stand-off detection of these elements at the speed required, until now. This detection need is addressed herein with a unique optical collection configuration that allows the efficient collection of Raman scattered light to detect surface contamination in real time, while in motion and under daylight conditions. This transformational technology allows rapid, single nanosecond-laser pulse detection of chemical signatures with unprecedented accuracy. Contemplated deployments include a small detection unit for concurrent multi-surface chemical analysis as the payload of an unmanned aerial vehicle (UAV). The detection unit will be in communication with an operator where visual examination of collected data takes place in real time. The data, including GPS location, can be archived to allow detailed analysis and subsequent monitoring of contaminant migration as a function of time. Axillary applications include domestic chemical spill mapping/mitigation and site specification crop management.

Figure 38:
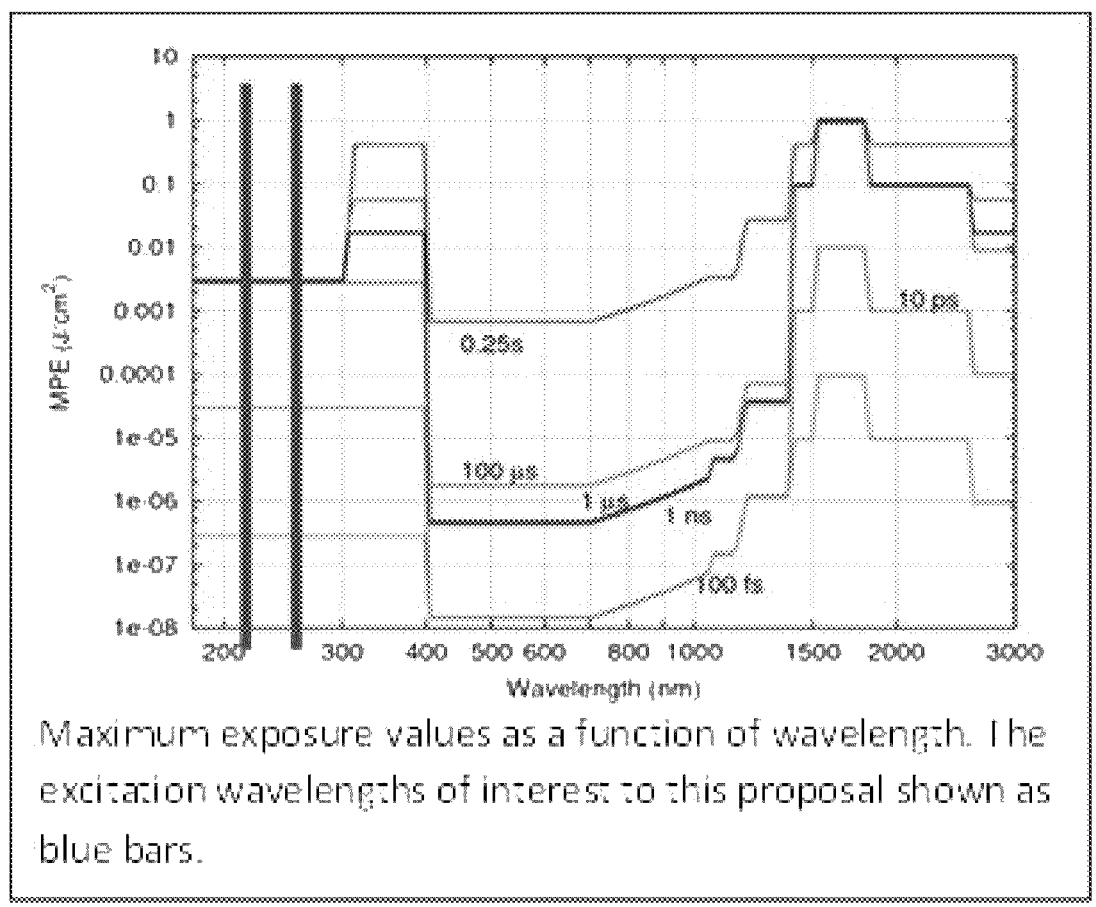
FIG. 38 illustrates eye safety.

An additional consideration for the system relates to eye-safety. The use of high peak power laser systems in public spaces must also consider the possibility of harming warfighters, other security personnel and possible civilian bystanders. ANSI and OSHA have set specific guidelines for the use of lasers in outdoor applications. As shown in FIG. 38, the use of 266 and 213-nm light pulses are considered eye safe when compared to similar exposures levels of visible or near IR sources. According to ANSI Z136.1-201.4 and ANSI Z136.6 -2015 the maximum permissible single exposure for our wavelengths of light are 4 mJcm−2, or about 5000 times higher than the maximum allowable exposure to visible light.

Proof-of-concept studies using a device as illustrated in FIG. 39, have confirmed the ability to collect light from a large surface area that is equal to the cross-section of the coupling lens. Samples of solids and liquids are set forth in Table 1, some of which absorb strongly at the excitation wavelength (bold) and others that do not. These measurements are not masked by fluorescence because the excitation, and the subsequent scatter, are both higher in energy than the background emission. A detailed review of the limits of detection listed in Table 1 reveals that the system, exciting with 2 mJ of 213-nm light and 1 inch optics to collect light from 1 m from the sample, meets requisite detection limits. These detection limits can be improved by using larger excitation energies, larger collection optics and more sensitive (less noisy) detectors.

TABLE 1

| Substance (Liquid) | LOD (mg/cm$^2$) | Substance (Solid) | LOD (mg/cm$^2$) |
| --- | --- | --- | --- |
| Acetone | 5.4 | Ammonium Nitrate | 2.6 |
| Acetonitrile | 4.1 | 2,4 Dinitrotoluene | 0.78 |
| Cyclohexane | 4.5 | Ibuprofen | 0.48 |
| 1,2 Dichloroethane | 4.5 | Sucrose | |
| Methanol | 4.8 | Potassium Chloride | 22.7 |
| Nitrobenzene | 2.2 | | |
| Nitromethane | 2.2 | | |

This example embodiment provides an optical detection system capable of identifying chemical constituents rapidly, at proximal distances of two meters, while in motion as a payload on a UAV while in flight. The system is includes i) a vehicle born excitation laser source ii) UAV born detection unit, and iii) a command and control system for interfacing between the laser system and the UAV detection system.

Excitation Laser System

The excitation source is a pulsed Nd:YAG system generating 266 and 213-nm output at 9 and 3 mJ per pulse, respectively. This choice of laser is not only driven by the deep-UV Raman application described below but also allows a dual use application of LIDAR. The nanosecond pulses used in this embodiment, allow LIDAR ranging with ±10 cm accuracy. There are several commercially available systems that can produce the desired output, for example the Quantel (Lumibird) VIRON systems (VRN20-50) are powered using 24 vDC at 250 W with a repetition rate of 20 pulses per second. The laser and harmonic generation optics weigh only 3.85 lbs and are housed in a ca. 20×9×6 cm container. The fifth harmonic would be retrofitted using customized optics. It is expected that 2-3 mJ of 213 would be available with weight remaining below 4 lbs. The output available is 2-3 mJ of 213 or 9 mJ of 266-nm light with a repetition rate of up to 20 Hz.

Figure 40:
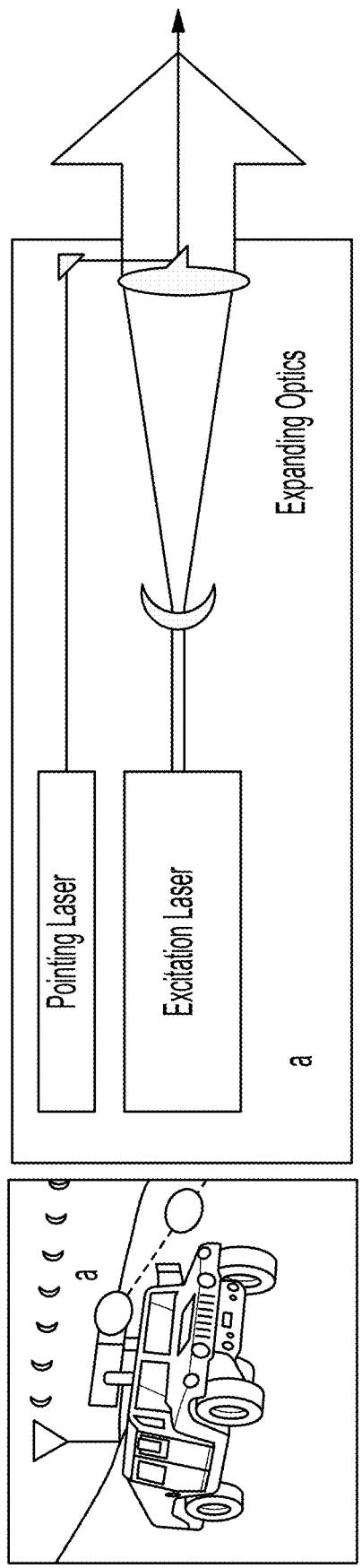
FIG. 40 illustrates a drone embodiment.

In one embodiment, the excitation cross section for the collector is 78 cm2 (10 cm diameter). The VIRON system has a beam diameter of 3 mm. Thus, the laser system is fitted with beam expansion optics to allow collimated output of 10 cm in diameter (See FIG. 40). Targeting and vibration control of the laser system will be accomplished using a gimbal mounting system with a low power CW pointing laser. The pointing laser will serve to allow continuous tracking by the UAV system since the excitation itself is pulsed. It is contemplated that a low power visible or near IR laser will suffice for this purpose when used in conjunction with the collision avoidance and following capabilities of the UAV autonomous control system. The alignment of the pointing laser with the projected path of the excitation pulse will use two steering prisms. In total, the SWAP requirements for the excitation laser and its control system will be <5 lbs. and ca. 2500 cm3 volume with <300 W needed to run the excitation laser, the pointing laser and gimbal mount and control electronics.

UAV Mounted Chemical Detection System.

Figure 41:
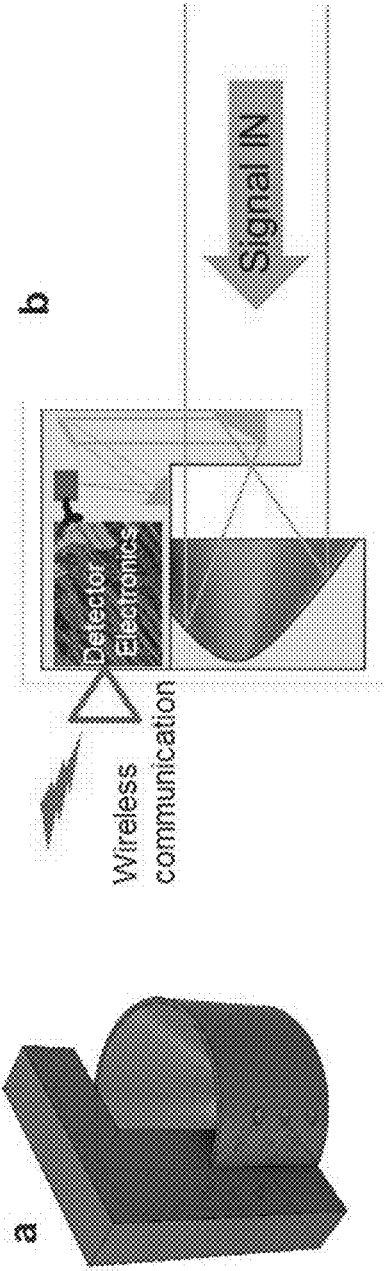
FIG. 41 illustrates a drone embodiment.

Preliminary results have shown that the 1 mg/cm$^2$ surface contamination levels can be achieved using 2.5 mm optics with 4 mJ per single 6 ns pulse excitation at 266 nm with proximal distance of ~1 meter. Using these factors as a baseline, the question becomes what is needed to achieve lower detection limits at twice the stand-off distance? Signal intensity is directly proportional to excitation power, signal collection area and inversely proportional to the square of the distance. The VIRON laser as per above we will double the excitation power used in the prototype, therefore double the signal intensity. Moving the collection optics twice as far from the sample drops the signal intensity by a factor of four. The remaining signal increase is achieved by using a 10 cm diameter parabolic mirror as the collection optic, thus increasing collection efficiency by a factor of 16. Overall, it is projected that signal intensity will increase relative to what is currently observed by a factor of 8-10 and thus drop the LOD values to below the target values The proposed detector system proposed is shown in FIG. 41. As shown, the parabolic collection mirror and spectrograph/detector are integrated into a single unit. The customized spectrograph detector system is based on a modified Czerny-Turner design which maximizes deep-UV through put while incorporating a USB interfaced camera. The dramatic increases in camera technology over the last five years, driven in part by cell-phone photography, has produced sensitive, lower dark noise, low power, room temperature cameras at a modest cost, for example the GSENCE400BSI sCMOS sensor. Overall, this camera can operate at room temperature with a very low power consumption (<0.6 W). A Peltier cooling system may be added to decrease the dark current (increase signal to noise, lower LOD' s) at an additional power cost and added thermal shielding of the sensor. Incorporating the latest sensor into our design, along with −20 C temperature control should increase our signal to noise ration while decreasing our LOD by a conservative estimate of an additional factor of 10. The SWAP associated with the sensor alone will be smaller the 1000 cm3, weighing <3.5 lbs with a total power requirement of 1 W (51 W with cooling unit).

In preparation for flight, a gimbal stabilizing mount for pointing the detector at the excitation laser spot, CPU control unit for the detector, temperature controller (if needed) and Wi Fi Direct for wireless data transfer from the detector to a remote system control unit would add an additional 15 W and 1.0 pounds. Overall, the detector, prepared for flight, would be about 1000 cm3, <4.5 lbs. and 16 W (66 W if cooled); well below the target SWAP.

Command and Control System

The Command and control system is a laptop computer that will be used as a Wi Fi Direct access point and for data analysis, storage and display. The excitation laser mounted on the NBCRV and the detector mounted on the UAV would need communication and timing control to achieve the very low limits of detection described above. Targeting the excitation laser while the vehicle is in motion, for example rastering between limits, or projected more elaborate patterns, would be accomplished through direct communication between the Command center the excitation gimbal mounting system. Such communication could be USB or wireless (Wi Fi direct) since the Command Center will be located inside the NBCRV. The UAV born detector will follow the low power targeting laser that is part of the excitation laser system. Thus, communication between the detection system and the excitation laser is minimized, requiring only the targeting laser. Triggering of the detection system will be accomplished using the UAV born detector by monitoring peak intensity of the excitation source. A 50 ms delay between laser pulses (i.e. 20 Hz operation) allows subsequent laser pulses to be times to within a few nanoseconds.

This method does not require measurement of the distance between the UAV and the NBCRV. The Command center need only communicate with the UAV detector to recover data and record GPS location. In one embodiment Wi Fi Direct communication is used. Wi Fi Direct can deliver data transfer rates in excess of what will be needed for our system at distances of 200 meters. Once the data are transferred to the Command Center, it can be viewed, subjected to library comparison, or simply archived for subsequent review.

Specific Tasks—Contemplated Next Studies—Chemical Spill Detection and Mapping

Figure 42:
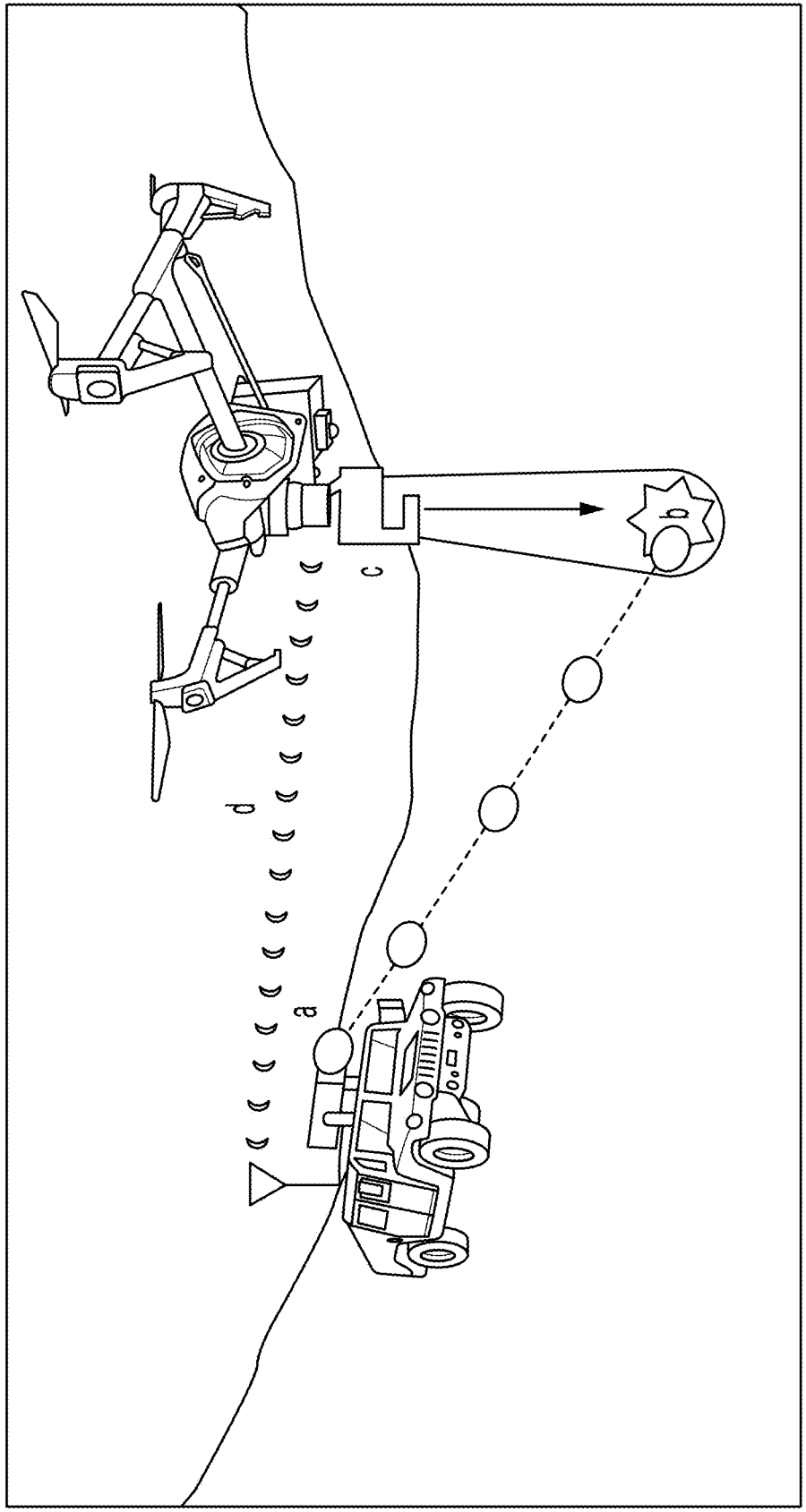
FIG. 42 illustrates a drone embodiment.
Figure 43B:
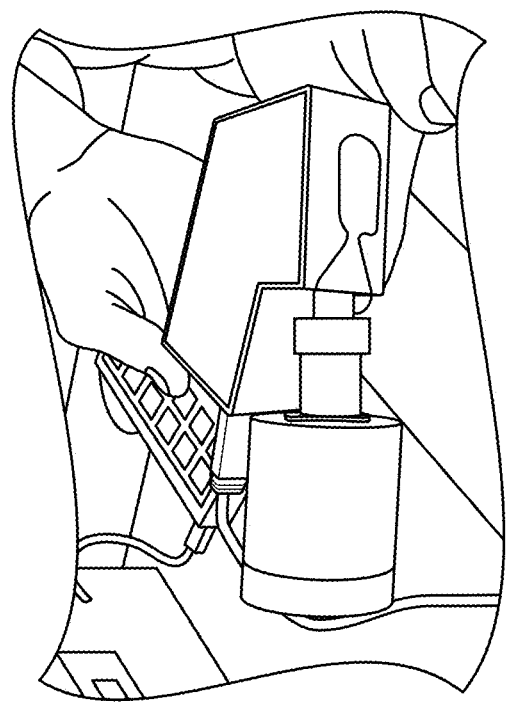
FIG. 43 provides (a) schematic representation of the hand-held scanner and (b) a photograph of the detection unit (laser is separate).
Figure 43A:
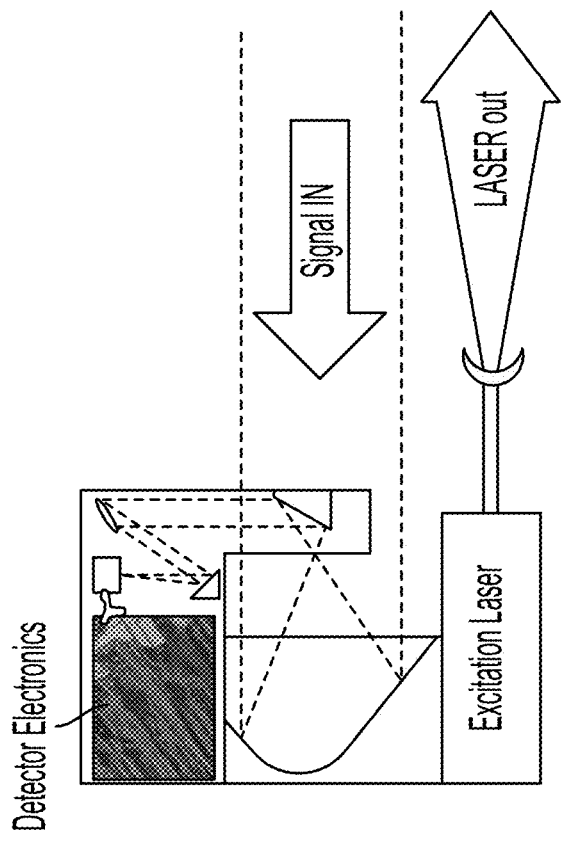

Further contemplated work includes the build of the device illustrated in FIG. 42. As illustrated, a single nanosecond-laser pulse (a) scatters off chemical agents (b) to produce Raman scattered light producing chemical signatures. Contemplated deployments include a small detection unit (c) for concurrent multi-surface chemical analysis as the payload of an unmanned aerial vehicle (UAV). The detection unit will be in communication (d) with an operator where visual examination of collected data takes place in real time. The data, including GPS location, can be archived to allow detailed analysis and subsequent monitoring of contaminant migration as a function of time. Axillary applications include domestic chemical spill mapping/mitigation and site specification crop management.

In one study LODs of the compounds of interest including malathion and parathion, as surface contaminates on backgrounds composed of organic vegetation, soil, sand, and pavement (concrete, asphalt, grass, and sand surfaces) will be determined. Studies are to be conducted using liquid droplets of ~500 μm, micron on the various relevant surfaces at aerial concentrations of no more than 10 grams/square meter. We project an improvement in LOD for the majority of compounds, conservatively, of below the threshold value of 10 $g/m^2$ and close to the 1 $gr/m^2$. target levels, without cooling the detector. Adding cooling would exceed the target levels in LOD but at a cost of significant increase in power consumption.

The single laser pulse detection technique of the present invention allows accurate detection while the platform is in motion. Assuming airspeeds of 45 mph, the build will comprise a laser source mounted on base platform integrated with optical detection unit mounted on UAV and will record spectral information with ~3 foot resolution. Slower airspeeds will yield higher spatial resolution, for at 10 mph, the detected areas will overlap. Hovering will lower the detection limits through signal averaging. The small SWAP of our detector system should allow a selection of several UAV systems to carry out the flight plan. The system will comprise a laser source having size, weight, and power of less than 50,000 cm3, 50 lbs, and 350 watts and a remote optical sensing platform having size, weight, and power of less 1000 cm3, 6 lbs, 150 watts. The eye-safe system will further provide detection of at least 10 grams per square meter of multiple solid or liquid contaminants. The UAV-mounted receiver will have a standoff range of at least 1-meter, while the laser source will have a standoff range of 50 meters at slant angles approaching 180 degrees.

Hand Held Application

FIG. 43 provides a schematic of the UV Raman spectrometer in which 213-nm light was generated as the fifth harmonic of a pulsed nanosecond Nd:YAG laser. Unfocused laser was directed onto the sample using dichroic mirrors. The scatter (dotted lines) was collected perpendicular to the incident beam. A notch filter was used to reject the scattered laser frequency. A quartz lens was used to focus a collimated beam into the input slit of the spectrograph/detector system. The clear advantage of this system is the ability to collect light from a large surface area that is equal to the cross-section of the coupling lens (in this case 16 $cm^2$).

In a contemplated study an optical detection system will be built based on the modular components: an excitation source, a detection unit, and a command and control system. The expected excitation source will be a pulsed Nd:YAG system capable of delivering 50 mJ of 1064-nm fundamental. Harmonics at 532, 355, 266 and 213 nm will also be available. The choice of excitation wavelength will depend on the specific detection task and will be determined based on eye-safety requirements, detectability of specific compounds of interest, and the desired limit-of-detection levels. The integrated detection unit will include collection optics and spectrograph/detector based on a modified Czerny-Turner design. The characteristics of the detector unit (i.e., wavelength range, spectral resolution, etc.) will again depend upon the specific detection task. The command and control systems will allow wireless data transfers between the operator and detection unit. The unit will be tested chemical targets such as malathion, parathion, organic nitro compounds, inorganic salts, and peroxide-based compounds. The unit will also be tested against deposited aerosol droplets dispersed on a sand simulated surface to determine the limits of detection at 1 m proximal distances. Contemplated studies will further include operational variables and concentration mapping. Mapping of chemical concentrations will require an understanding of how measured intensities relate to concentrations as a function of distance between sample and detector, the optical collection efficiency (i.e., relative diameters of the collection optics and excitation pulse, detector targeting accuracy, etc.), and excitation power and wavelength (i.e., penetration depth vs sample thickness).

Alternative Hand Held Embodiment

Methods to detect hazardous or illicit materials accurately and rapidly while at discreet distances are needed to protect warfighters and civilians from inadvertent exposure and harm. The capability to locate and identify hazards while avoiding direct contact in real time is a critical task largely unmet by existing technologies.

Detection may be accomplished with a unique optical collection configuration that allows the efficient collection of Raman scattered light to detect surface contamination in real time, under a range of light conditions. Certain embodiments of the present disclosure allow rapid, laser-based detection of chemical signatures with high accuracy.

Certain contemplated deployments include a single person-carried, battery operated, laser-based optical detection unit for concurrent chemical analysis. Such a detection unit may be capable of searching an extensive threat library, displaying warnings to an operator where visual examination of collected data takes place in real time. Data, visual maps, and GPS locations can be archived for further analysis and subsequent monitoring.

Raman spectroscopy, largely due to its molecular specificity, is a favorable technique for hand-held proximal detection systems and shows promise as a selective analytical technique. Unfortunately, the Raman effect is inherently weak. As a direct result, many applications attempt to use high-intensity laser sources to elicit a strong scattering response. Certain applications use a focused laser that vaporizes (or burns) a sample and requires accurate focal plane adjustment while examining a very small surface area. These applications result in a poor detection technique. As laser power, not intensity, is important to elicit a strong Raman response, the present disclosure includes developed paradigm shifting technology using collimated beams to interrogate large surface areas, remove the focal plane issue and allow strong scattering response while avoiding sample degradation. Such techniques provide a selective and sensitive analytical technique for stand-off detection.

In certain embodiments, a hand held embodiment may leverage attributes of a vehicle portable deep-UV Raman stand-off system and near-IR Raman hand-held proximal detection device to produce a singular man-carried, battery operated, stand-off detection platform capable of identifying chemical contaminates in seconds and mapping large areas in minutes. In certain embodiments, the device (e.g., a handheld embodiment) may be capable of detecting chemicals of interest at distances of up to 20 m in a 12 $cm^2$ area. Such a device may include operational software, library and search capabilities, on-board determination of potential threat, and archival data storage.

A hand held device may have a unique optical configuration which allows large surface areas to be examined in seconds for detection and identification of chemical constituents at contact to stand-off distances. Such a device may have operational and performance capabilities such as: an unfocused high-power laser source and multiple excitation wavelengths; considered "eye—safe", and nondestructive to samples; detection time may be less than 60 seconds; contact to stand-off detection and identification in a single device; a large (e.g., 12 $cm^2$) sampling area; a limit of detection of less than 1 µg/$cm^2$ on surfaces; size-weight-and-power (SWaP) of less than 0.7 $m^3$, less than 25 lb, and AC, vehicle, or battery power; usability in a plurality of different light environments, such as daylight, indoor, dark, and invisible exposure conditions; an extensive user-updatable library (e.g., including chemical warfare agents (CWA), non-traditional chemical agents (NTA), opioids, toxic industrial chemicals (TIC), and explosives); search engine which minimizes false alarms; and/or visual image with overlay.

In certain embodiments, such a device comprises three modular components: i) an excitation laser source; ii) a detection unit; and iii) a command-and-control system for controlling the laser and detection units, on-board data analysis and storage, as well as near-real-time remote analysis of transmitted data.

In certain embodiments, the excitation laser system (e.g., an excitation source) is a solid-state pulsed laser system generating 266, 355 and 532-nm light pulses. Such a laser system may be powered using on-board battery source (24 v) as part of the payload. Laser and harmonic generation optics may be about 90 $in^3$ and weigh 3.9 lb. The power source can be a 24-v power source or a battery system which depends upon anticipated duration of use. A fifteen (15) lb battery payload may allow for 30 minutes of continuous operation.

In certain embodiments, the detection unit may be collection optics with a spectrograph/detector integrated into a single module. A customized spectrograph detector system may be based on a modified Czerny-Turner design (which maximizes deep-UV throughput while incorporating a USB interfaced camera). Modern camera technology has produced sensitive, lower dark noise, low power, room temperature cameras at a modest cost. For example, the GSENCE400BSI sCMOS sensor is an available system. Overall, this camera can operate at room temperature with very-low power consumption (<0.6 W). A Peltier cooling system may be added to decrease the dark current (e.g., increase signal to noise, lower LOD's) at an additional power cost. The SWaP for certain detection systems would be about 100 $in^3$ in size, <8 lb in weight, and require only 66 W (e.g., if cooled to −20 C in certain operation conditions).

In certain embodiments, the command-and-control system may be a small CPU unit (e.g., Raspberry Pi, a microprocessor, etc.) that can be used as a Wi Fi Direct access point and for instrument control, data capture, analysis, storage, and display. Certain embodiments may use Wi Fi Direct communication for such information transfer, but other embodiments may adapt to a secure communication link. Wi Fi Direct can deliver sufficient data transfer rates at distances greater than 200 meters.

Second Alternative Hand Held Embodiment

This embodiment uses line-narrowed diode laser excitation at 785 nm to interact with chemical agents and produce Raman scattered light as a chemical signature with unprecedented accuracy. Details of the instrument design and its specifications along with the rationale for the design choices are presented below. A selection of spectra obtained using the device under operational conditions along with measured detection limits are described.

Design Rationale

The proposed detection unit was required to allow communication with an operator where visual examination of collected data takes place in real time. The data was to be archived to allow detailed analysis and subsequent monitoring of contaminant migration as a function of time. Successful development and optimization of the results of this research project will yield a platform technology having a broad range of applications including proximal detection of surface hazard/contamination. In one embodiment UV laser pulses are used. Data described in this section was obtained with 785-nm line-narrowed diode laser excitation A 785-nm excitation source with 600 mW continuous excitation was selected (Ondax OEM-785-PLR600-FCPC-3 SureLock Butterfly). This choice of excitation dictated the choice of a detection system to be used.

Figure 54:
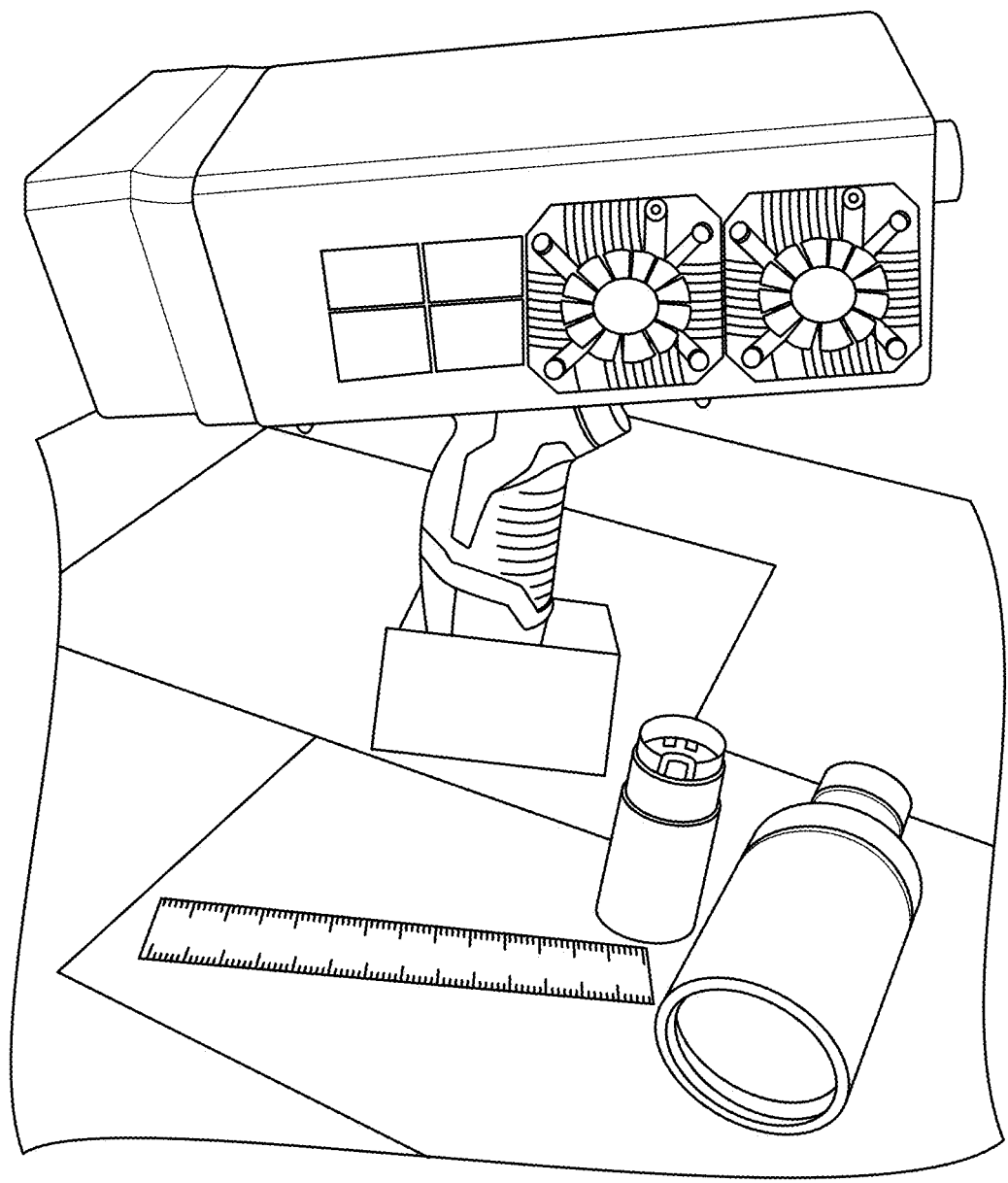
FIG. 54 is a photo of a second alternative hand held embodiment.

Ultimately, a thermoelectrically cooled linear charge-coupled device (CCD) array (Glacier X BTC112E, BWTech) was selected to allow lower dark signal with high sensitivity through the near-infra red (IR) where Raman scatter was expected with this excitation wavelength. To control both the laser and the detector a Raspberry Pi4 B (2018) was selected with 64 Gb available data storage. The addition of a PiTFT Plus 320×240 3.2 TFT with resistive Touchscreen was added for user interface. A wireless mouse was also made available to allow user interface with single button operation. These components dictated a ca 5.1-5.2-volt power source. A Mean-Well PSD-30A-5 isolated power converter was selected to allow the desired 5.2-volt output using military standard 12 v rechargeable battery packs with nearly 90% power efficiency. The actual battery supplied is a COTS 12 v 4 A/hr Li-ion rechargeable battery with recharging stand (M12 Milwaukee Tool). This combination of components allows more than 1.5 hours of operation on a single battery charge and nearly 100 hours of data storage. The system is easily hand-held with ~2.5 L volume and 2.2 Kg mass (including the battery pack). The assembled system is depicted in FIG. 54 along with two optional collection optics.

Design Specifics.

Figure 55:
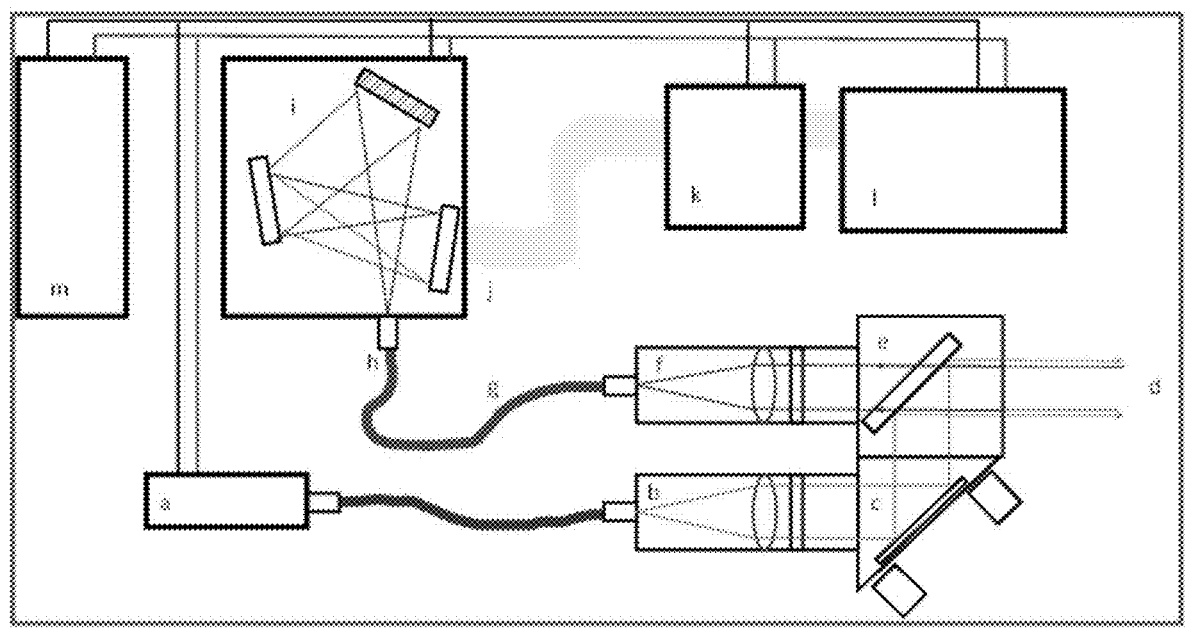
FIG. 55 provides a schematic diagram of a second alternative hand held embodiment.

A schematic diagram of the hand-held Raman sensor is provided in FIG. 55. FIG. 55 provides: (a) laser, (b) FC fiber coupling to collimation optics, (c) mirror, (d) sample, (e) beam splitter, (f) SMA fiber coupling, (g) optical fiber, (h) spectrograph interface, (i) spectrograph, (j) detector, (k) CPU, (l) display and user interface, (m) power module. FIG. 55 presents (a) the 785-nm line narrowed multimode diode laser with its control electronic and thermoelectric (TE) cooled bed (Ondax OEM-785-PLR600-FCPC-3 SureLock Butterfly). Additional convection cooling of the high temperature side of TE cooling plate has been supplied using electronics cooling fans located on the outside of the sensor case. The laser is "power on" upon initial switching of the power supply. An adjustable potentiometer allows the control of the laser output from simmer (just below laser threshold) to full laser power output (600 mW CW). The laser output is factory coupled into an optical fiber which in turn is coupled to a laser collimation optic (b, ThorLabs) using a fiber channel (FC) connection. The collimated laser output is filtered using an optical line filter to reduce unwanted spontaneous output from the light-emitting diode (LED) and subsequently directed into a beam splitter cube (e) using a gold mirror (c, Thorlabs). The beam splitter cube (e) has a 45° 785-nm Raman notch filter (LayerTec) which redirects the laser output toward the sample (d). Scatter from the sample is directed through the beam-splitter and is subsequently coupled into an optical fiber (g) using commercially available coupling optics (f, ThorLabs). The distal end of the fiber acts as the detector input slit (h). The supplied fiber is 100 mm in diameter and allows near fundamental resolution vibrational spectra to be collected. Larger diameter fibers can be added to increase the signal throughput but will result in lower resolution spectra being recorded. The fiber output is f#-matched to the spectrograph input allowing the most efficient coupling of the signal to the detector with no additional optics needed. The grating resolution in this spectrograph was selected to disperse the complete Raman spectrum of typical target compounds while utilizing the entire surface of the detector (2048 channels) in a compact modified Czerny-Turner design. The detector selected is a TE cooled linear CCD array (j, Glacier X BTC112E, BWTech) to allow lower dark signal with high sensitivity through the near-IR where Raman scatter was expected. The system is controlled using an onboard central processing unit (CPU) (k, Raspberry Pi4) with a touchscreen interface (1, PiTFT Plus 320×240 3.2 TFT with resistive Touchscreen). Users may use a standard stylus directly on the screen or select a wireless mouse to supplement the user interface with single button operation. Spectra are stored on an onboard 64 Gb SD card. Larger storage capacity is commercially available either as an additional SD card or as a USB storage device. The 64 Gb data storage capacity allows more than 80 hours of continuous data collection and archival storage of the raw data files. The CPU programing and software is discussed in detail in Appendix A. The power module (m) includes a Li-ion rechargeable battery pack with 12 v, 4 Ah, output. The 12-volt output is power modulated to 5.2 volts (Mean-Well PSD-30A-5 isolated power converter) with 90% efficiency. This batter pack could be substituted for a standard 12-volt military battery. The embodiment uses a commercially available battery pack with recharge system and operates continuously for 1.5 hours. This system could be made "hot-swappable" to lengthen the operational time indefinitely.

The entire system is contained in a custom housing with an additional pistol grip to be less than 2.5 L total volume and 2.2 kg mass (4.75 lbs). Thus, it is easily transportable by one individual for hand-held operation.

Software Interface

Figure 56:
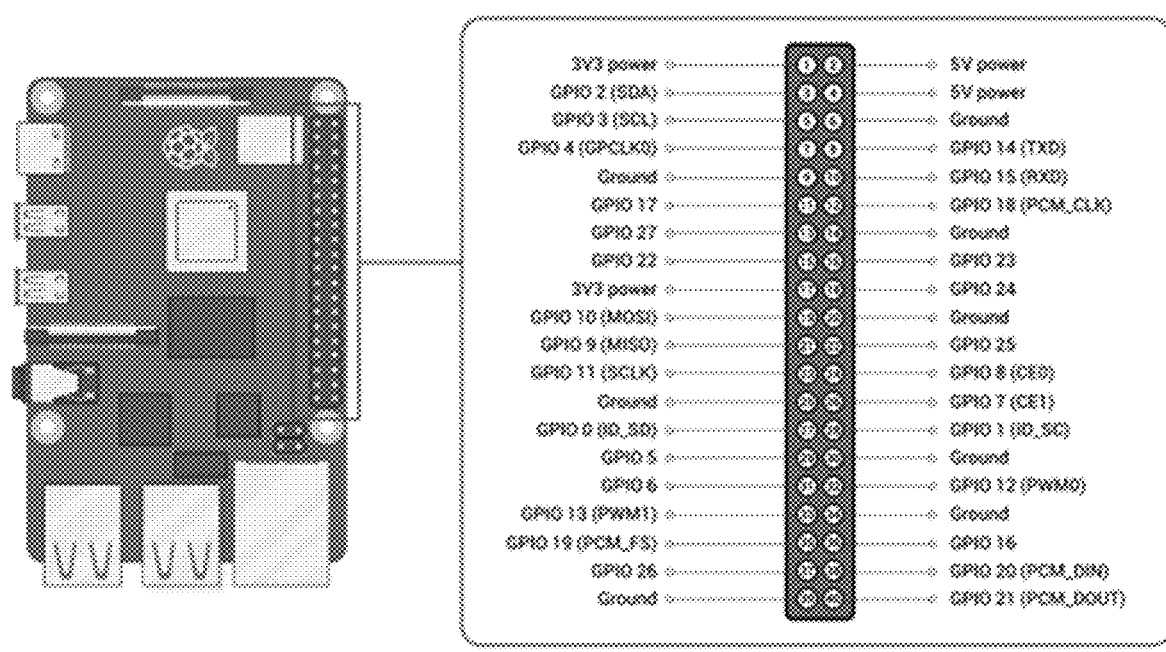
FIG. 56 depicts Pin assignments for Raspberry Pi.

The sensor CPU is a Raspberry Pi4, Model B, 2018 with the following characteristics:
Power In—power requirements: USB Type-C, 5.1V, 3A
Micro HDMI 0—best use with computer monitor
Micro HDMI 1
A/V
USB 2.0 (2)
USB 3.0 (2)
Ethernet
Camera—2 lane MIPI CSI
Display—2 lane MIPI DSI
Micro SD slot—for OS and data storage
40 GPIO pins FIG. 56 Provides Pin Assignments for Raspberry Pi The touch screen has been affixed directly to the Pi.
To change the screen preference—Use "PiTFT" as Raw Framebuffer Device, set up to display/dev/fbl
To complete this change. the user should, In terminal type, "cd Raspberry-Pi-Installer-Scripts" enter
"sudo python3 adafruit-pitft.py" enter
Python script will run so user can select options of the screen; correct options are presented below.
Configuration: {1} PiTFT 3.2" Resistive
90-degree rotation (for landscape view with pins on bottom right on back)
"no" to console question, "no" to HDMI question
To toggle between HDMI output and PiTFT Miniscreen—in terminal type,
"cd/usr/share/X11/xorg.confd" enter
"sudo nano 99-fbdev.conf" enter
In "Option" line . . .
"fb0" for HDMI
"fb1" for miniscreen
Exit (ctrl+x) and save change (y)
Reboot to apply change Sensor Operation Before turning Pi on: Detector power must be off to allow the Pi to clear buffered information; after Pi is turned on and ready to use, the detector power may be applied.
Run program by clicking executable file and "execute" (not in terminal)
Run program by clicking executable file and "execute" (not in terminal)
The sensor basic program can be accessed in the Linux menu. It can be found in:
"/home/pi/build-Test-Desktop-Release 1"
After starting the system and executing the program, the initial screen gives the following touch button menu items (touch screen or mouse click):
Continuously scan—initiates device, tests USB, and sets exposure time=5 secs if first time run and cycles the display through continuous data scans.
Close—closes program
Stop scan—stops scanning data; stops storing data if program is collecting data
Settings—opens new window for settings
Continuously store data—if new day, this button will create a new folder and open a new text file in folder of that day; stores continuously scanning data into the file. Otherwise, for subsequent collections, it opens a different text file for each new collection.
Stop storing data—stops storing data and closes text file.
Show averaged data—opens selected text file, reads lines of file and averages the columns of each line; graphs averaged data on graph in main window.
Back—closes settings window and returns to the operation window.
+: zoom in on graph (only works while continuously scanning data or just after stopping the continuous scan; when show average data, zoom in first before selecting which file to show average)

-: zoom out of graph (only works while continuously scanning data or just after stopping the continuous scan; when show average data, zoom out first before selecting which file to show average)

Remove baseline—takes one scan and stores that scan as the baseline to be subtracted from continuous scans Calibration The hand-held system collects raw, uncalibrated, spectra. There are two strategies generally pursued when chemical substance identification is desired. The first is to develop a chemical spectra inventory of all chemical species of interest and collect raw spectra of each for direct comparison in the field. This comparison has been known as occurring in "dirty space". While this strategy is in many ways the simplest, it does preclude comparison with known spectra in, for example, the NIST Chemistry Webbook. To access published chemical libraries, it is necessary to produce calibrated spectra in "clean space". It is well known that the appearance of raw, dirty space, spectra collected on different instruments will appear very different. Frequency shift, intensity, and spectral resolution, all of which impact the characteristics of spectra (their shapes, the number of peaks observed, and relative peak heights) must be calibrated to transform collected raw data in dirty space into standardized spectra in clean space. In general, NIST and ASTM take the lead in establishing standard procedures to ensure the proper description of materials being tested. Such has been the case in Raman spectroscopy, at least for visible excitation. The following paragraphs outline ASTM standard procedures in determining the frequency and relative intensities for use in calibrating Raman spectrometers.

Raman Frequency Shifts

The ASTM subcommittee on Raman spectroscopy has adopted eight materials as Raman shift standards (ASTM E1840). Raman spectra of eight common chemicals were recorded and the peak frequencies observed have been established as an ASTM standard for calibrating the Raman shift axis of Raman spectrometers (ASTM E 1849). While the ASTM standard procedure is only reported for use with visible excitation sources, the observed shifts are independent of excitation such that their use for any laser system should result in identical shifts being observed regardless of excitation. The present embodiment utilizes three standard materials for use in calibrating our raw Raman spectra. The preferred standards are cyclohexane, methanol, and acetonitrile, all of which are readily available in high purity and can be safely handled with limited environmental concern. The standard spectral parameters for these standards are collected in Table 2.

TABLE 2

Raman transition frequencies, assignments, and relative intensities.

| # | Sym | Assignment[a] | Freq[b] (lit) (cm$^{-1}$) | Intensity[c] (rel) |
|---|---|---|---|---|
| cyclohexane | | | | |
| $v_1$ | $a_{1g}$ | $CH_2$ a str | 2930 (2930) | 1.00 |
| $v_2$ | $a_{1g}$ | $CH_2$ s str | 2854 (2852) | — |
| $v_4$ | $a_{1g}$ | $CH_2$ rock | 1155 (1157) | 0.020 |
| $v_5$ | $a_{1g}$ | CC str | 799 (802) | 0.070 |
| $v_{19}$ | $e_g$ | $CH_2$ scis | 1446 (1443) | 0.052 |
| $v_{20}$ | $e_g$ | $CH_2$ wag | 1350 (1347) | 0.015 |
| $v_{21}$ | $e_g$ | $CH_2$ twist | 1266 (1266) | 0.044 |
| $v_{22}$ | $e_g$ | CC str | 1025 (1027) | 0.065 |

TABLE 2-continued

Raman transition frequencies, assignments, and relative intensities.

| # | Sym | Assignment[a] | Freq[b] (lit) (cm$^{-1}$) | Intensity[c] (rel) |
|---|---|---|---|---|
| Acetonitrile | | | | |
| $v_1$ | $a_1$ | $CH_3$ str | 2940 (2954) | 0.212 |
| $v_2$ | $a_1$ | CN str | 2252 (2267) | 0.097 |
| $v_3$ | $a_1$ | $CH_3$ s def | 1377 (1385) | 0.039 |
| $v_4$ | $a_1$ | CC str | 916 (920) | 0.017 |
| $v_5$ | e | $CH_3$ str | 3000 (3009) | — |
| $v_6$ | e | $CH_3$ def | 1443 (1448) | — |
| $v_7$ | e | $CH_3$ rock | 1039 (1041) | 0.005 |
| $v_8$ | e | CCN bend | 371 (362) | 0.033 |
| Methanol | | | | |
| $v_1$ | a' | OH str | 3340 (3328) | 0.145 |
| $v_2$ | a' | $CH_3$ str | 2946 (2980) | 0.442 |
| $v_3$ | a' | $CH_3$ str | 2837 (2980) | — |
| $v_7$ | a' | $CH_3$ rock | 1102 (1115) | 0.057 |
| $v_8$ | a' | CO str | 1035 (1030) | — |
| $v_{10}$ | a" | $CH_3$ def | 1457 (1480) | 0.050 |

[a]assignments from Shimanouchi, T. *Tables of Molecular Vibrational Frequencies Consolidated Volume 1*. NSRDS-NBS-39. 1972.
[b]Frequencies observed in this work are considered accurate to 4 cm$^{-1}$, literature values are included as described in footnote a.
[c]relative intensities in energy Raman Intensity Standards The intensities of Raman scattered frequencies are dependent upon a myriad of possible experimental considerations not least of which is excitation wavelength. Raman scattering cross-sections are dependent on excitation wavelength according to a well-known $1/\lambda^4$ dependence. The intensities are also dependent upon excitation and detector polarization, data collection angle, and possible resonance effects. As such they are notoriously difficult to record with accuracy. In so far as applicable, the ASTM standard procedure for intensity measurements was followed (ASTM E2911-13). Furthermore, the collection of relative scattering cross-sections for cyclohexane, methanol, and acetonitrile are also reported in Table 2.

Frequency Calibration Procedure

The sensor of this example embodiment stores spectral data as x-y data sets including Raman Shift ($\Delta cm^{-1}$ as x) and raw detector counts (intensity as y). Each subsequent data set is stored as only raw data counts (y-data only). This method of data storage saves significant storage space and relies on the wavelength calibration remaining stable from data set to data set. Therefore, each data file will contain pixel numbers in the first row, background intensities in the second row, and spectral data in each subsequent row. To display a background subtracted spectrum, the values stored in the second row will be subtracted from all subsequent data rows. The corrected Raman shift values were obtained using the standard data in Table 2 by comparison with the observed background subtracted spectra of the three standards. That is, plotting the accepted Raman shifts collected in Table 2 versus the observed pixel number and fitting to a third order polynomial. The best fit results for the polynomial function can then be used to convert pixel numbers into Raman scatter shifts.

The intensity variation with the detected raw spectra may be corrected by comparing the raw intensity to the standard intensity according to the simple polynomial expansion shown in equation 1.

$$DR(v)=a+b(\Delta cm^{-1})^{-1}+c(\Delta cm^{-1})+d(\Delta cm^{-1})^2 \quad (1)$$

Here, the frequency dependent detector response, DR(v), is determined by plotting the values of the stand intensities from Table 2 by the measured raw intensities relative for each observed transition, (i.e. DR(vi)=$I_{standard}(i)/I_{measured}(i)$) The plot of DR(v) versus Raman shift (in cm-1) is than fitted to the polynomial expression in equation 1 to return values of the parameters a, b, c, and d. These correction terms can then be applied to raw data and the resulting file output will yield standardized spectra in clean space. Alternatively, dirty space spectra may be obtained for use in the library by taking the inverse of these correction factors and applying them to known clean space spectra from external standard libraries.

Limits of Detection for Raman Measurements

A standardized method to report the limits of detection for Raman systems have yet to be defined by either NIST or ASTM. However, it is generally accepted to report Instrument Detection Limits (IDL) as the material concentration needed to achieve signal intensity 3 times the standard deviation in the blank noise. In this embodiment of this section, a target trace surface coverage of 1 mg/cm2 is used as standard for IDL. The combinations of detector sensitivity, laser peak power, and signal averaging required that achieves this limit will be different for all compounds. ILD values for example chemical targets are described below.

Example Spectra

Figure 57:
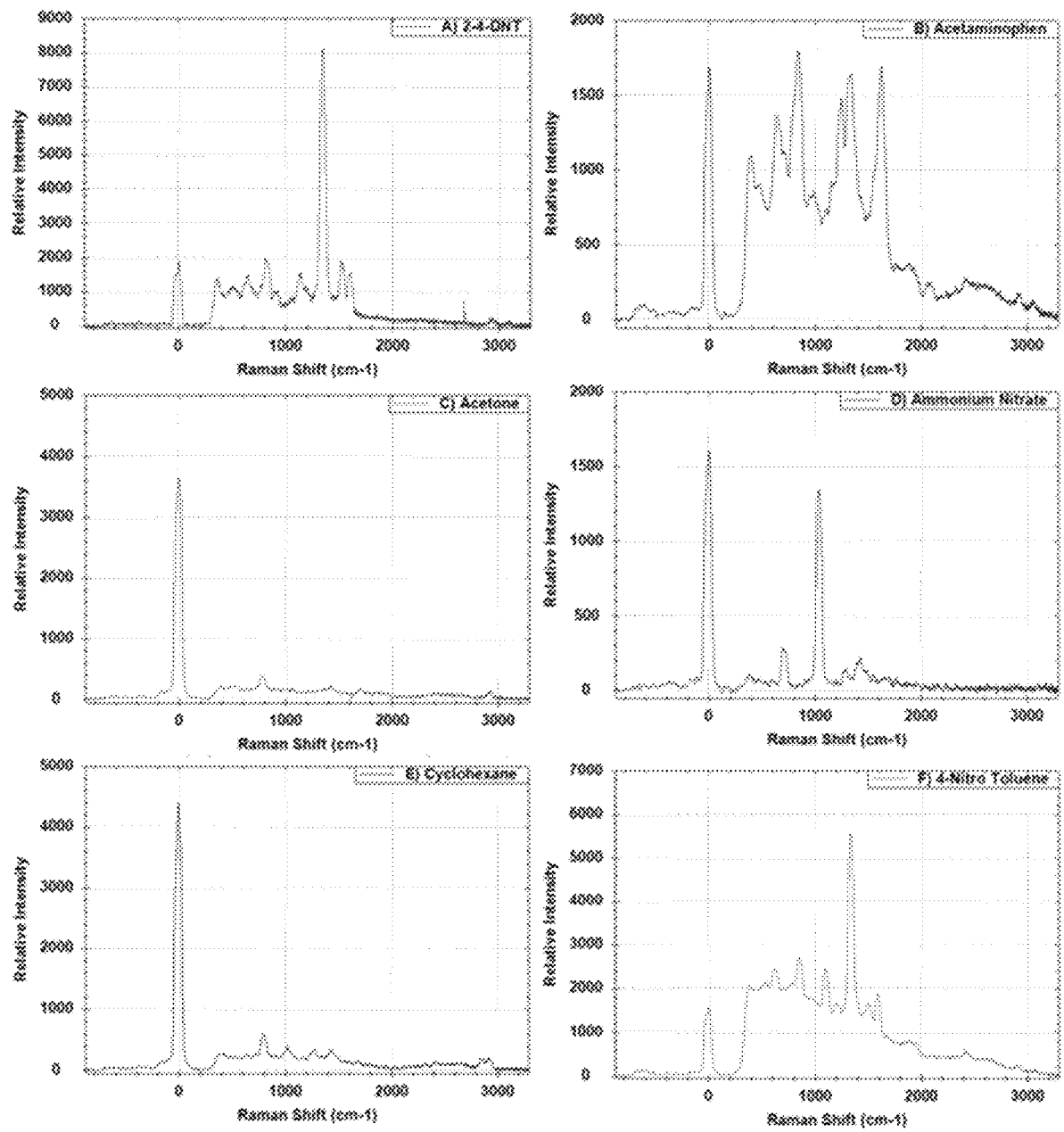
FIG. 57 provides example spectra.

Example spectra are provided in FIG. 57. These spectra were recorded using 500 mW 785-nm light as excitation and detector set to average 5 exposures of 5 seconds each (total of 25 seconds collection time) to examine bulk samples held in 10 mm Pyrex sample vials. The distance between the scanner to the bulk samples was ca 0.5 m. In addition to data averaging, FFT noise filtration was applied. The samples include crystalline solids and liquid samples of organic and inorganic compounds. Note that scattered intensity recorded at 0 Raman shift is due to the laser. The laser band width (peak height at half maximum) is a measure of instrument resolution—in this case ca 12 cm-1. The fundamental Raman peak widths are slightly small at room temperature at ca 7-8 cm-1. Thus, higher resolution spectra can be obtained although at a cost in signal intensity. As all samples were observed under otherwise identical conditions, it is possible to compare detection sensitivities for each of these samples. In each case, the observed Raman scatter is higher for the crystalline solid samples than for the bulk liquids. The typically large C-H stretching vibrations are smaller than expected due to low detector sensitivity at these frequencies. Nonetheless, each of the samples contains Raman signals with comparable intensity. This finding suggests that the IDL for all these compounds will be comparable (easily within a factor of 10). It is contemplated that this to be a general finding for non-absorbing bulk samples within distinct phases. Amorphous samples will show much broader and less distinct transitions.

Baseline variation is similar for all of the samples recorded and likely due to low level changes in sunlight entering the room with the exception of 1,3,5-trinitrotoluene where a significant fluorescence is observed. The feature near 350 $\Delta cm^{-1}$ is due to the Raman notch filter blocking lower scattering wavelengths. Thus, the lowest frequency shift observable with this sensor is ca 350 $\Delta cm^{-1}$.

Figure 58:
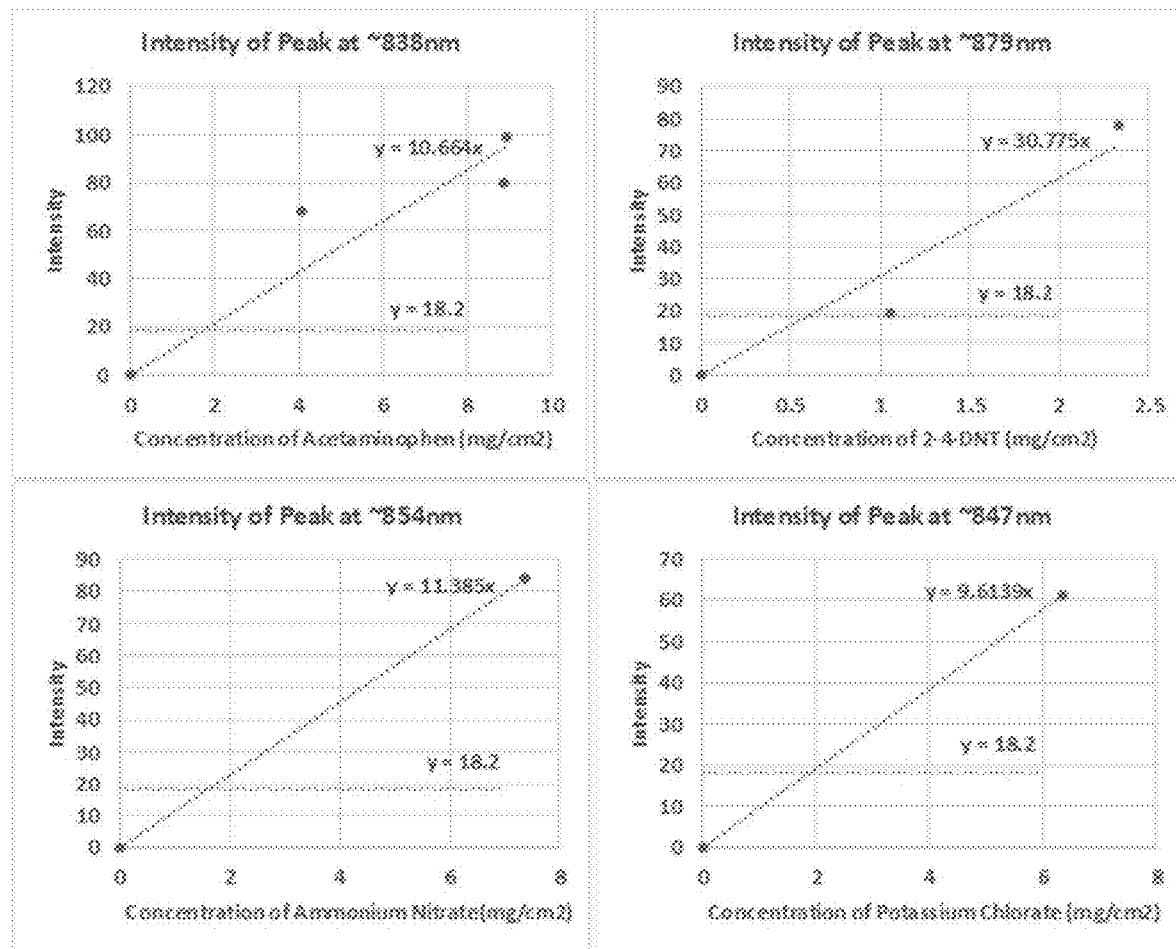
FIG. 58 provides example plots for the determination of IDL values for selected compounds.

Typical IDL values were determined as observed peak intensities greater than 3 times the standard deviation in the noise. The IDL values were estimated based on the measured intensities of three samples coated on silica gel substrates at different sample coverages. The plots of these data are shown in FIG. 58 for exemplary compounds. The red line represents 3 times the standard deviation in the noise. Thus, the plots record the IDL vales as collected in the Table 3 below.

TABLE 3

| Compound | Limit of Detection (mg/cm$^2$) |
|---|---|
| Acetaminophen | 1.77 |
| 2-4-DNT | 0.59 |
| Ammonium Nitrate | 1.60 |
| Potassium Chlorate | 1.89 |

Figure 59:
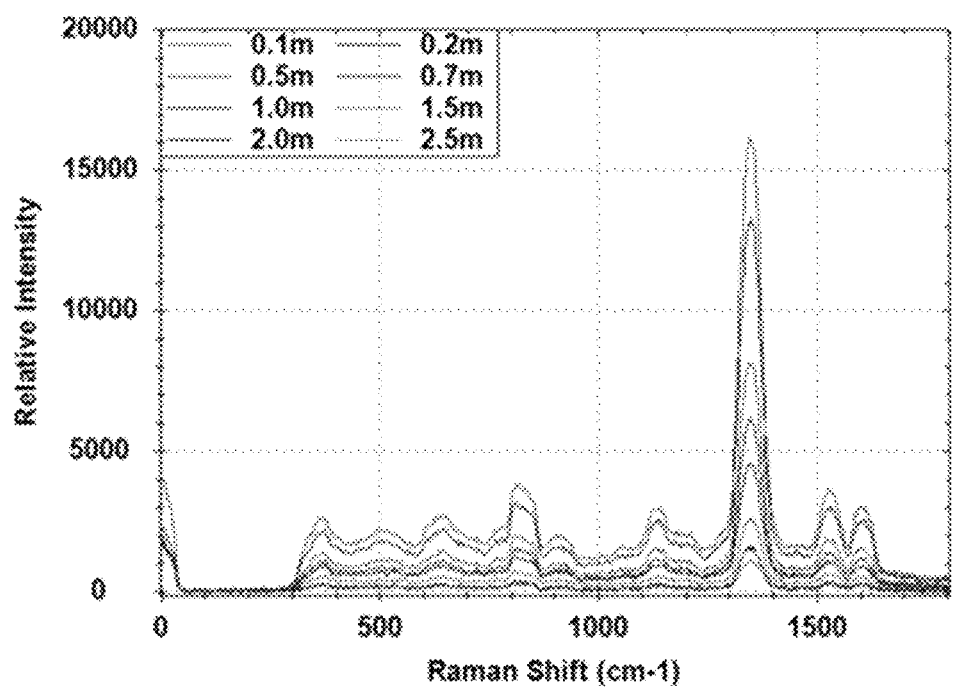
FIG. 59 provides distance dependence of the observed signal intensity.

As expected, the detection limits for these compounds are similar and in the range 1-2 mg cm-2. Mapping of chemical distributions requires an understanding of the distance dependence of the signal intensity for the sensor. Raman scatter from a bulk sample of 2,4-dinitrotoluene was measured as a function of distance as shown in FIG. 59 providing distance dependence of the observed signal intensity. A plot of the scattered intensity at 1345 $\Delta cm^{-1}$ for each of the distances is shown below where the blue line represents a decrease in distance as $(1/r)^{0.6}$. Typical Raman scatter is well known to decrease as $(1/r^2)$. The very low variability of signal intensity with distance is a design feature of this sensor although far better performance is possible if fully collimated beams are used. The current system used commercially available collimation optics which did not allow fine tuning of the output beam characteristics. Nonetheless, the ability to collect data from 3 meters using 8 mm diameter collection optics is exceptional.

Figure 60:
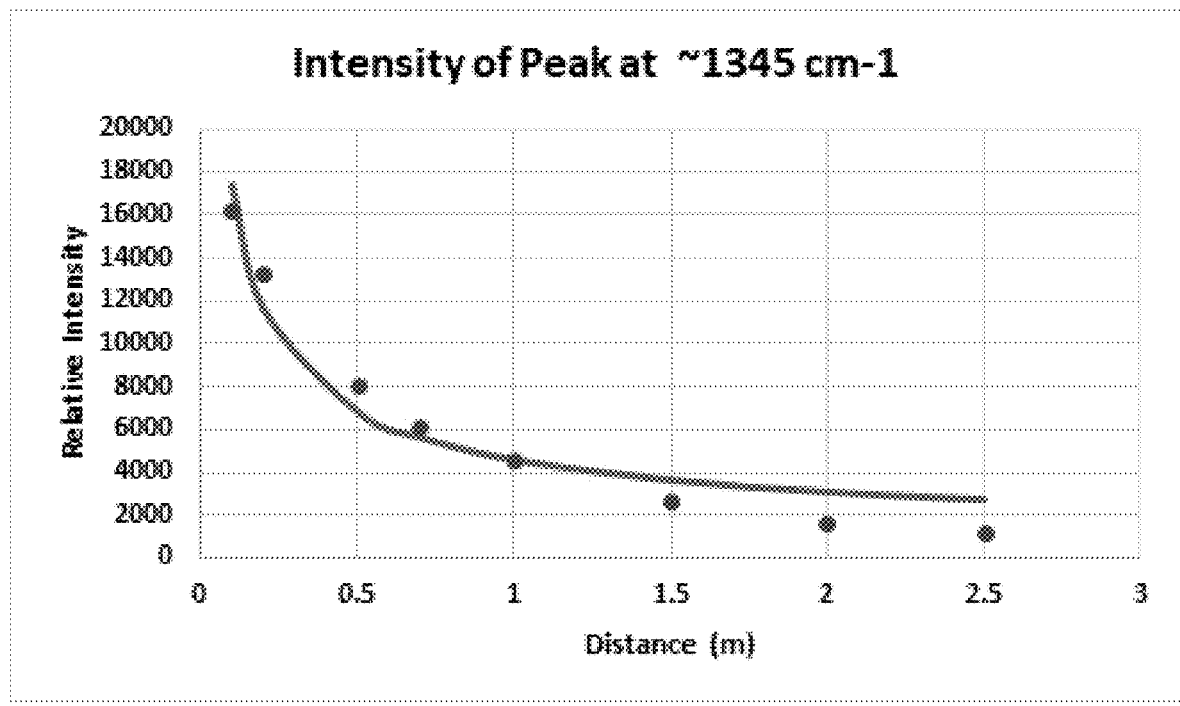
FIG. 60 provides a plot of the signal intensity decrease as a function of distance.

FIG. 60 provides a plot of the signal intensity decrease as a function of distance. Mapping studies for this sensor were carried out using 4 mg cm-2 samples of specific materials on silica gel substrate cards (10×10 cm square). A display of 6 samples were placed ca 1.5 meters away from the handheld sensor unit. Exposures of each card were collected sequentially for all 6 samples. FIG. 60 provides a 3D plot of these data where raw spectra are displayed as a function of time.

Figure 61:
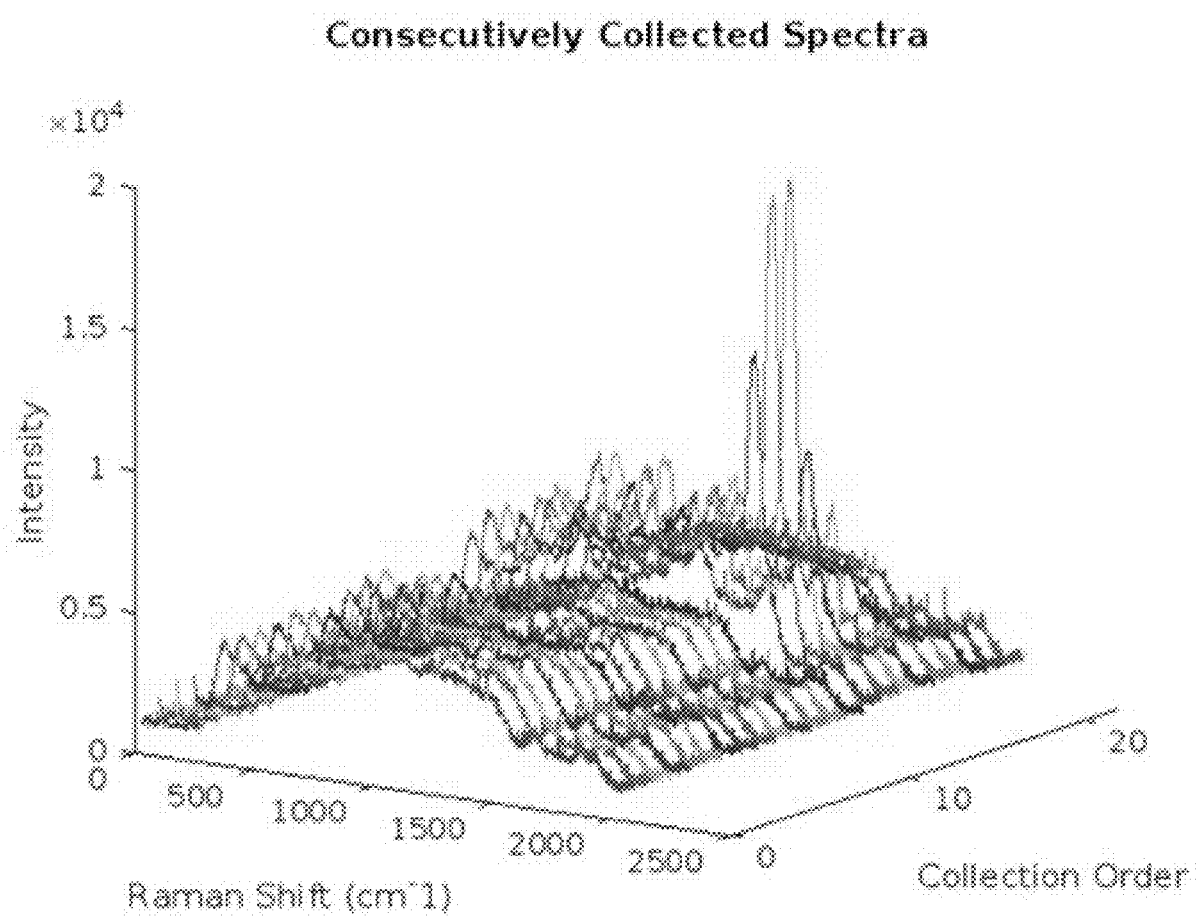
FIG. 61 provides mapping of individual compounds using a sensor of an exemplary embodiment.

FIG. 61 provides mapping of individual compounds using sensor of the embodiment of this Section. The spectra displayed can be assessed visually (individually) to allow direct determination of the compounds being examined. In this case, they include a dark scan (laser off) followed by samples of cyclohexane, acetone, sucrose, methanol, acetaminophen and finally 2,4-dinitrotoluene (2,4-DNT). Baseline subtraction aids in determining the identity of the materials being examined although the 2,4-DNT is easily distinguished from the others by observing the large 1435 cm-1 NO stretch.

SUMMARY

The embodiment of this Section allowed Raman spectra to be recorded accurately with rapid results (<25 seconds) and low detection limits (~1 mg cm-1). It did not destroy the sample or cause burning of materials. The system is battery operated and collects and stores data continuously for >1.5 hours. It is handheld (<4.8 lbs) and can be used to scan large areas rapidly. Improvements to the system can be made by using UV excitation wavelengths to lower the detection limits while maintaining eye-safe operation. Potentially, a combination of UV and 785-nm excitation could be used to dramatically improve detection limits and sample identifications of complex mixtures. We estimate that 1 ug cm-1 detection limits could be reached in a handheld compact multi-wavelength scanner design. Larger diameter collection optic could be used to allow scanning of larger objects or areas in single exposures.

Device Mounted to Lead Vehicle of Convoy

In certain embodiments, an exemplary system may be mounted to a vehicle (e.g., a lead vehicle) of a convoy. For example, the proposed detection system (e.g., of FIGS. 40, 41, 42, etc.) may be attached to a lead vehicle (e.g., a manned ground vehicle, an unmanned ground vehicle, manned aircraft, a UAV, etc.) of a convoy. The system attached to the lead vehicle may be communicatively coupled (e.g., remotely) to other detection systems of the convoy. In certain applications, the system (or plurality of systems) may execute a mission, such as the detection of a target (e.g., an explosive, a mine, a landmine, an IED, etc.) using the methods described herein. For example, as partially described in connection with FIG. 42, the chemical signals of a target may be used to identify the target, communicate information to an operator (e.g., a user), and/or archive positional data (e.g., GPS location). Such information may be communicated to a plurality of other vehicles in a convoy. For example, such information may be used by the convoy to avoid a particular location (e.g., the target, an identified area, etc.)

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

Having described embodiments for the invention herein, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. An apparatus for Raman spectra measurement, comprising:
    an excitation laser system including a laser configured to simultaneously output a single pulse of an unfocused beam of photons in two or more excitation wavelengths onto a sample;
    a detection unit including i) a plurality of collection optics, ii) a spectrograph equipped with a hybrid diffraction grating attached to a distal end of the stacked fiberoptic bundle, said hybrid diffraction grating comprised of a stack of at least two diffraction surfaces, each diffraction surface configured for blaze density and wavelength for one of the two or more excitation wavelengths, each diffraction surface individually angle-tuned and target-adjusted to disperse the scattered light, wherein the spectrograph is configured to illuminate all of the at least two diffraction surfaces simultaneously; and iii) an array detector system in optical communication with the spectrograph and configured to receive the dispersed scattered light from each diffraction surface onto a specific target section of an array detector, and output a spectral intensity measurement; and
    a command-and-control system configured to control the excitation laser system and the detection unit, the command-and-control system being communicatively coupled to the excitation laser system and the detection unit, the command-and-control system being further configured to analyze and store on-board data, the command-and-control system being further configured to remotely analyze transmitted data.

2. The apparatus of claim 1 wherein the laser is selected from the group consisting of: a Nd YAG laser, a ytterbium laser, a ytterbium-YAG laser, a ytterbium-doped laser, a ytterbium-glass laser, a titanium sapphire laser, a neodymium-glass laser, a neodymium-YCOB laser, a neodymium-YVO4 laser, a neodymium-YVO4 laser, a neodymium-YLF laser, or a neodymium-CrYAG laser, a helium-neon laser, and an argon laser.

3. The apparatus of claim 1 wherein at least one of the two or more excitation wavelength is selected from the group consisting of: 213 nm, 266 nm, 355 nm, 532 nm, 785 nm, and 1064 nm.

4. The apparatus of claim 1 wherein the laser output ranges from 1-100 mJ per pulse at 10 Hz.

5. The apparatus of claim 1 wherein the plurality of collection optics comprises:
    a dichroic Rayleigh filter stack in optical communication with scattered light from the single pulse of unfocused beam of photons incident on the sample; and
    a singlet lens in optical communication with the dichroic Rayleigh filter stack to focus the scattered light from the sample and couple the scattered light into a proximal end of a stacked fiberoptic bundle.

6. The apparatus of claim 1 further comprising a handle coupled to a housing supporting at least a portion of the excitation laser system and the detection unit, the apparatus being configured as a handheld device.

7. The apparatus of claim 1 wherein the spectrograph and array detector system are based on a modified Czerny-Turner design.

8. The apparatus of claim 1 wherein the command-and-control system includes a CPU configured to be used as a Wi-Fi Direct access point.

9. The apparatus of claim 1 wherein the command-and-control system includes a CPU configured for at least one of instrument control, data capture, data analysis, storage, and data display.

10. The apparatus of claim 1 wherein the detection unit is configured to be capable of i) searching a threat library and ii) displaying a warning to an operator.

11. An apparatus for Raman spectra measurement, comprising:
    a laser configured to simultaneously output a single pulse of an unfocused beam of photons in one or more excitation wavelengths selected from the group of wavelengths consisting of 213 nm, 266 nm, 532 nm, 785 nm and 1064 nm onto a sample, said laser output ranging from 1-100 mJ per pulse at 10 Hz;
    a dichroic Rayleigh filter stack in optical communication with scattered light from the single pulse of unfocused beam of photons incident on the sample;
    a singlet lens in optical communication with the dichroic Rayleigh filter stack to focus the scattered light from the sample and couple the scattered light into a proximal end of a stacked fiberoptic bundle;
    a spectrograph equipped with a hybrid diffraction grating attached to a distal end of the stacked fiberoptic bundle, said hybrid diffraction grating comprised of a stack of at least two diffraction surfaces, each diffraction surface configured for wavelength for one of the one or more excitation wavelengths, each diffraction surface individually angle-tuned and target-adjusted to disperse the scattered light, wherein the spectrograph is configured to illuminate all of the at least two diffraction surfaces simultaneously; and an array detector system in optical communication with the spectrograph and configured to receive the dispersed scattered light from each diffraction surface onto a specific target section of an array detector, and output a spectral intensity measurement.

12. The apparatus of claim 11 wherein the laser is selected from the group consisting of: a Nd YAG laser, a ytterbium laser, a ytterbium-YAG laser, a ytterbium-doped laser, a ytterbium-glass laser, a titanium sapphire laser, a neodymium-glass laser, a neodymium-YCOB laser, a neodymium-YVO4 laser, a neodymium-YVO4 laser, a neodymium-YLF laser, or a neodymium-CrYAG laser, a helium-neon laser, and an argon laser.

13. A detection device comprising:
an unmanned vehicle, the unmanned vehicle being selected from the group consisting essentially of: an unmanned aerial vehicle, an unmanned ground vehicle, and a drone;
a detection unit configured for concurrent multi-surface chemical analysis, the detection unit being further configured as a payload of an unmanned vehicle;
a laser system including an excitation laser source configured to be vehicle-born and an optical collection configuration configured to detect from a distance a range of analytes with a laser pulse, said optical collection configuration comprising a dichroic Rayleigh filter stack in optical communication with scattered light from a single pulse of unfocused beam of photons; and
a command-and-control system configured to interface between the laser system and the detection unit.

14. A spectroscopic device comprising:
a plurality of collection optics, said plurality of collection optics including:
a dichroic Rayleigh filter stack in optical communication with scattered light from a single pulse of unfocused beam of photons incident on a sample; and
a singlet lens in optical communication with the dichroic Rayleigh filter stack to focus the scattered light from the sample and couple the scattered light into a proximal end of a stacked fiberoptic bundle, or a detection system.

* * * * *